(12) United States Patent
Tateuchi

(10) Patent No.: US 7,612,744 B2
(45) Date of Patent: Nov. 3, 2009

(54) INFORMATION PROCESSING APPARATUS AND METHOD, RECORDING MEDIUM, AND PROGRAM

(75) Inventor: Mitsuru Tateuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 11/079,279

(22) Filed: Mar. 15, 2005

(65) Prior Publication Data

US 2005/0212733 A1 Sep. 29, 2005

(30) Foreign Application Priority Data

Mar. 19, 2004 (JP) ............................. 2004-080032

(51) Int. Cl.
G09G 3/30 (2006.01)
(52) U.S. Cl. .......................................... 345/76; 345/81
(58) Field of Classification Search .................... 345/76, 345/80–82, 87, 90, 102; 315/169.3
See application file for complete search history.

(56) References Cited

U.S. PATENT DOCUMENTS

| 6,718,104 B2 * | 4/2004 | Lowry | 385/120 |
| 2001/0033699 A1 * | 10/2001 | Eshraghian | 382/276 |
| 2003/0026457 A1 * | 2/2003 | Nahum | 382/106 |
| 2003/0122749 A1 | 7/2003 | Booth, Jr. et al. | |
| 2004/0089796 A1 * | 5/2004 | Patzwald et al. | 250/231.1 |

FOREIGN PATENT DOCUMENTS

| JP | 5-121715 | 5/1993 |
| JP | 7-325319 | 12/1995 |
| JP | 11-075115 | 3/1999 |
| JP | 2003-287731 | 10/2003 |
| JP | 2003-338372 | 11/2003 |
| JP | 2005-539247 | 12/2005 |

* cited by examiner

*Primary Examiner*—Ricardo L Osorio
(74) *Attorney, Agent, or Firm*—Oblon, Spivak, McClelland, Maier & Neustadt, L.L.P.

(57) ABSTRACT

In order to carry out information transmission/reception intuitively and easily, a black-and-white pattern of a symbol representative of data of an image is switched every scan timing of one frame of a display unit and is displayed continuously only during a period displaying whole data of the image. In an information processing terminal, the data of the image is acquired in accordance with the symbol read by a reader/writer. To the contrary, in a case of transmitting data from the information processing terminal to a display apparatus, a symbol representative of data to be transmitted is output from the reader/writer to be read by a read area formed at a predetermined position of the display unit. In the display apparatus, data is acquired in accordance with the read symbol. The present invention may be applied to various information processing apparatuses including a personal computer, PDA, a television receiver.

11 Claims, 45 Drawing Sheets

READ AREA

EL ELEMENT

INFORMATION PROCESSING APPARATUS AND METHOD, RECORDING MEDIUM, AND PROGRAM

CROSS REFERENCES TO RELATED APPLICATIONS

The present document is based on Japanese Priority Document JP 2004-080032, filed in the Japanese Patent Office on Mar. 19, 2004, the entire contents of which being incorporated herein by reference.

BACKGROUND OF THE INVENTION

1. Field of the Invention

The present invention relates to an information processing apparatus and method, a recording medium and a program, and more particularly to an information processing apparatus and method capable of executing transmission/reception of information intuitively and easily.

2. Description of Related Art

Various technologies have been proposed recently, in which various information is directly input to a display apparatus such as a television receiver, without superposing a touch panel or the like on the display apparatus.

For example, Japanese Patent Unexamined Publication No. HEI-11-53111 (pp. 5 and 6, paragraphs [0028] to [0030]) discloses that information corresponding to an operation by a user or information recorded in a card presented by a user is detected in accordance with a light amount of an infrared ray emitted from the inside to the outside of a display apparatus (an information input/output apparatus) and a light amount of a reflection light thereof. A user can input predetermined information to the display apparatus without operating a mouse or a keyboard.

Japanese Patent Unexamined Publication No. HEI-7-175420 describes an organic EL element constituting a display apparatus capable of display with emitting light in accordance with information written by an optical input method.

However, there is one issue of a limit of the amount of information capable of being input in a predetermined time period, in a case where information corresponding to an operation by a user or information recorded in a card presented by a user is to be input to the display apparatus.

One approach to inputting information to a display apparatus is to provide the display apparatus with a module capable of communications using a so-called wireless local area network (LAN) such as the Institute of Electrical and Electronics Engineers (IEEE) 802.11a, 802.11b or the like or Bluetooth (registered trademark), which are rapidly prevailing in recent years, and to input (transmit) information by wireless communications from an information terminal provided with a similar communication module to the display apparatus. However, there is an issue of complicated settings before communications start and difficulties in inputting information.

Furthermore, since a user instructs data transmission by using a screen of the information terminal, information cannot be input more intuitively than a case in which information is directly input to a display apparatus provided with, for example, a touch panel (a case in which a display part is depressed directly).

The present invention has been made in consideration of these circumstances and allows information transmission/reception to/from a display apparatus to be performed intuitively and easily.

An information processing apparatus of the present invention is one for controlling driving display means having a transistor disposed in each pixel for switching between conduction and non-conduction in response to an applied voltage and outputting a signal in response to a light reception. The information processing apparatus comprises control means for controlling a voltage applied to the transistor to switch between display driving (mode of pixel being driven for display) and photo detection driving (mode of pixel being driven for photo detection) of each pixel; and detecting means for detecting an external input in accordance with a signal output upon reception of light by the transistor, disposed in a pixel under the light reception driving under control of the control means.

The control means may apply a positive voltage to the transistor disposed in the pixel under the display driving and a voltage near 0 V to the transistor disposed in the pixel under the photo detection driving.

In a case where an electroluminescent element is disposed in each pixel of the display means, the electroluminescent element being connected to the transistor and emitting light while the transistor is conductive, the detecting means may further detect the external input in accordance with a signal output upon reception of light by the electric field light emitting element not emitting light.

The control means may display a detection area constituted of a plurality of pixels under the light reception driving on the display means, by controlling a voltage applied to the transistors.

The information processing apparatus of the present invention may further comprise focusing means for focusing an object positioned away from a surface of the display means upon the pixels constituting the detection area, wherein the detecting means detects as the external input an image of the object focused by the focusing means on the pixels constituting the detection area.

The detecting means may detect as the external input a figure image representative of predetermined data displayed on another information processing apparatus, in accordance with a signal output from the transistors disposed in the pixels constituting the detection area.

The figure image may be two-dimensional codes representative of data having a predetermined data amount.

The control means may further form on the display means a display area constituted of a plurality of pixels under the display driving in an area different from the detection area.

In a case where an electroluminescent element is disposed in each pixel of the display means, the electroluminescent element being connected to the transistor and emitting light while the transistor is conductive, the control means may control the voltage applied to the transistor in such a manner that the detection area is constituted of pixels in which electroluminescent elements having a high light reception sensitivity relative to light having a predetermined wavelength emitted from the electroluminescent elements disposed in the pixels constituting the display area.

The information processing apparatus of the present invention may further comprise generating means for generating a figure image representative of predetermined data to be output to another information processing apparatus and display control means for making the pixels constituting the display area display the figure image generated by the generating means.

The control means may form the detection area near the display area, and the detecting means may detect an external input in accordance with a signal output when the transistors disposed in the pixels constituting the detection area receive reflected light of light emitted from the pixels constituting the display area.

The detecting means may detect that, as the external input, a predetermined object is in contact or proximity of a surface of the display means.

The control means may further move sequentially positions of the pixels constituting the detection area, together with the pixels constituting the display area, and the detecting means may detect, as the external input, area information of an object in contact with or close to the surface of the display means, in accordance with a signal output upon reception of light by the transistors disposed in the pixels constituting the detection area receive reflected light of light emitted from the pixels constituting the display area.

An information processing method of the present invention is one for an information processing apparatus for controlling driving display means having a transistor disposed in each pixel for switching between conduction and non-conduction in response to an applied voltage and outputting a signal in response to a light reception. The information processing method comprises a control step of controlling a voltage applied to the transistor to switch between display driving and photo detection driving of each pixel; and a detecting step of detecting an external input in accordance with a signal output upon reception of light by the transistor disposed in a pixel under the light reception driving under control by a process of the control step.

A recording medium of the present invention is one recording therein a program for making a computer execute a process of driving display means having a transistor disposed in each pixel for switching between conduction and non-conduction in response to an applied voltage and outputting a signal in response to a light reception. The program comprises a control step of controlling a voltage applied to the transistor to switch between display driving and photo detection driving of each pixel; and a detecting control step of detecting an external input in accordance with a signal output upon reception of light by the transistor disposed in a pixel under the light reception driving under control by a process of the control step.

A program of the present invention one for making a computer execute a process of driving display means having a transistor disposed in each pixel for switching between conduction and non-conduction in response to an applied voltage and outputting a signal in response to a light reception. The program comprises a control step of controlling a voltage applied to the transistor to switch between display driving and photo detection driving of each pixel; and a detecting control step of detecting an external input in accordance with a signal output upon reception of light by the transistor disposed in a pixel under the light reception driving under control by a process of the control step.

In the information processing apparatus and method, recording medium and program of the present invention, by controlling the voltage applied to the transistor, the display driving or photo detection driving of each pixel is selectively controlled, and the external input is detected in accordance with a signal output upon reception of light by the transistor, disposed in the pixel under the light reception driving.

According to the present invention, a display and an external input detection can be performed.

According to the present invention, data can be fetched from an external apparatus by a more intuitive and easy operation, and data can be transferred easily to the external apparatus.

DESCRIPTION OF PREFERRED EMBODIMENTS

Figure 1:
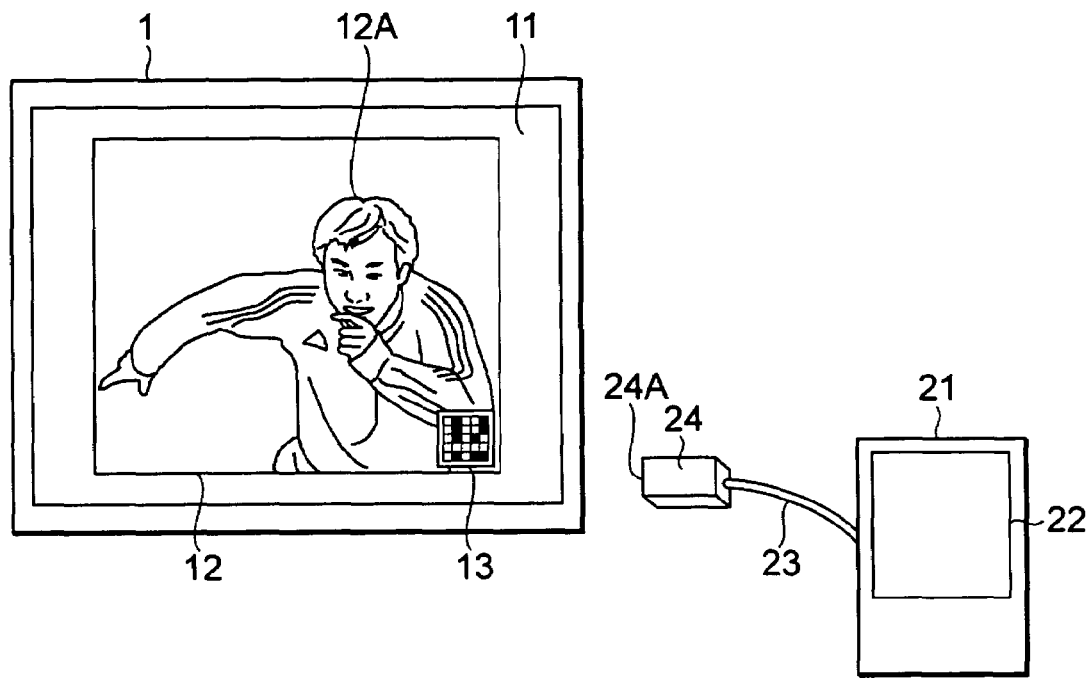
FIG. 1 is a view showing a structural example of an information processing system to which the present invention is applied.

In the following, embodiments of the present invention will be described. The correspondence between the disclosed inventions and the embodiments is as follows. The description is used for confirming that the embodiments supporting the inventions described in this specification are described in the specification. Therefore, the embodiment described in this specification as not corresponding to some invention is not intended to mean that the embodiment does not correspond to the invention. Conversely, the embodiment described in this specification as corresponding to some invention is not intended to mean that the embodiment does not correspond to the invention other than some invention.

Further, it is not intended that the claims cover all the invention corresponding to the embodiments. In other words, it is not intended to deny the presence of the invention described in this specification but not claimed in this application, i.e., to deny the presence of the invention which may be divisionally submitted in the future and the invention emerging through corrections and additionally submitted in the future.

According to one aspect of the present invention, an information processing apparatus (e.g., the display apparatus 1 shown in FIG. 1) of the present invention for controlling driving display means having a transistor disposed in each pixel for switching between conduction and non-conduction in response to an applied voltage and outputting a signal in response to a light reception. The information processing apparatus comprises: control means (e.g., a controller 48 shown in FIG. 3) for controlling a voltage applied to the transistor to switch between display driving and photo detection driving of each pixel; and detecting means (e.g., a detecting unit 53 shown in FIG. 3) for detecting an external input in accordance with a signal output upon reception of light by the transistor disposed in a pixel under the light reception driving under control of the control means.

According to another aspect of the present invention, in a case where an electroluminescent element (e.g., an EL element 74 shown in FIG. 4) is disposed in each pixel of the display means, the electroluminescent element being connected to the transistor and emitting light while the transistor is conductive, the detecting means further detects the external input in accordance with a signal output upon reception of light by the electric field light emitting element not emitting light.

According to another aspect of the present invention, the information processing apparatus further comprises focusing means (e.g., a lens shown in FIG. 52) for focusing an object positioned away from a surface of the display means upon the pixels constituting the detection area, in which the detecting means detects as the external input an image of the object focused on the pixels constituting the detection area.

According to another aspect of the present invention, in a case where an electroluminescent element is disposed in each pixel of the display means, the electroluminescent element being connected to the transistor and emitting light while the transistor is conductive, the control means controls the voltage applied to the transistor in such a manner that the detection area is constituted of pixels in which electroluminescent elements (e.g., elements emitting light near red) having a high light reception sensitivity relative to light having a predetermined wavelength emitted from the electroluminescent elements (e.g., elements emitting light near green) disposed in the pixels constituting the display area.

According to another aspect of the present invention, the information processing apparatus further comprises generating means (e.g., a symbol processing unit 52 shown in FIG. 3) for generating a figure image (e.g., a symbol shown in FIG. 9) representative of predetermined data to be output to another information processing apparatus and display control means (e.g., a video signal generating unit 47 shown in FIG. 3) for making the pixels constituting the display area display the figure image generated by the generating means.

According to another aspect of the present invention, an information processing method of the present invention for an information processing apparatus for controlling driving display means having a transistor disposed in each pixel for switching between conduction and non-conduction in response to an applied voltage and outputting a signal in response to a light reception. The information processing method comprises: a control step (e.g., Step S61 shown in FIG. 15) of controlling a voltage applied to the transistor to switch between display driving and photo detection driving of each pixel; and a detecting step (e.g., Step S62 shown in FIG. 15) of detecting an external input in accordance with a signal output upon reception of light by the transistor disposed in a pixel under the light reception driving under control by a process of the control step.

In a program recorded in a recording medium according to another aspect of the present invention and a program according to another aspect of the present invention, the embodiment (only for example) corresponding to each Step is similar to the information processing method according to the above-described aspect of the present invention.

Embodiments of the present invention will be described hereunder with reference to the accompanying drawings.

FIG. 1 is a diagram showing an example of the structure of an information processing system adopting the present invention.

A display unit 11 is disposed over substantially the whole front area of a display apparatus (information processing apparatus) 1. The display unit 11 is, for example, an organic or inorganic electroluminescence (EL) display or a liquid crystal display (LCD), having a thin film transistor (TFT) at each pixel, and displays an image such as predetermined figures and characters by controlling to drive each pixel.

A moving image 12A is displayed in a window 12 displayed in the display unit 11, and a symbol 13 being a matrix type two-dimensional code is displayed at a lower right corner of the window 12.

The symbol 13 is a figure image representative of data of the moving image 12A, and, for example, the black-and-white pattern of the symbol is changed every time when one frame is displayed in the display unit 11. Upon acquisition of source data of the moving image 12A, the display apparatus 1 generates a symbol string representative of the source code and constituted of a plurality of symbols (two-dimensional codes), and sequentially displays each symbol every time one frame is displayed.

An apparatus having a reader capable of detecting a symbol displayed in the display unit 11 can acquire source data by analyzing the symbol.

An information processing terminal 21 is a personal digital assistant (PDA), a personal computer, a portable phone or the like, and is connected via a cable 23 to a reader/writer 24 capable of reading a symbol displayed on the display apparatus 1. As a front end face 24A of the reader/writer 24 abuts on the symbol 13 displayed in the display unit 11, the reader/writer 24 reads the symbol 13 displayed in the display unit 11.

Namely, the reader/writer 24 detects the pattern of the displayed symbol 13 during a predetermined period in correspondence with the display period of the display unit 11. Data of the symbol detected by the reader/writer 24 is output to the information processing terminal 21 via the cable 23.

In accordance with the data transferred from the reader/writer 24, the information processing terminal 21 acquires a symbol string including a plurality of symbols disposed time sequentially, and acquires source data (source data of images displayed on the display apparatus 1) from the acquired symbol string. In this manner, with the involvement of the symbol 13, the display apparatus 1 transfers data corresponding to the image displayed in the display unit 11 to the information processing terminal 21.

For example, assuming that symbols are sequentially displayed by a progressive method at a frequency of 60 Hz, data is transferred at a transfer rate of 960 kbps (60 (times/sec)×2 (KB)×8 (bit)).

A display and the like have been developed recently which can display a high quality image at a frequency of 400 Hz. In a case where symbols each representing 2 KB data are sequentially displayed in a very short period such as 400 Hz, data is transferred at a transfer rate of 6400 kbps (400 (times/sec)×2 (KB)×8 (bit)).

Data can therefore be transmitted and received at a relatively high transfer rate without involvement of wireless communications such as Bluetooth and so-called wireless local area network (LAN) in conformity with the Institute of Electrical and Electronics Engineers (IEEE) 802.11a and 802.11b.

The amount of data represented by one symbol can be changed if necessary depending upon the size of the symbol, an error correction method and the like. The transfer rate can also be changed if necessary depending upon the amount of data represented by one symbol and the display frequency of the display unit 11.

In the information processing terminal 21, data transferred from the display apparatus 1 by using the symbol 13 is stored in an internal memory unit, or in accordance with transferred data, a corresponding image is displayed on a display unit 22.

A user can therefore fetch data from the display apparatus 1 to the information processing terminal 21 by a very intuitive operation of abutting the front end face 24A of the reader/writer 24 on the displayed symbol 13.

Conversely, the user can input data from the information processing terminal 21 to the display apparatus 1 by abutting the front end face 24A of the reader/writer 24 on a read area set at a predetermined position of the display unit 11.

Figure 2:
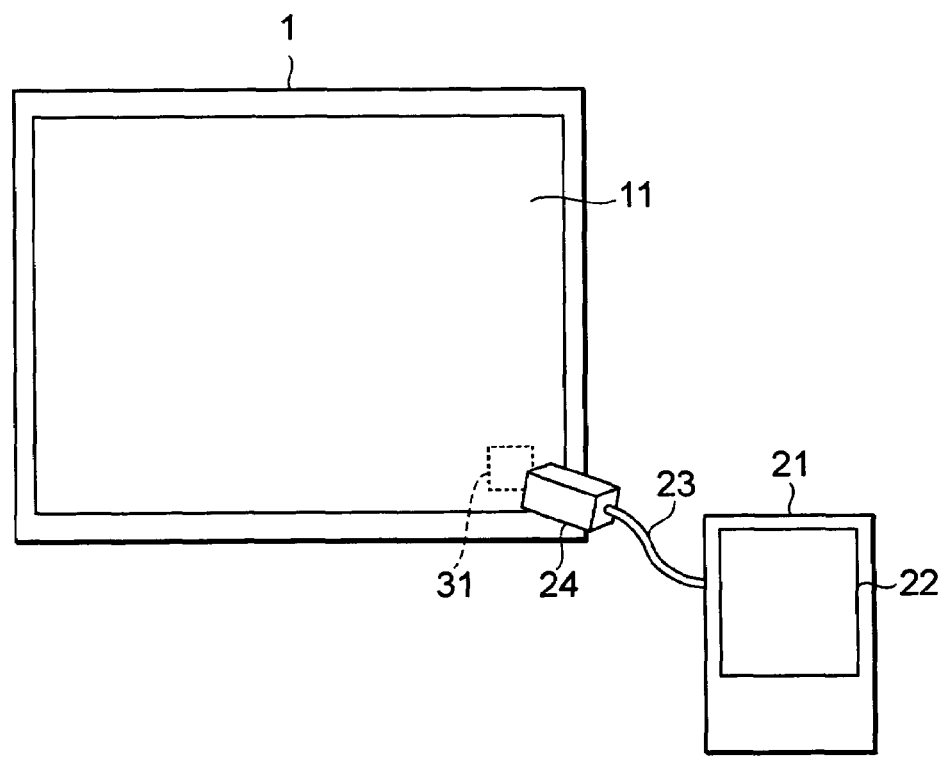
FIG. 2 is another view showing a structural example of an information processing system to which the present invention is applied.

For example, as shown in FIG. 2, the display apparatus 1 forms a read area 31 in a lower right corner of the display unit 11. Data is transferred from a symbol via the reader/writer 24 abutted on the read area.

Although the details will be described later, a positive bias voltage is applied to TFT of each pixel in the display area 11 in order to display a portion of a predetermined image on the pixel, whereas a bias voltage near 0 V is applied (gate voltage is controlled to be 0 V) in order to make the pixel detect a portion of a symbol output from the reader/writer 24.

The read area 31 is therefore constituted of, for example, a plurality of pixels applied with the bias voltage near 0 V among the pixels in the display unit 11.

When external light becomes incident (when light representative of a black-and-white pattern of a symbol from the reader/writer 24 becomes incident) upon a pixel (TFT) applied with the bias voltage near 0 V, leak current is generated in the semiconductor active layer of TFT. Therefore, whether or not external light is applied to a pixel can be judged from the leak current detected in the pixel constituting the read area 31.

Namely, as a symbol display unit 104 (FIG. 10) provided in the reader/writer 24 displays a symbol and light corresponding to the symbol is irradiated upon the read area 31, the presence/absence of light, or in other words, the black-and-white of the symbol can be detected from each pixel constituting the read area 31.

More specifically, for the symbol displayed in the reader/writer 24, leak current is not generated in the pixel of the read area 31 on which a black portion is abutted, whereas leak current is generated in the pixel on which a white portion is abutted and the leak current is detected.

The detection results of the pixels in the read area 31 are synthesized and the symbol displayed in the reader/writer 24 is acquired at the display apparatus 1. This operation is repeated during a predetermined period so that the display apparatus 1 fetches a symbol string displayed in the reader/writer 24 (all symbols representative of data transferred from the information processing terminal 21). The display apparatus 1 recovers and acquires the data selected at and transferred from the information processing terminal 21 to the display apparatus 1, by analyzing the symbol string.

In this manner, a user can fetch data from the display apparatus 1 to the information processing terminal 21 merely by abutting the reader/writer 24 upon the symbol 13 displayed in the display part 11, and can transfer the data selected at the information processing terminal 21 to the display apparatus 1 merely by abutting the reader/writer 24 on the read area 31.

Data can be transmitted and received by an intuitive operation more easily without any complicated settings, as compared to data transmission/reception through communications between the display apparatus 1 and the information processing terminal 21 by wireless LAN or Bluetooth.

In the example shown in FIG. 2, the read area 31 formed in the display unit 11 is indicated by a dotted line. Instead, the read area may be formed in a frame image having a predetermined size visually recognizable by a user.

Also in the example shown in FIG. 2, although any image is not displayed in an area of the display unit 11 other than the read area 31, various images such as television program images may be displayed in the area other than the read area applied with the bias voltage near 0 V.

Data transmission/reception between the display apparatus 1 and the information processing terminal 21 will be later described in detail with reference to flow charts.

Figure 3:
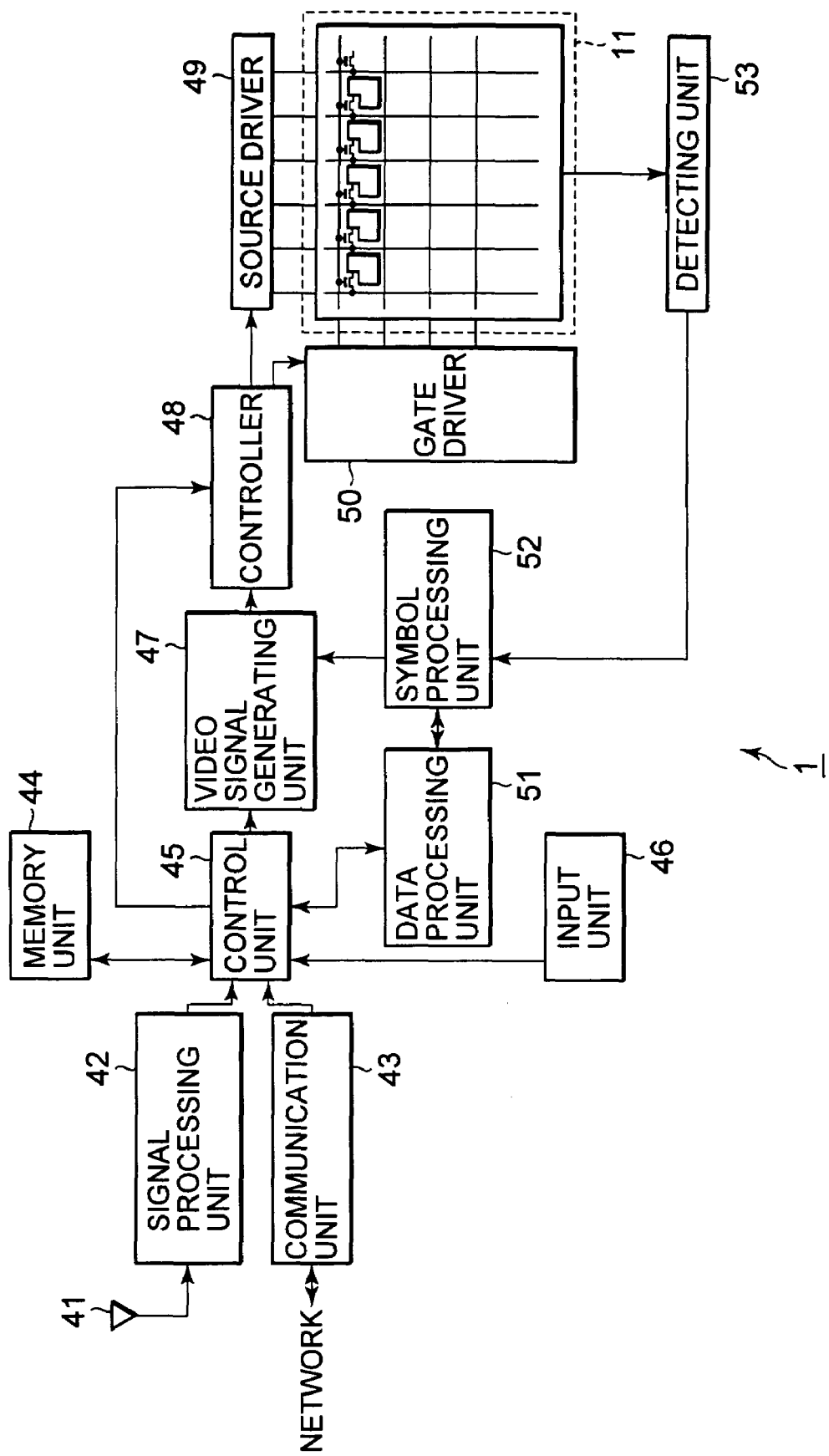
FIG. 3 is a block diagram showing a structural example of a display apparatus of FIG. 1.

FIG. 3 is a block diagram showing an example of the structure of the display apparatus 1 shown in FIG. 1.

A control unit 45 controls the whole operation of the display apparatus 1 in accordance with a control program stored in an unrepresented read-only memory (ROM). The control unit 45 executes a process corresponding to a user instruction entered from an input unit 46 such as a remote controller, for example, displaying images of a program of a predetermined television channel and accessing a predetermined site and displaying a screen of the site.

Under the control of the control unit 45, a signal processing unit 42 acquires a signal of a predetermined channel from a television broadcasting wave received at an antenna 41, and outputs the data of the program broadcast on the channel to the control unit 45. A communication unit 43 communicates with various apparatuses through wired or wireless connection via a network such as the Internet, and outputs acquired data to the control unit 45.

A memory unit 44 is constituted of a hard disk or the like and stores various data such as data transferred from the information processing terminal 21, data of a television program and data acquired at the communication unit 43.

A video signal generating unit 47 generates an video signal for displaying an image corresponding to data supplied from the control unit 45, and outputs the generated video signal to a controller 48 for controlling to drive a display unit 11.

In accordance with data generated and supplied from a symbol processing unit 52, the video signal generating unit 47 generates a video signal and outputs it to the controller 48, for example, the video signal displaying one symbol per one screen (per one frame display).

The controller 48 controls to drive a gate driver 50 which controls voltage to be applied to a gate electrode of TFT provided in each pixel in the display unit 11 and controls to drive a source driver 49 which controls voltage to be applied across a source electrode and a drain electrode of TFT in cooperation with driving of the gate driver 50.

For example, when the controller 48 is instructed by the control unit 45 to form the read area in the display unit 11 at a predetermined position, the controller 48 controls the gate driver 50 so as to apply a bias voltage near 0 V to the pixels (pixel TFT's) forming the read area and a positive bias voltage to the other area.

Since the pixels forming the read area take a gate-off state, it is possible to detect a pattern of a symbol output from the reader/writer 24 in accordance with the presence/absence of leak current corresponding to light externally applied, as described earlier. The other pixels take a gate-on state so that current corresponding to voltage supplied from the source driver 49 makes an EL element connected to a pixel electrode emit light and display a portion of an image.

Figure 4:
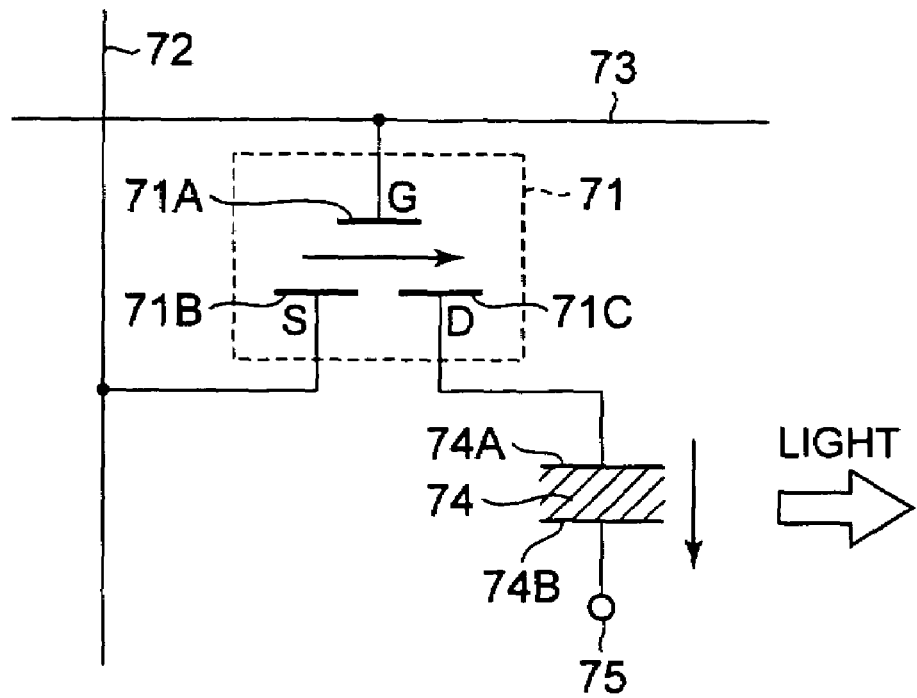
FIG. 4 is a diagram showing details of a pixel constituting a display unit of FIG. 3.
Figure 5:
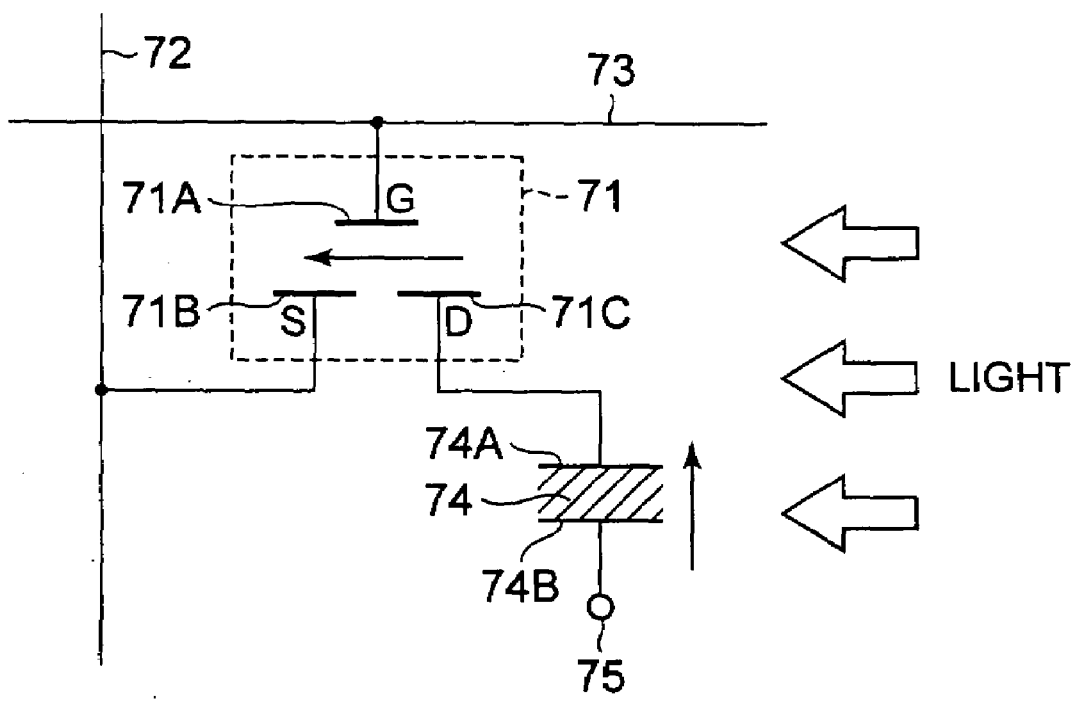
FIG. 5 is another diagram showing details of a pixel constituting a display unit of FIG. 3.

With reference to FIGS. 4 and 5, detailed description will be made on the operation of TFT disposed in each pixel of the display unit 11.

FIG. 4 shows one pixel of the display unit 11, the pixel being controlled as an image displaying pixel (a pixel different from a pixel constituting the symbol read area) by the controller 48.

For example, as a TFT 71 is turned on upon application of a positive voltage to the gate electrode 71A (G) of the TFT 71 from the gate driver 50, current flows from a source electrode 71B (S) to a drain electrode 71C (D) through a semiconductor active layer (channel) made of amorphous silicon or polysilicon, corresponding in amount to voltage applied from the source driver 49, as indicated by a solid arrow.

The drain electrode 71C of the TFT 71 is connected to an anode electrode 74A of an EL element 74. As current supplied from the drain electrode 71C flows through the EL element 74, the EL element 74 as an electroluminescent element emits light corresponding in amount to the flowed current.

Light emitted in this manner is transmitted through the surface of the display unit 11 and output to an external of the display apparatus 1 so that a portion of an image is displayed by the pixel shown in FIG. 4. In FIG. 4, for the convenience of description, light is drawn to be output from the EL element to the right in the drawing as indicated by a hollow solid white arrow. In actual, light emitted from the EL element 74 is output to an external by transmitting through a transparent electrode of either the anode electrode 74A or a cathode electrode 74B.

On the other hand, if a voltage near 0 V is applied to the gate electrode 71A (G) of TFT 71 by the gate driver 50 and the gate takes an off-state, current will not flow through the semiconductor active layer even in a case where voltage is applied by the source driver 49, and consequently current will not flow through the EL element 74 and light emission will not occur.

In this state, as indicated by a solid white hollow arrow shown in FIG. 5, as external light is applied, leak current (off-current), although small in amount, flows from the drain electrode 71C to the source electrode 71B because of the photo conductivity of the semiconductor active layer of the TFT 71. Similarly, in the state that voltage near 0 V is applied, as light is applied, the EL element 74 flows a reverse current without emitting light.

In this way, the generated current is detected and it is detected that external light becomes incident upon the pixel shown in FIG. 5, i.e., an event that a white symbol area is displayed at a position (in front of the pixel shown in FIG. 5)

of the symbol display unit 104 (FIG. 10) of the reader/writer 24 corresponding to the pixel shown in FIG. 5.

Figure 6:
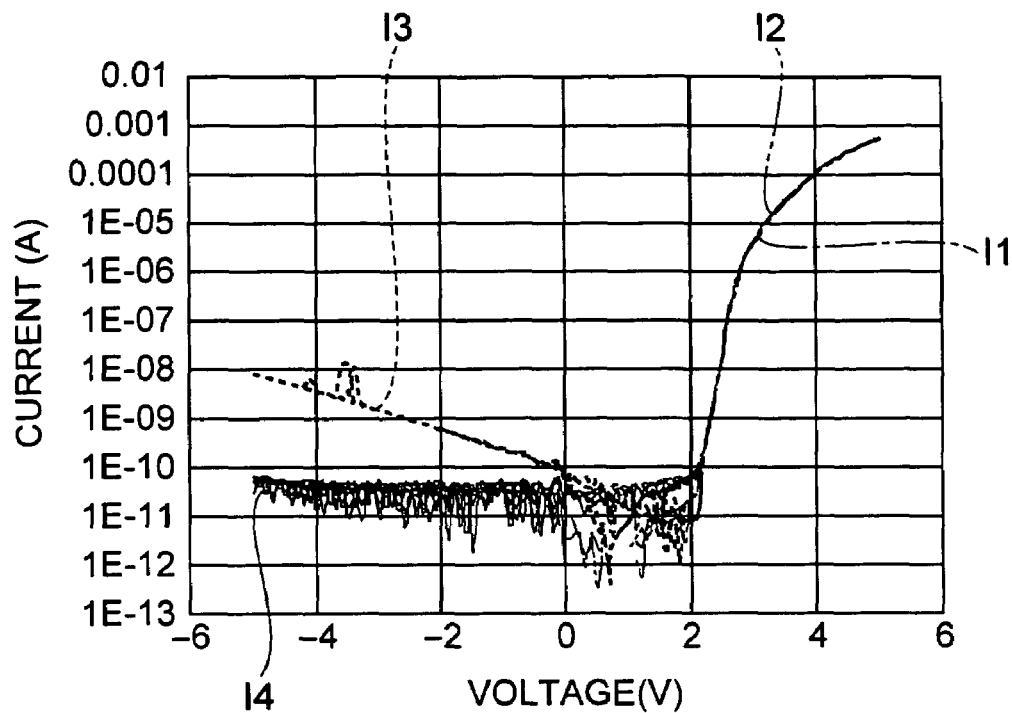
FIG. 6 is a graph showing an example of measurement results of a current value detected in the pixels of FIG. 4 and FIG. 5.

FIG. 6 shows measurement results of current generated in the pixel shown in FIGS. 4 and 5. In FIG. 6, the abscissa represents voltage applied to the gate electrode 71A and the ordinate represents current generated in the pixel.

A measurement result 11 indicates the value of current flowing through the channel in the state that light is irradiated while a positive voltage is applied, whereas a measurement result 12 indicates the value of current flowing through the channel in the state that light is not irradiated while a positive voltage is applied.

It can be seen from these measurement results 11 and 12 that current flows corresponding in amount to voltage applied by the source driver 49 while the positive voltage is applied, irrespective of the presence/absence of external light. Namely, in this case, the pixel under measurement displays part of an image.

A measurement result 13 shown in FIG. 6 indicates a value of leak current generated in the pixel in a state that external light is irradiated while a reverse voltage is applied, and a measurement result 14 represents a current value while external light is not irradiated. As apparent from the comparison between these measurement results, there is difference between generated currents.

For example, in the state that a predetermined amount of light is irradiated while a voltage (reverse voltage) of about −5 V is applied, generated is current of about "1E-8 (A)" (current generated in the semiconductor active layer of the TFT and current generated in the EL element).

Therefore, whether or not light is incident upon the pixel can be detected based upon whether the value of current detected from the pixel applied with a reverse bias voltage is equal to or larger than a predetermined threshold value. In an actual case, the presence/absence of incident light is detected from the signals shown in FIG. 6 after they are amplified.

The measurement result 14 shown in FIG. 6 indicates that a minute current of about "1E-10 (A)" flows even if there is no irradiation of external light. However, this is due to noises during the measurement. Nearly the same measurement result as that shown in FIG. 6 is obtained from the EL element emitting light of any RGB color.

Figure 7:
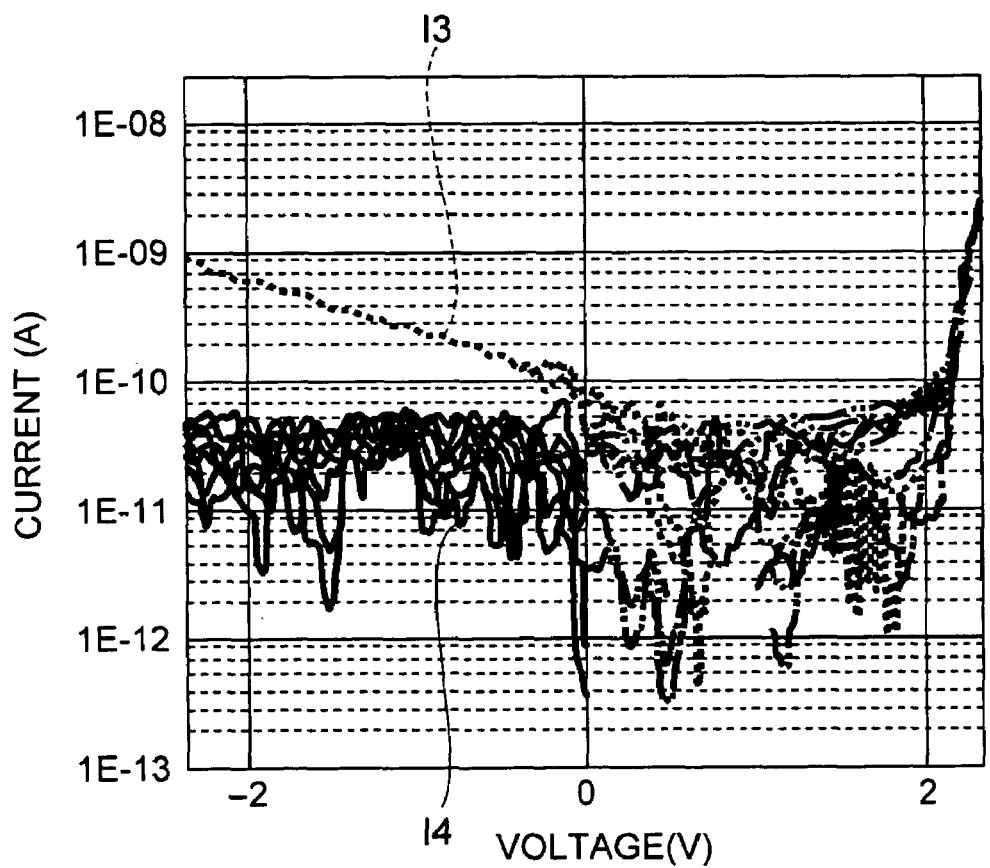
FIG. 7 is a graph showing an enlarged view of FIG. 6 at around 0V.

FIG. 7 is an enlarged view showing the region near 0 V.

As indicated by the measurement results 13 and 14 shown in FIG. 7, there is a current value difference between cases of light irradiation and no light irradiation even in the state that voltage near 0 V is applied.

Therefore, even in the state that voltage near 0 V is applied, it is possible to detect this difference, i.e., whether or not light is irradiated, by amplifying the generated current.

It is therefore possible to drive a pixel as the pixel for detecting an external input by controlling the gate voltage to be set to near 0 V without intentionally applying a reverse voltage.

As the gate voltage is controlled to be set to near 0 V and a pixel is driven as the pixel for detecting an external input, without driving the pixel by applying a reverse voltage, a consumption power can be suppressed corresponding in amount to the reverse voltage.

Since the number of control voltages is reduced, the control and hence the system configuration become easy. Namely, since controlling the gate voltage to have a value near 0 V means controlling the gate voltage not to have a positive voltage, this arrangement can be realized only by a control line and a power source circuit for controlling the gate voltage to be applied with a positive voltage (it is not necessary to use an additional control line for controlling the gate voltage to be applied with a reverse voltage).

It is therefore possible to simplify the structure of a driver circuit on a circuit board of the display part (display) and the structure of a power supply circuit on a system circuit board, realizing not only the above-described low consumption power but also an efficient usage of a limited space of these circuit boards.

Since a reverse voltage is not applied, breakage of TFT's and EL elements can be avoided which may otherwise be caused by application of a reverse voltage. For example, although a breakdown voltage of the TFT can be raised by elongating a channel (L length), current reduces during an ON period (during conduction) so that it is necessary to widen a channel width (W length) in order to retain a sufficient current.

As a result, the size of each TFT is required to be made large in order to raise a breakdown voltage without changing the value of the current flowing through the TFT, and it becomes difficult to dispose the TFT in each pixel of a high precision display having a small pixel size.

As described above, by not using a reverse voltage, the breakdown voltage design for TFT's and EL elements becomes easy and the sizes themselves of TFT's and EL elements can be reduced. It is therefore possible to realize a high precision display.

As described above, a difference of the detected current value depending upon a presence/absence of light exists between application of a positive voltage and application of a voltage near 0 V or a reverse voltage. The reason why there is no detected current value difference depending upon a presence/absence of light, is that the current flowing upon application of voltage is sufficiently larger than the current flowing (generated) upon irradiation of light.

Figure 8:
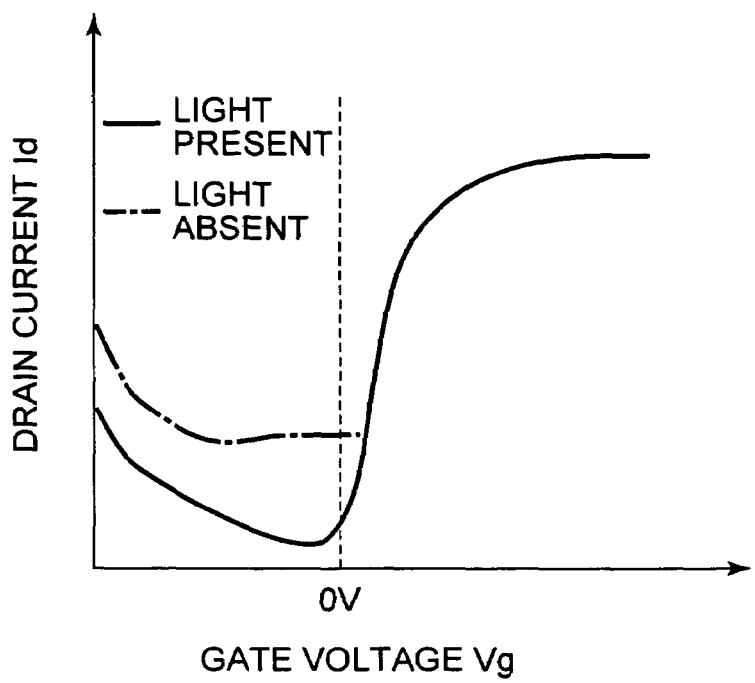
FIG. 8 is a graph showing an example of measurement results of a current value detected in a TFT.

FIG. 8 is a diagram showing the values of drain current Id of the TFT 1 flowing in cases where light is irradiated and where light is not irradiated.

As shown in FIG. 8, in a case where light is irradiated while a reverse gate voltage Vg is applied, a larger drain current Id is detected than the case where light is not irradiated.

In a case where light is irradiated also in a state that a gate voltage Vg near 0 V is applied, a larger drain current Id is detected than the case where light is not irradiated.

It is therefore possible to judge whether light is irradiated, not only by controlling to apply a reverse voltage as the gate voltage Vg but also by controlling to apply a voltage near 0 V.

In the example shown in FIGS. 4 and 5, although one TFT is provided for each pixel, a 2-TFT type pixel having two TFT's or a 4-TFT type pixel having four TFT's may also be used. In this case, an external input of a symbol can be detected similarly in accordance with leak current generated in the TFT.

In a case where an LCD is used as the display unit 11 (a case where self light emission type display provided with EL elements 74 is not used for the display unit 11), liquid crystal is disposed at the position of the EL element shown in FIGS. 4 and 5 to constitute each pixel.

In this case, even in a case where external light is irradiated while a bias voltage near 0 V or a reverse bias voltage is applied, the black-and-white pattern of a symbol is detected depending on only the leak current generated in the TFT of a pixel (depending on the leak current having the value as shown in FIG. 8), because the liquid crystal will not generate current contrary to the case of the EL element 74.

Reverting to the description on FIG. 3, a detecting unit 53 detects current generated in a pixel applied, for example, with the bias voltage near 0 V in the manner described above, and outputs a detection result to the symbol processing unit 52.

In accordance with outputs from the detecting unit 53, the symbol detecting unit 52 synthesizes the detection results of the pixel constituting the read area to acquire the symbol output from the reader/writer 24.

Figure 9:
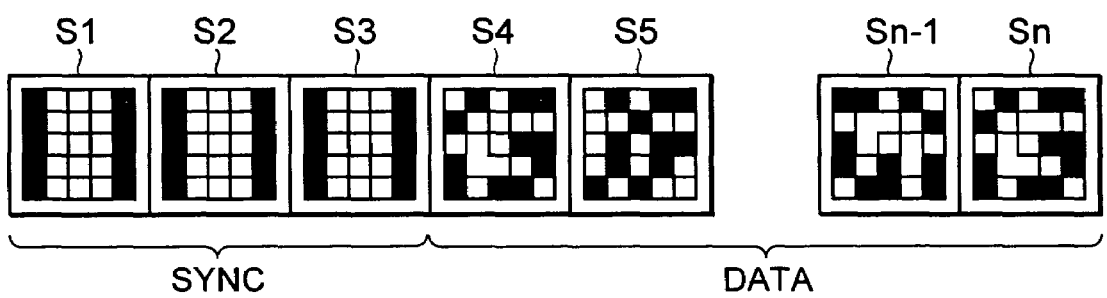
FIG. 9 is a view showing an example of a symbol string.

The symbol detecting process is repetitively executed during a predetermined period (during the period necessary for transferring source data) and the symbol string such as the one shown in FIG. 9 is acquired by the symbol processing unit 52.

Symbols S1 to S3 shown in FIG. 9 are the symbols for synchronization at the time of detection and a repetition of symbols having a simple pattern. Symbols S4 to Sn following the symbols S1 to S3 for synchronization represent various source data such as image data, music data and text data.

The symbol processing unit 52 acquires a symbol string such as the one shown in FIG. 9 and outputs it to a data processing unit 51.

The symbol processing unit 52 displays a symbol in the display unit 11 at a predetermined position, and when data is to be transmitted to the information processing terminal 21, generates a symbol in accordance with data supplied from the data processing unit 51. Data of a symbol string generated by the symbol processing unit 52 is output to the video signal generating unit 47. For example, in a case where the symbol processing unit 52 generates the symbol string shown in FIG. 9, each of the symbols S1 to Sn is sequentially displayed in the display unit 11 every time one frame is displayed.

When a symbol is to be displayed in the display unit 11, the data processing unit 51 performs scrambling, error correction block addition, a modulation process and the like if appropriate, onto source data (data to be transferred to the information processing terminal 21) acquired by and supplied from the control unit 45, and outputs the obtained data to the symbol processing unit 52.

When a symbol is detected in the read area formed in the display unit 11 and data representative of the symbol is supplied from the symbol processing unit 52, the data processing unit 51 performs a demodulation process, error correction process, a descrambling process and the like if appropriate, onto the supplied data, and supplies the obtained source data (data transferred from the information processing terminal 21) to the control unit 45.

The data transferred from the information processing terminal 21 and supplied to the control unit 45 is stored in the memory unit 44 or a corresponding image is displayed in the display unit 11 by using the processes executed by the video signal generating unit 47 and the controller 48 using the transferred data.

Figure 10:
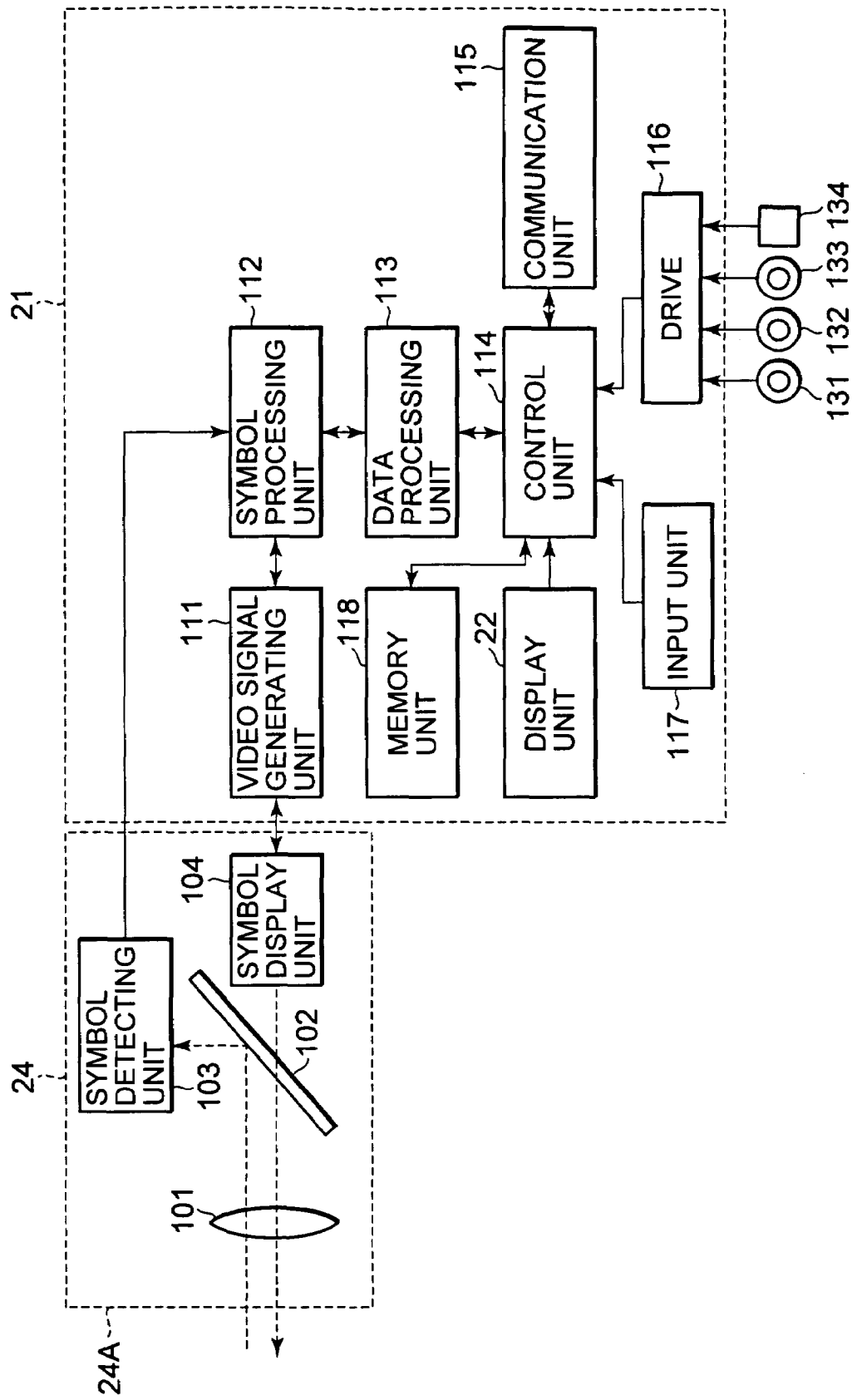
FIG. 10 is a block diagram showing a structural example of a reader/writer of FIG. 1.

FIG. 10 is a block diagram showing an example of the structure of the information processing terminal 21 and the reader/writer 24.

A lens 101 is disposed on the front end face 24A of the reader/writer 24. For example, when the front end face 24A is abutted on or moved near to the symbol displayed in the display unit 11, light representative of the symbol pattern emitted from the display unit 11 becomes incident upon the inside of the reader/writer 24 via the lens 101. The incident light is reflected by a half mirror 102 and received at a symbol detecting unit 103.

The symbol detecting unit 103 has photosensors disposed in an array for detecting a presence/absence of light. The symbol detecting unit 103 detects the symbol displayed at this time in the display unit 11, from the received light reflected by the half mirror 102. A detection result of the symbol detecting unit 103 is output to a symbol processing unit 112 of the information processing terminal 21 via a cable 23.

A symbol display unit 104 is constituted of an LCD or the like capable of displaying an image by a progressive method, and displays a symbol using the same frequency as that at the display unit 11. For example, when data is to be transferred to the display apparatus 1, the symbol display unit 104 sequentially displays symbols representative of the data to be transferred, in accordance with signals supplied from a video signal generating unit 111. The symbol display unit 104 irradiates light representative of each symbol to the read area formed in the display unit 11, by utilizing light from a light source (not shown) mounted at a position facing the half mirror 102 with the symbol display unit being sandwiched therebetween. The irradiated light is emitted outside from the front end face 24A of the reader/writer 24 via the half mirror 102 and the lens 101.

A control unit 114 controls the whole operation of the information processing terminal 21 in accordance with a control program stored in a memory unit 118 made of a ROM (not shown), a hard disk or the like.

A communication unit 115 communicates through wired or wireless connection with various apparatuses via a network such as the Internet.

An input unit 117 outputs to the control unit 114 an instruction from a user entered by a predetermined input button, a touch panel superposed upon the display unit 22 or the like.

The video signal generating unit 111 generates a video signal for displaying a symbol in the symbol display unit 104, in accordance with data of a symbol string generated by and supplied from the symbol processing unit 112, and outputs it to the symbol display unit 104 via the cable 23.

Upon acquisition of data from the display apparatus 1, the symbol processing unit 112 recovers the symbol in accordance with a detection result by the symbol detecting unit 103 to acquire the symbol displayed in the display unit 11. Namely, the symbol detecting process is executed repetitively during a predetermined period so that the symbol processing unit 112 acquires a symbol string such as the one shown in FIG. 9.

When a symbol is to be displayed on the symbol display unit 104 and data is to be transferred to the display apparatus 1, the symbol processing unit 112 generates a symbol in accordance with data supplied from the data processing unit 113. The data of a symbol generated by the symbol processing unit 112 is output to the video signal processing unit 111.

When a symbol is to be displayed on the symbol display unit 104, the data processing unit 113 performs scrambling, error correction block addition, a modulation process and the like if appropriate, onto source data (data to be transferred to the display apparatus 1) supplied from the control unit 114, and outputs the obtained data to the symbol processing unit 112.

When data representative of a detected symbol is supplied from the symbol processing unit 112, the data processing unit 113 performs a demodulation process, an error correction process, a descrambling process and the like if appropriate, onto the supplied data, and supplies the obtained source data (data transferred from the display apparatus 1) to the control unit 114.

The control unit 114 is connected to a drive 116 if necessary. A magnetic disk 131, an optical disk 132, a magneto optical disk 133, a semiconductor memory 134 or the like is installed if necessary in the drive 116, and a computer program read therefrom is installed in the memory unit 118 if necessary.

Next, the operation of the information processing system shown in FIG. 1 will be described with reference to flowcharts.

First, with reference to a flowchart shown in FIG. 11, description will be made on a process to be executed by the display apparatus when data is transferred to the information processing terminal 21.

At Step S1, the control unit 45 (FIG. 3) of the display apparatus 1 acquires source data to be transferred to the information processing terminal 21. For example, in the state that a predetermined television program is displayed in the display unit 11 in response to an instruction from a user, when it is instructed that data of the program is to be transferred, or in the state that video data acquired via a network is displayed in the display unit 11, when it is instructed that the video data is to be transferred, the control unit 45 acquires the program data or video data as the source data in response to the instruction.

Obviously, a user can instruct the display apparatus to transfer to the information processing terminal 21 various data such as music data and text data stored in the memory unit 44 of the display apparatus 1.

The source data acquired at the control unit 45 is output, for example, to the video signal generating unit 47 and the data processing unit 51.

At Step S2, the data processing unit 51 performs a scrambling process, error correction code addition, a modulation process, sync code addition and the like if appropriate, onto the source data supplied from the control unit 45, for each predetermined data unit, to represent the source data by a symbol string.

Sub-data is added if appropriate, the sub-data including information of the title and category of data to be transferred and information of a data amount and a data format. The data obtained after subjecting to various processes by the data processing unit 51 is supplied to the symbol processing unit 52.

At Step S3, the symbol processing unit 52 refers to, for example, a conversion table prepared beforehand and generates a symbol corresponding to the data supplied from the data processing unit 51. The symbol to be generated may be a symbol of a matrix type having each cell coded in black-and-white or a symbol of a stack type having stacked bar codes.

The symbol processing unit 52 generates a predetermined number of symbols corresponding to the amount of source data, and outputs a symbol string such as the one shown in FIG. 9 to the video signal generating unit 47.

At Step S4, the video signal generating unit 47 supplies a video signal to the controller 48 to sequentially display symbols together with images corresponding to the source data, the video signal being obtained by superposing a video signal for displaying images corresponding to the source data supplied from the control unit 45 and a video signal for displaying the symbol string supplied from the symbol processing unit 52.

In this manner, a symbol corresponding to a displayed image (symbol for transferring the displayed image) is displayed in the display unit 11 at a predetermined position such as a position near the image.

At Step S5, the controller 45 judges whether all symbols representative of the data to be transferred are displayed. Until it is judged that all symbols are displayed, the flow returns to Step S4 to sequentially repeat symbol display. In a case where it is judged thereafter at Step S5 that all symbols are displayed, the process is terminated.

The symbol string may be repetitively displayed during the period while the images of the data to be transferred are displayed, so that a user can recognize that the video data displayed in the display unit 11 can be fetched to the information processing terminal 21 by fetching the symbol presently displayed. For example, in a case where moving images (dynamic images) are displayed in the display unit 11 for 10 minutes, the symbol string generated from the moving image data is displayed repetitively for 10 minutes during the image display.

By reading the symbol displayed in the display unit 11 at the predetermined position with the reader/writer 24, the user can fetch the data from the display apparatus 1 to the information processing terminal 21.

Next, with reference to a flowchart of FIG. 12, description will be made on a data acquiring process to be executed by the information processing terminal 12 in correspondence with the processes shown in FIG. 11.

When the front end face 24A of the reader/writer 24 is abutted on the display unit 11 and the sync code (FIG. 9) of the symbol displayed at the abutted position is detected, the symbol detecting unit 103 (FIG. 10) of the information processing terminal 21 reads it at Step S21.

At Step S22, the symbol detecting unit 103 judges whether all symbols are read. In a case where it is judged that all symbols are not read, the flow returns to Step S21 whereat the displayed symbol is repetitively read. Information of the symbol read by the symbol detecting unit 103 is sequentially output, for example, to the symbol processing unit 112.

For example, when the symbol detecting unit 103 detects a symbol representative of the end symbol of the symbol string, it is judged at Step S22 that all symbols representative of the data to be transferred are read, to thereafter advance to Step S23.

At Step S23, the symbol processing unit 112 decodes the symbol string and outputs the obtained data to the data processing unit 113.

At Step S24 the data processing unit 113 performs a demodulation process, an error correction process, a descrambling process and the like if appropriate, onto the data supplied from the symbol processing unit 112, to thereby acquire the source data. In this manner, the source data selected at the display apparatus 1 to be transferred to the information processing terminal 21 is acquired at the information processing terminal 21.

At Step S25, the control unit 114 performs processes for the source data acquired at the data processing unit 113.

Figure 11:
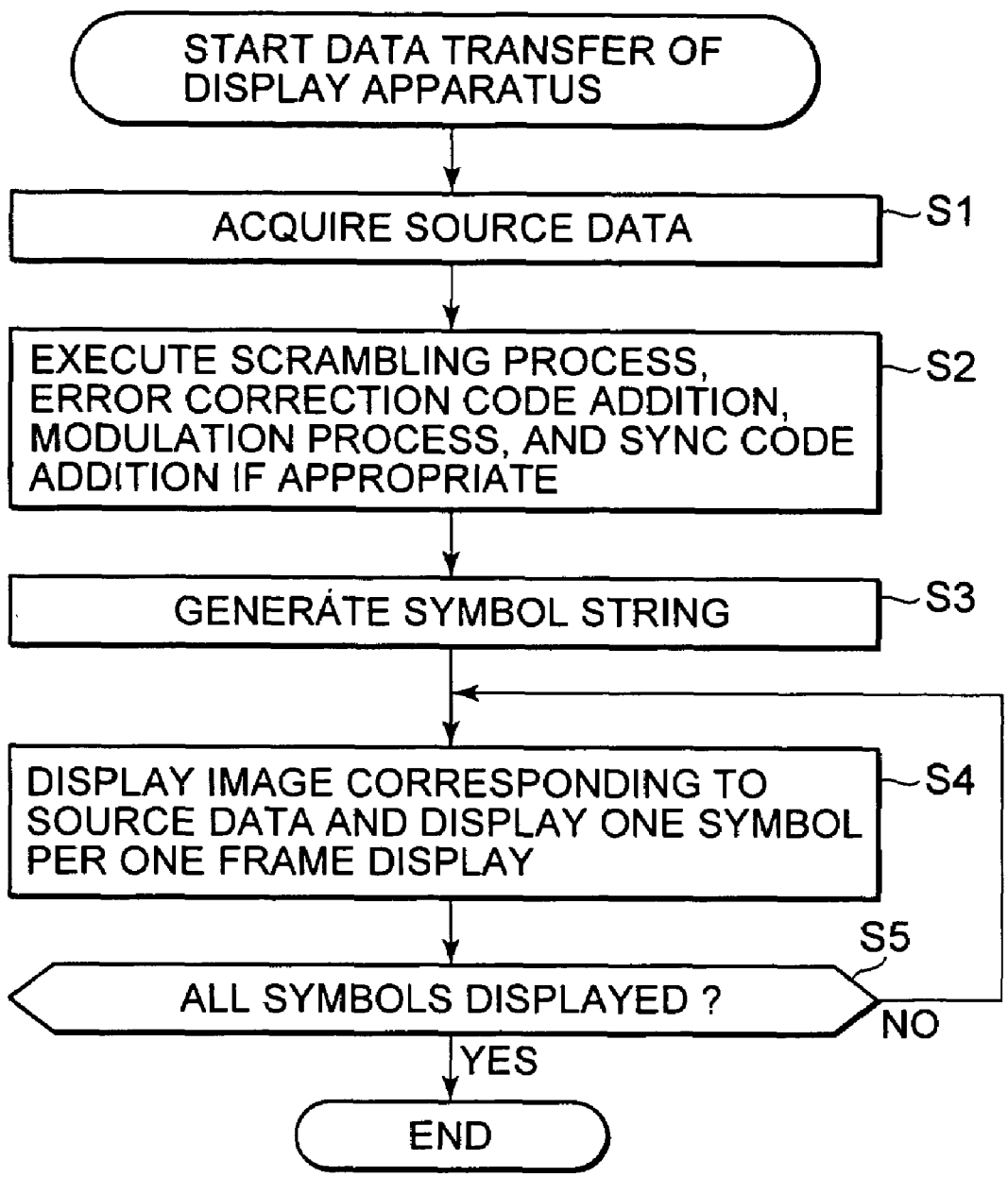
FIG. 11 is a flowchart for explaining a data transfer processing of the display apparatus.
Figure 12:
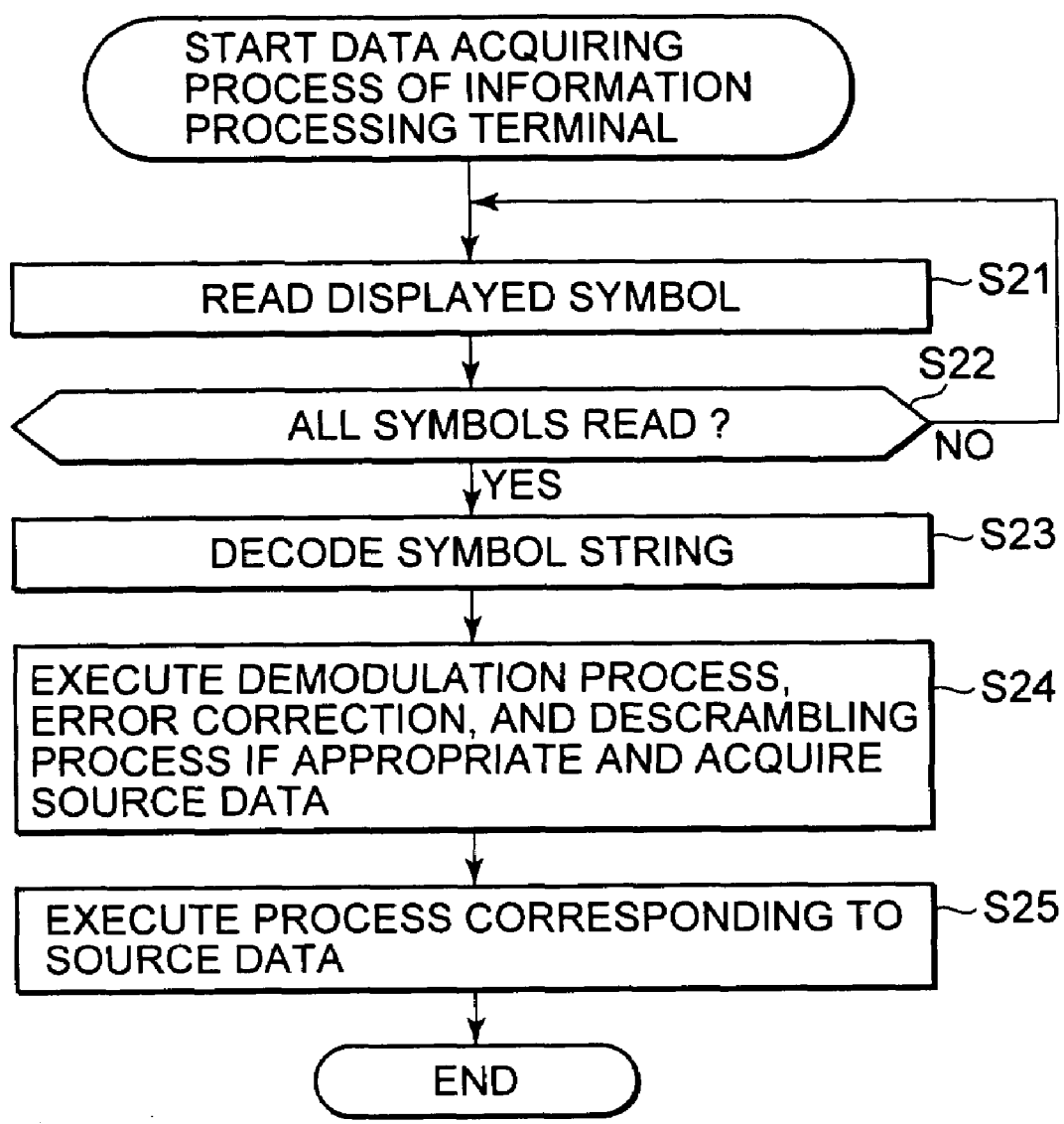
FIG. 12 is a flowchart for explaining a data acquisition processing of an information processing terminal executed in correspondence with the processing of FIG. 11.
Figure 13:
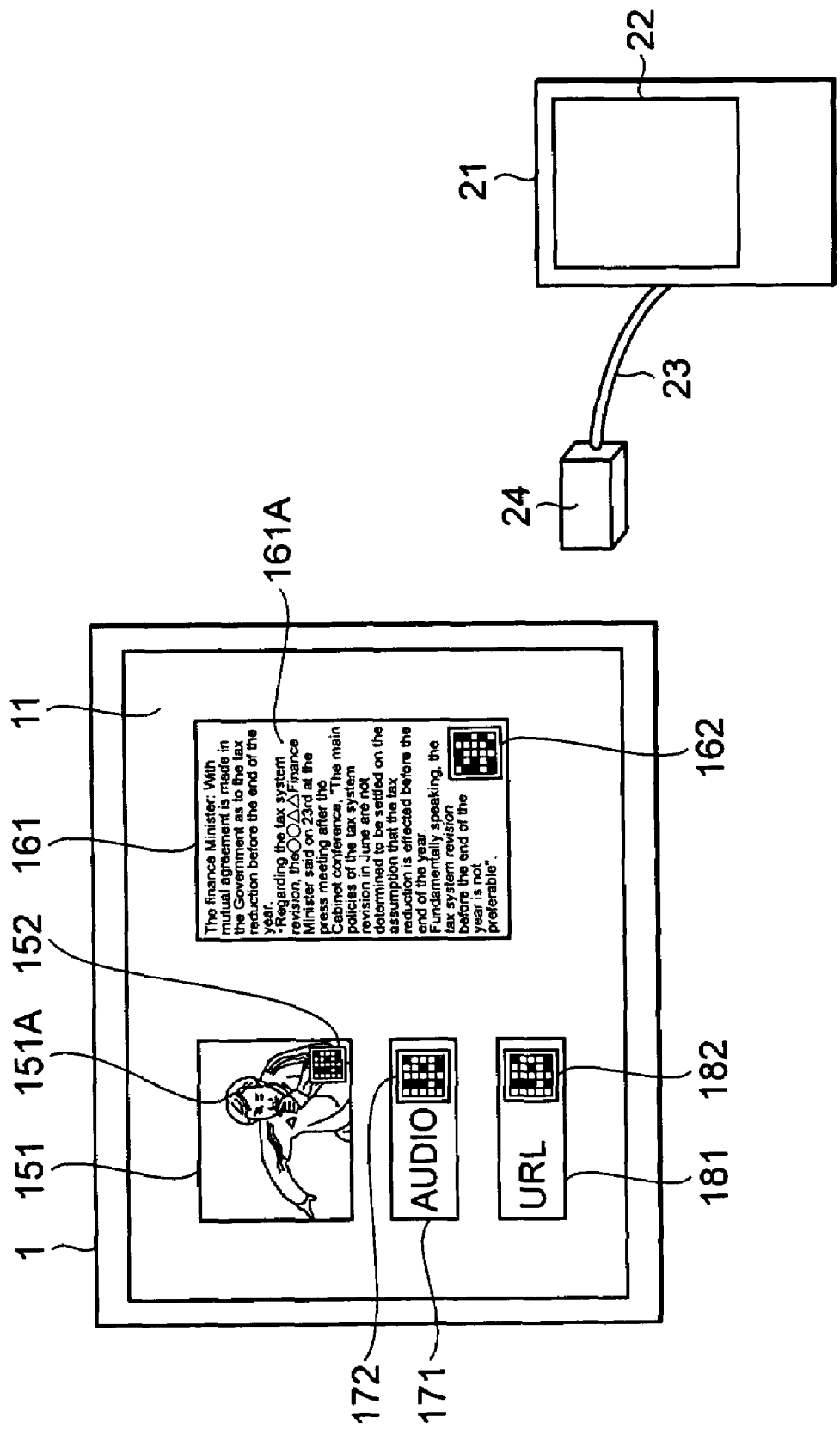
FIG. 13 is a view showing an example of data transferred from the display apparatus to the information processing terminal.

For example, as shown in FIG. 13, a moving image 151A and a symbol 152 representative of the data of the moving image 151A are displayed in a window 151 (processes shown in FIG. 11), as a user reads the symbol 152 with the reader/writer 24, the source data of the moving image 151A is transferred to the information processing terminal 21 (processes at Steps S21 to S24 shown in FIG. 12), and at Step S25 the control unit 114 of the information processing terminal 21 controls to display the same moving image as the moving image 151A on the display unit 22 in accordance with the transferred source data.

In this manner, the user can display on the display unit 22 the same image as that displayed in the window 151, and can confirm the contents of the moving image 151A by using the information processing terminal 21 even at a site away from the display apparatus 1.

At Step S25, the source data transferred to the information processing terminal 21 is stored in the memory unit 118, transmitted to another apparatus via the communication unit 115, or recorded in a recording medium installed in the drive 116.

In a window 161 shown in FIG. 13, for example, a text image 161A acquired via a network is displayed (processes shown in FIG. 11), and as a user reads a symbol 162 displayed at a lower right corner of the window 161 with the reader/writer 24, text data (source data) is transferred to the information processing terminal 21 (processes at Steps S21 to S24 shown in FIG. 12).

At Step S25, the control unit 114 of the information processing terminal 21 stores the transferred text data in the memory unit 118 or displays a corresponding image (text image) on the display unit 22.

A symbol 172 displayed in a window 171 shown in FIG. 13 is generated and displayed by using music data as source data (processes shown in FIG. 11). While the reader/writer 24 is abutted on the symbol 172 during a predetermined period (during a period while symbols corresponding to an amount of music data is displayed), the music data is fetched to the information processing terminal 21 (processes at Steps S21 to S24 shown in FIG. 12). For example, at Step S25 shown in FIG. 12, the fetched music data is reproduced and output from an unrepresented speaker of the information processing terminal 21.

Sub-data may be displayed in the window 171, the sub-data including information of the title and artist of the music capable of being fetched to the information processing terminal 21.

For example, in a case where the window 171 and symbol 172 are displayed in the display unit 11 at predetermined positions at the same time when music is played in a television program, the user reads the displayed symbol 172 with the reader/writer 24 so that the music data can be fetched to the information processing terminal 21.

In a case where a URL for accessing a predetermined site is acquired as source data, as shown in a window 181 of FIG. 13, a symbol 182 representative of URL is displayed (processes shown in FIG. 11). As the reader/writer 24 is abutted on the symbol 182 and URL is acquired by the control unit 114, at Step S25 the control unit 114 controls the communication unit 115, accesses the site designated by the acquired URL, and a picture at the accesses site is displayed on the display unit 22.

Since the picture of the site is displayed in the window 181 together with the symbol 182, by reading this symbol 182, the picture of the site may be confirmed at the information processing terminal 21.

As described above, since a user merely reads the displayed symbol with the reader/writer 24, various data can be fetched to the information processing terminal 21 with an intuitive and easy operation.

Next, with reference to flowcharts shown in FIGS. 14 and 15, description will be made on the operation of the information processing system which transfers data from the information processing terminal 21 to the display apparatus 1, as opposed to the description made with reference to FIGS. 11 and 12.

First, with reference to the flowchart shown in FIG. 14, description will be made on processes to be executed by the information processing terminal 21 to transfer data to the display apparatus 1.

Figure 14:
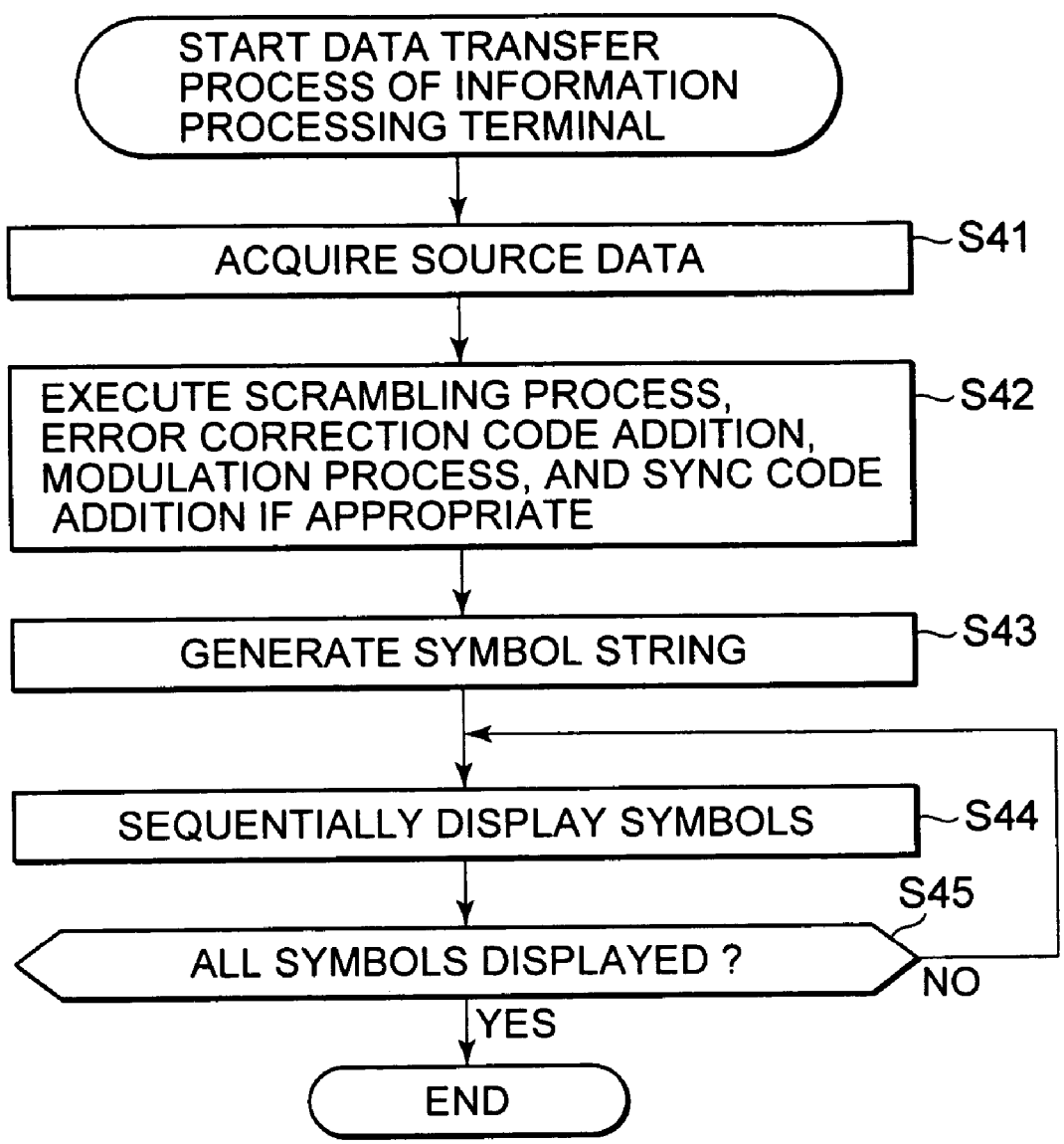
FIG. 14 is a flowchart for explaining a data transfer processing of the information processing terminal.

The processes shown in FIG. 14 are fundamentally similar to those of the display apparatus 1 described with reference to FIG. 11. Namely, at Step S41, the control unit 114 of the information processing terminal 21 acquires source data to be transferred to the display apparatus 1.

For example, when it is instructed by an input to the input unit 117 from a user that predetermined data stored in the memory unit 118 is to be transferred, or in a state that video data or the like acquired via a network is displayed on the display unit 22, when it is instructed that the video data is to be transferred, then the control unit 114 acquires the source data in response to the instruction.

At Step S42, the data processing unit 113 performs a scrambling process, error correction code addition, a modulation process, sync code addition and the like if appropriate, onto the source data supplied from the control unit 114, for each predetermined data unit, to represent the source data by a symbol string.

At Step S43, the symbol processing unit 112 refers to, for example, a conversion table prepared beforehand and generates a symbol string corresponding to the data supplied from the data processing unit 113. The generated symbol string is output to the image signal generating unit 111.

At Step S44, the image signal generating unit 111 generates a video signal for displaying a symbol, in accordance with the data of the symbol string supplied from the symbol processing unit 112, to sequentially display symbols on the symbol display unit 104.

The symbols of the symbol string are sequentially displayed on the symbol display unit 104 by using the same frequency as that used at the display unit 11 of the display apparatus 1, and light representative of the symbol is emitted outside of the reader/writer 24 via the half mirror 102 and the lens 101.

As will be later described, while the front end face 24A of the reader/writer 24 is abutted on the read area formed in the display unit 11, the symbol (light representative of the symbol emitted from the reader/writer 24) displayed at Step S44 is read in the read area (Step S62 shown in FIG. 15).

At Step S45, the video signal generating unit 111 judges whether all symbols of the symbol string representative of the data to be transferred, are displayed on the symbol display unit 104. If it is judged that all symbols are not displayed, the flow returns to Steps S44 whereat symbol display is repeated.

If the video signal processing unit 111 judges at Step S45 that all symbols are displayed, the process is terminated.

Next, with reference to the flowchart shown in FIG. 15, description will be made on a data acquiring process to be executed by the display apparatus 1 in correspondence with the processes shown in FIG. 14.

At Step S61, the control unit 45 of the display apparatus 1 sets a read area in the display unit 11 at a predetermined position. Namely, the control unit 45 forms the read area in the display unit 11 by applying, for example, a bias voltage near 0 V to predetermined pixels (TFT's) (by controlling so as not to apply voltage)

The read area may be formed always fixedly at a predetermined position, or may be formed at a position where a symbol has been displayed with a positive bias voltage being applied.

As the front end face 24A of the reader/writer 24 is abutted on the formed read area and light representative of the symbol displayed on the symbol display unit 104 of the reader/writer 24 is irradiated, at Step S62 the symbol processing unit 52 reads the symbol in accordance with the detection result of the detecting unit 53.

As described earlier, in a case where a leak current is detected from a pixel constituting the read area, it is judged that there is a white area of the symbol in front of the pixel, whereas in a case where the leak current is not detected, it is judged that there is a black area of the symbol in front of the pixel. The symbol processing unit 52 synthesizes the detection results of the pixels constituting the read area to thereby read one symbol.

At Step S63, the symbol processing unit 52 judges whether all symbols are read. If it is judged that all symbols are not read, the flow returns to Step S62 whereat symbols output from the reader/writer 24 are repetitively read. Information of the symbol read by the detecting unit 53 is sequentially output to the symbol processing unit 52.

If it is judged at Step S63 that the symbol representative of the end of the symbol string is detected, the symbol processing unit 52 judges that all symbols representative of the data to be transferred are read, and the flow advances to Step S64.

At Step S64, the symbol processing unit 52 refers to a correspondence table between two-dimensional code patterns and data for decoding the symbol string, and outputs the obtained data to the data processing unit 51.

At Step S65, the data processing unit 51 performs a demodulation process, an error correction process, a descrambling process and the like if appropriate, onto the data supplied from the symbol processing unit 52, to acquire the source data. This enters a state that the source data selected at the information processing terminal 21 is acquired by the display apparatus 1.

At Step S66, the control unit 45 performs processes corresponding to the source data acquired at the data processing unit 51.

Figure 16:
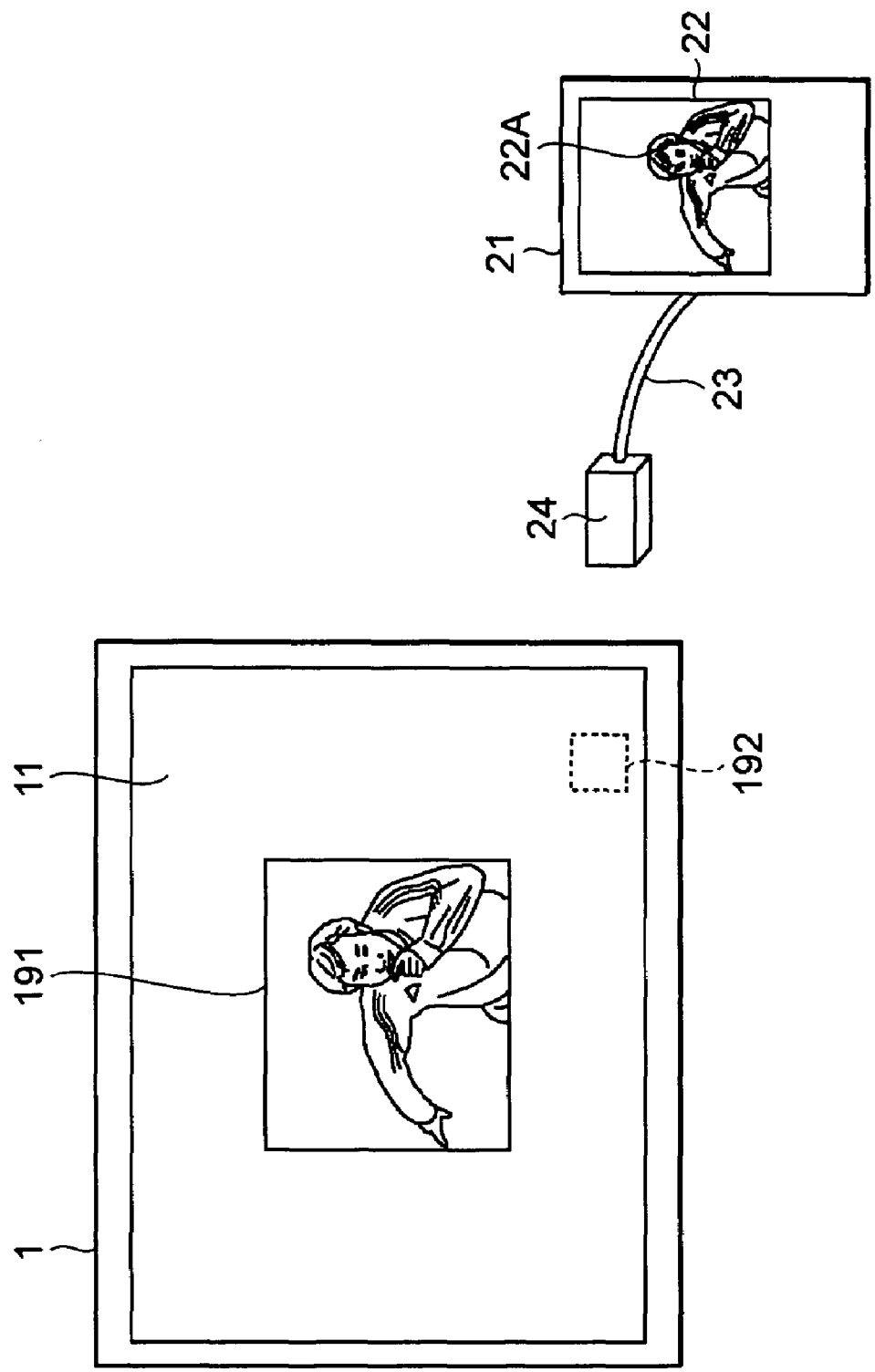
FIG. 16 is a view showing an example of data transferred from the information processing terminal to the display apparatus.

For example, as shown in FIG. 16, a moving image 22A displayed on the display unit 22 of the information processing terminal 21 is selected as the data to be transferred to the display apparatus 1, a symbol string representative of the moving image 22A is generated and light representative of each symbol is sequentially emitted from the reader/writer 24 (At Step S44 shown in FIG. 14).

Figure 15:
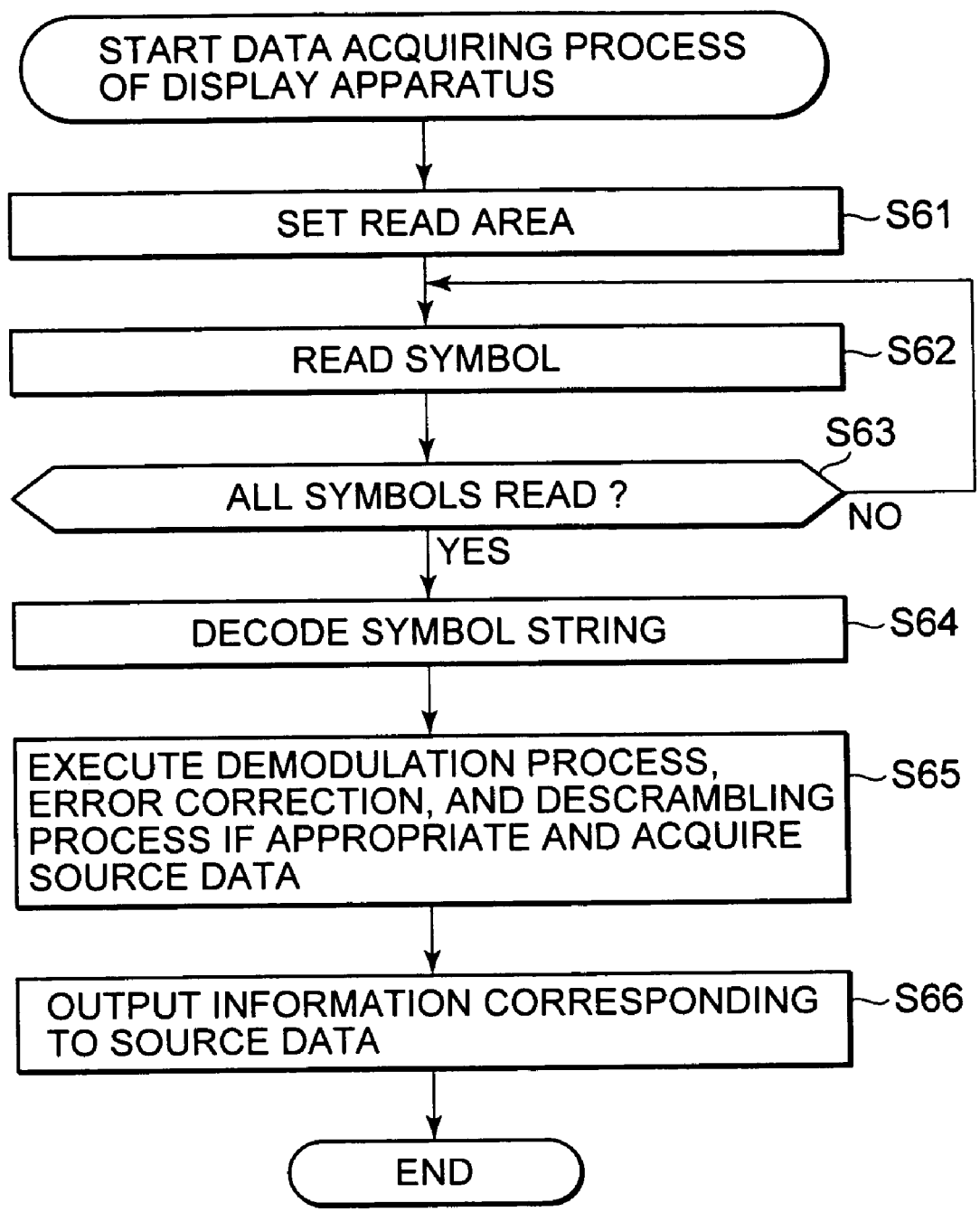
FIG. 15 is a flowchart for explaining a data acquisition processing of the display apparatus executed in correspondence with the processing of FIG. 14.

In a case where the symbol string emitted from the reader/writer 24 is read in the read area 192 formed in a lower right area of the display unit 11 (Step S62 shown in FIG. 15), a window 191 is displayed in which displayed is a moving image corresponding to the source data (data of the moving image 22A) acquired from the read symbol string (at Step S66 shown in FIG. 15).

In this manner, a user can display a designated image in a magnified scale in the display unit 11, by merely designating the image at the information processing terminal 21 and abutting the reader/writer 24 on the read area 192.

For example, in a case where the information processing terminal 21 is a terminal such as PDA, the details of an image is difficult to be confirmed because of a limited size of the display unit 22. However, in the manner described above, an enlarged image can be displayed by transferring the data from the information processing terminal 21 to the display unit 11 so that the details of the image can be confirmed easily.

Similarly, as music data selected at the information processing terminal 21 is transferred to the display apparatus 1, the music data is reproduced at the display apparatus and the reproduced sounds are output from a speaker.

When a URL designated at the information processing terminal 21 is transferred to the display apparatus 1, the site designated by the URL is accessed via the communication unit 43 of the display apparatus 1 and the picture of the accessed site is displayed in the display unit 11.

In the above description, only data is transmitted and received. However, in a case where a command code (instruction information) designating the contents of a process to be executed for acquired data is contained in the symbol string, the apparatus which reads this symbol string performs various processes corresponding to the command code.

Next, with reference to a flowchart shown in FIG. 17, description will be made on the process to be executed by the information processing terminal 21 which displays a symbol string containing a command code and transfers data to the display apparatus 1.

Figure 17:
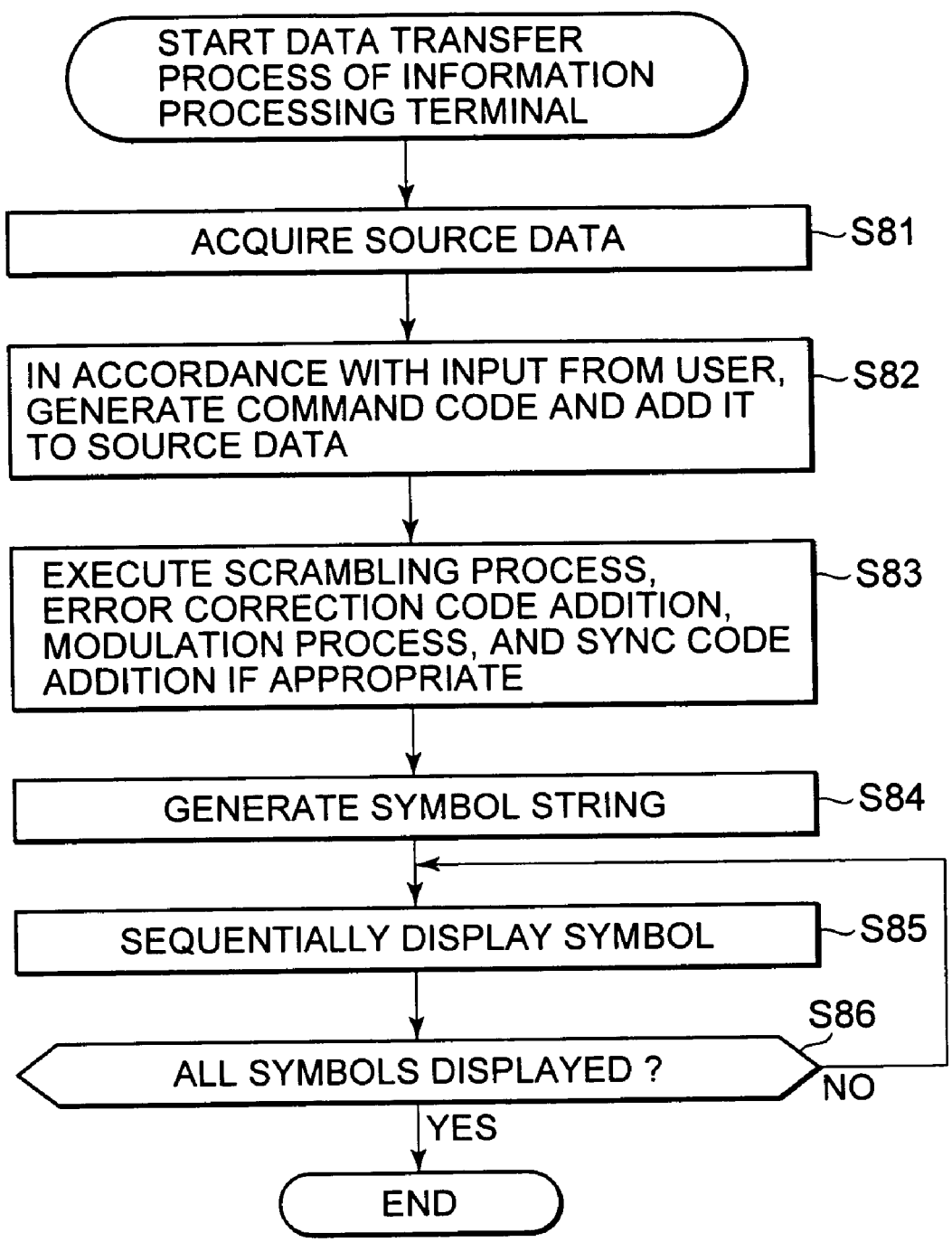
FIG. 17 is a flowchart for explaining a data transfer processing of the information processing terminal.

The processes shown in FIG. 17 are fundamentally similar to those at Steps S41 to S45 shown in FIG. 14 and the detailed description thereof is omitted, excepting a process of generating a command code in accordance with an input from a user and adding it to source data.

Namely, at Step S81, the control unit 114 of the information processing terminal 21 acquires source data, and at Step S82, adds a command code to the acquired source data.

For example, a user instructs to add the command code: including a code instructing the size, display position, display time and the like of a window in which an image of source data transferred together with the command code is displayed; a code instructing to set a key to the source data to be transferred together with the command code, the key allowing only a transfer source (user) to reproduce image at the display apparatus 1; and the like.

At Step S83, the data processing unit 113 performs various processes onto the source data added with the command code. In accordance with the data obtained after the various processes, at Step S84 the symbol processing unit 112 generates a symbol string.

At Step S85, each symbol is sequentially displayed on the symbol display unit 104. When it is judged at Step S86 that all symbols are displayed, the process is terminated.

Next, with reference to a flowchart shown in FIG. 18, description will be made on a data acquiring process to be executed by the display apparatus 1 in correspondence with the processes shown in FIG. 17.

The processes at Steps S101 to S105 are similar to the processes at Steps S61 to S5 shown in FIG. 15, and so the description thereof is omitted.

Namely, a symbol string is read in the read area formed in the display unit 11, and when the source data is acquired, at Step S106 the control unit 45 of the display apparatus 1 extracts a command code from the acquired source data.

In accordance with the extracted command code, at Step S107 the control unit 45 controls the video signal generating unit 47 to control the display of the image corresponding to the source data.

For example, in a case where the extracted code is a code which instructs to display a window in the display unit 11 at a predetermined position and display an image corresponding to the source data in the window, then the control unit 45 determines the display position of the window in accordance with the code.

In a case where the command code also contains a code instructing the size of the window, the control unit 45 operates to display the window at the instructed size and the image corresponding to the source data is displayed therein.

In a case where the extracted code is a code which instructs the period while the image corresponding to the source code is displayed, the control unit 45 operates to continue the display of the image corresponding to the source code until the designated time.

In this manner, as a user determines display settings at the information processing terminal 21, the image can be displayed on the display apparatus 1 in accordance with the settings.

Similarly, if the data to be transferred is music data, the command code contains a code instructing a reproduction volume of the music data, a code instructing a reproduction mode (such as repeat reproduction and shuffle reproduction) or the like. The music data is reproduced at the display apparatus 1 in accordance with the command code.

Figure 19:
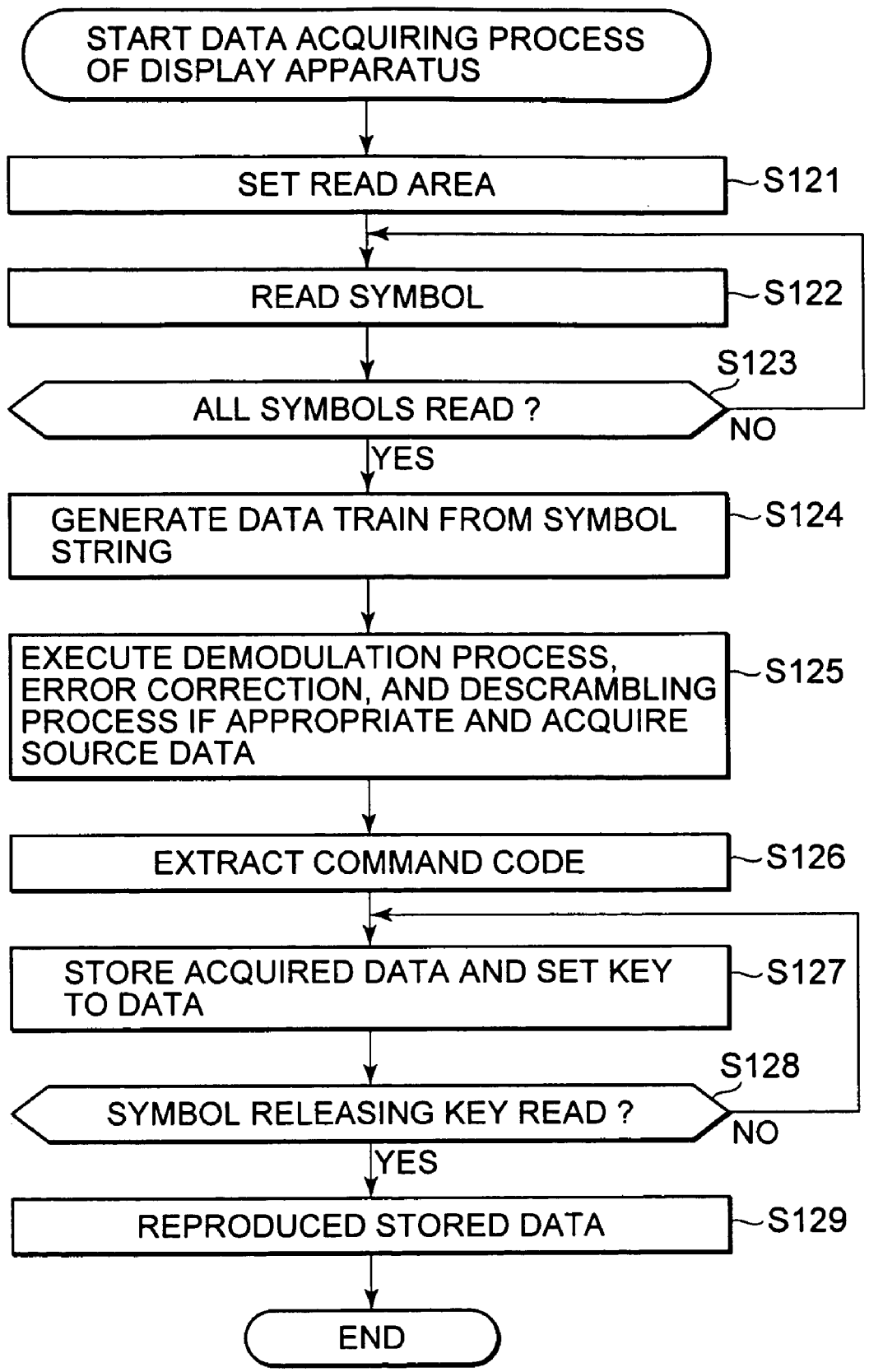
FIG. 19 is a flowchart for explaining another data acquisition processing of the display apparatus executed in correspondence with the processing of FIG. 17.

FIG. 19 is a flowchart illustrating another data acquiring process to be executed by the display apparatus 1 in correspondence with the processes shown in FIG. 17.

In this example, a code instructing that only the person transferred source data to the display apparatus 1 can reproduce it, is transferred as the command code from the information processing terminal 21 to the display apparatus 1 together with the source data.

Figure 18:
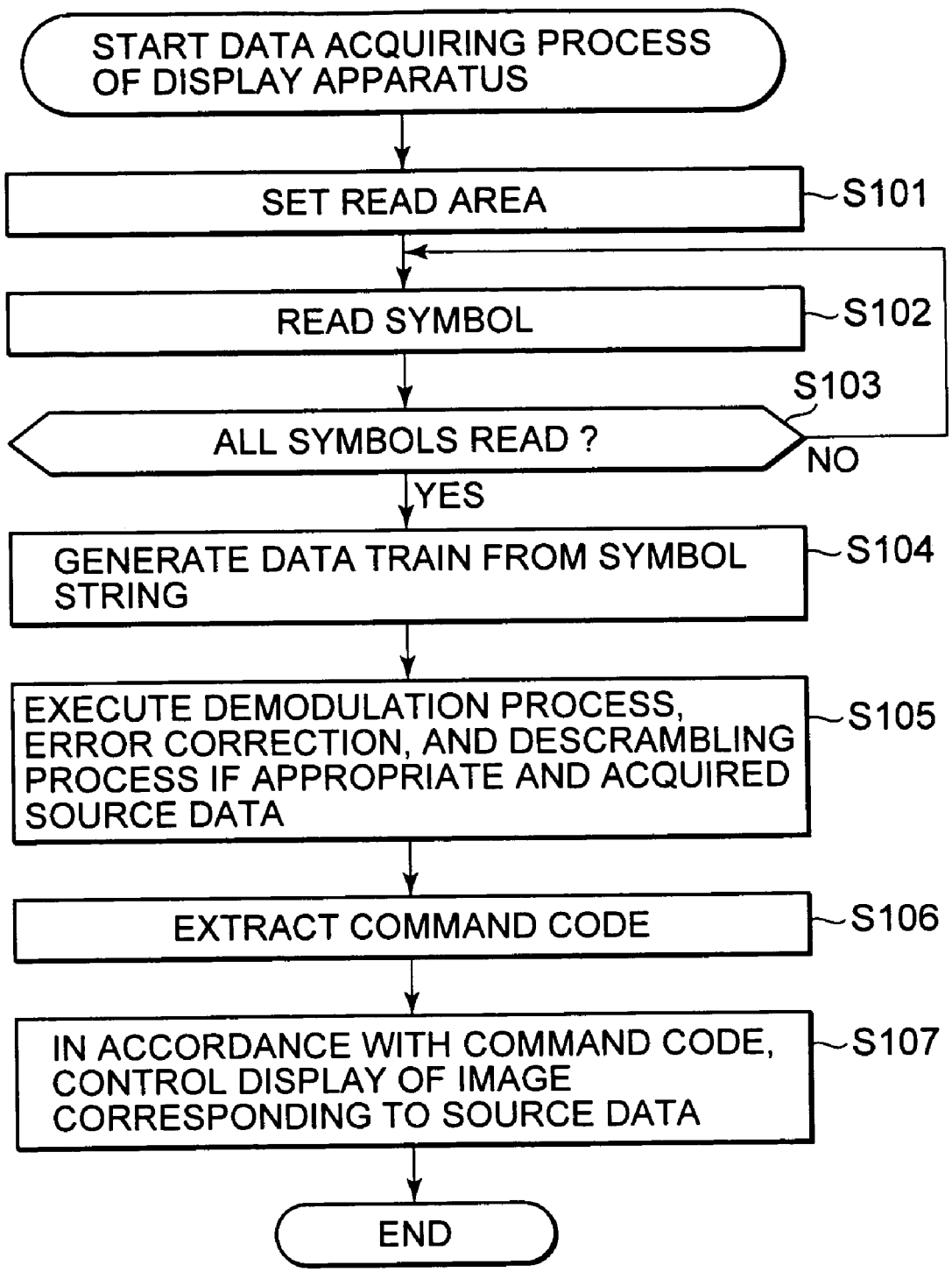
FIG. 18 is a flowchart for explaining a data acquisition processing of the display apparatus executed in correspondence with the processing of FIG. 17.

The processes at Steps S121 to S126 are similar to those at Steps S101 to S106 shown in FIG. 18, and so the description thereof is omitted.

As the source data is acquired from the symbol string read in the read area and the command code is extracted (Steps S121 to S126), at Step S127 the control unit 45 of the display apparatus 1 stores the acquired data in the memory unit 44 and sets a key to the stored data.

For example, the command code supplied from the information processing terminal 21 contains identification information unique to the information processing terminal 21. A symbol capable of solving the key in combination with the identification information is generated and displayed in the display unit 11. A symbol analyzed by the combination of the symbol displayed in the display unit 11 and the identification information of the information processing terminal 21 is stored in the memory unit 44 in correspondence with data instructed to be stored.

Figure 20:
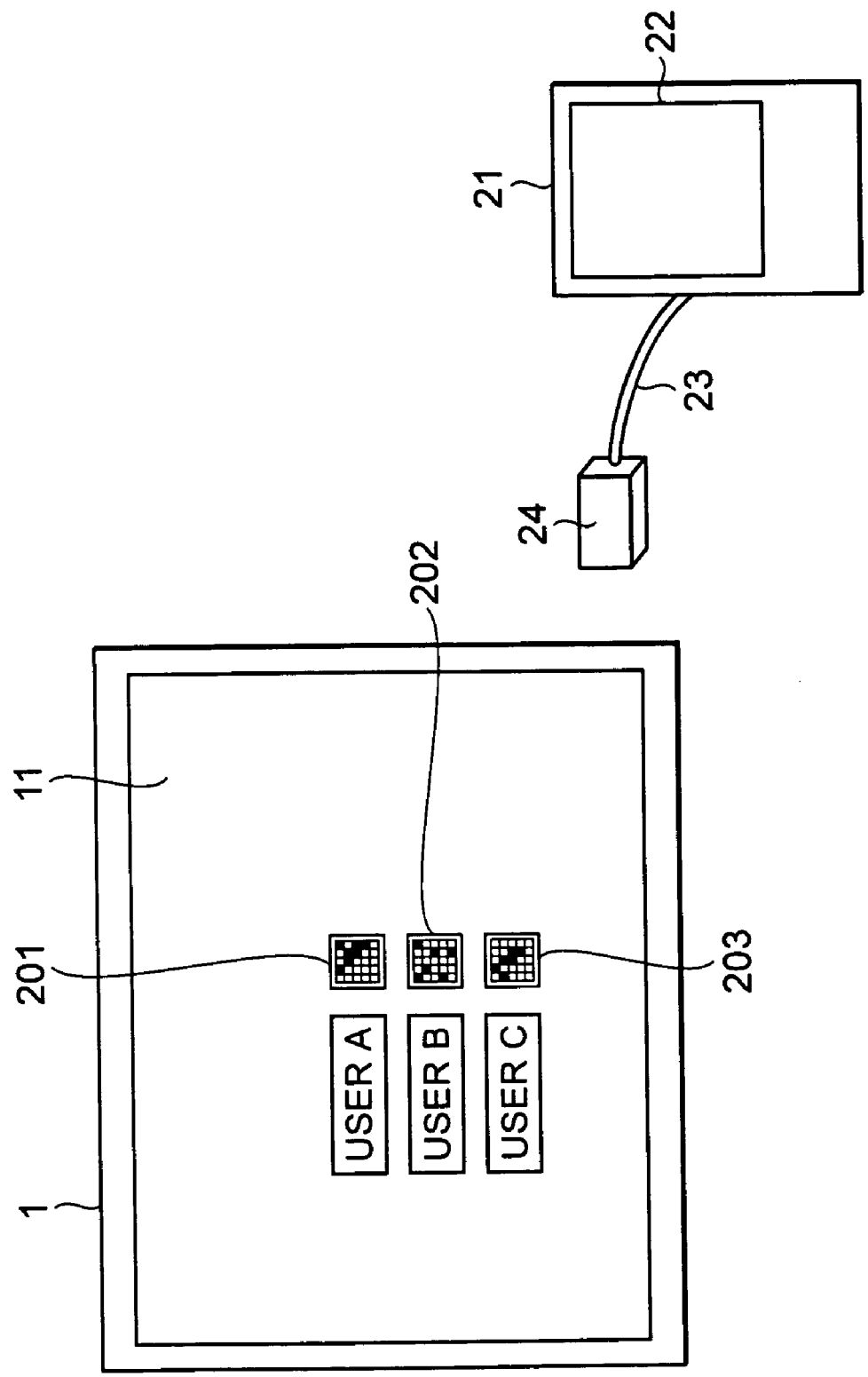
FIG. 20 is a view showing a display example at the time data is transferred from the information processing terminal to the display apparatus.

As a key is set to the data transferred from the information processing terminal 21, a picture such as the one shown in FIG. 20 is displayed in the display unit 11.

For example, when data is transferred from the information processing terminal 21 used by a user A and the command code instructs to set a key to the data, the control unit 45 displays a symbol 201 from which a decoding symbol can be generated in combination with the identification information of the information processing terminal 21, in an area to the right of a user name (user A). The user name is displayed in accordance with information contained in the command code.

When the data transferred to and stored in the display apparatus 1 is to be reproduced, the user reads the symbol 201 with the reader/writer 24 and makes the information processing terminal 21 generate the decoding symbol for decoding the key.

For example, since the read area is formed in a predetermined period at a position where the symbol 201 is displayed (since the polarity of the bias voltage applied to the pixels on which the symbol 201 is displayed is changed at the predetermined period), the user inputs the decoding symbol generated at the information processing terminal 21 to the newly formed read area to thereby reproduce (output) the stored data.

The example shown in FIG. 20 also indicates that a key is set to the data transferred from the terminal used by a user B and the data transferred from the terminal used by a user C.

Instead of periodically changing the symbol display and the formation of the read area, the read area may be set always near the symbol 201 shown in FIG. 20.

Reverting to the description with reference to FIG. 19, at Step S128 the control unit 45 judges from outputs of the data processing unit 51 whether the decoding symbol is read from the read area, and stands by until it is judged that the decoding symbol is read. As described above, when the decoding symbol generated at the information processing terminal 21 is input to the read area, data representative of the decoding symbol detected at the detecting unit 53 is supplied to the control unit 45 via the symbol processing unit 52 and data processing unit 51.

In a case where it is judged at Step S128 that the decoding symbol is supplied, the flow advances to Step S129 whereat the control unit 45 reads the data stored in correspondence with the supplied decoding symbol from the memory unit 44 and reproduces it. For example, in a case where the stored data is video data, a corresponding image is displayed in the display unit 11, whereas if the stored data is music data, the music data is reproduced.

As described above, the stored data can be reproduced by reading the symbol displayed near the user name with the reader/writer 24 and inputting the decoding symbol generated correspondingly to the display apparatus 1. Therefore, the user can store the data and instruct to reproduce it by an intuitive operation.

As shown in FIG. 20, in the state that predetermined data is transferred from the users A to C to the display apparatus 1, even if the user A reads the symbol 202 (the symbol with which the decoding symbol can be generated by combining it with the identification information of the user B) with the reader/writer 24 of the information processing terminal 21, the user A cannot reproduce the data stored by the user B and set with the key, because the identification information of the user B is not provided at the information processing terminal 21.

It is therefore possible to prevent the third party from using the data stored by a user himself. In the above description, although the decoding symbol is generated by using the terminal identification information and the displayed symbol, key setting and the decoding algorithm may be changed as desired.

Figure 21:
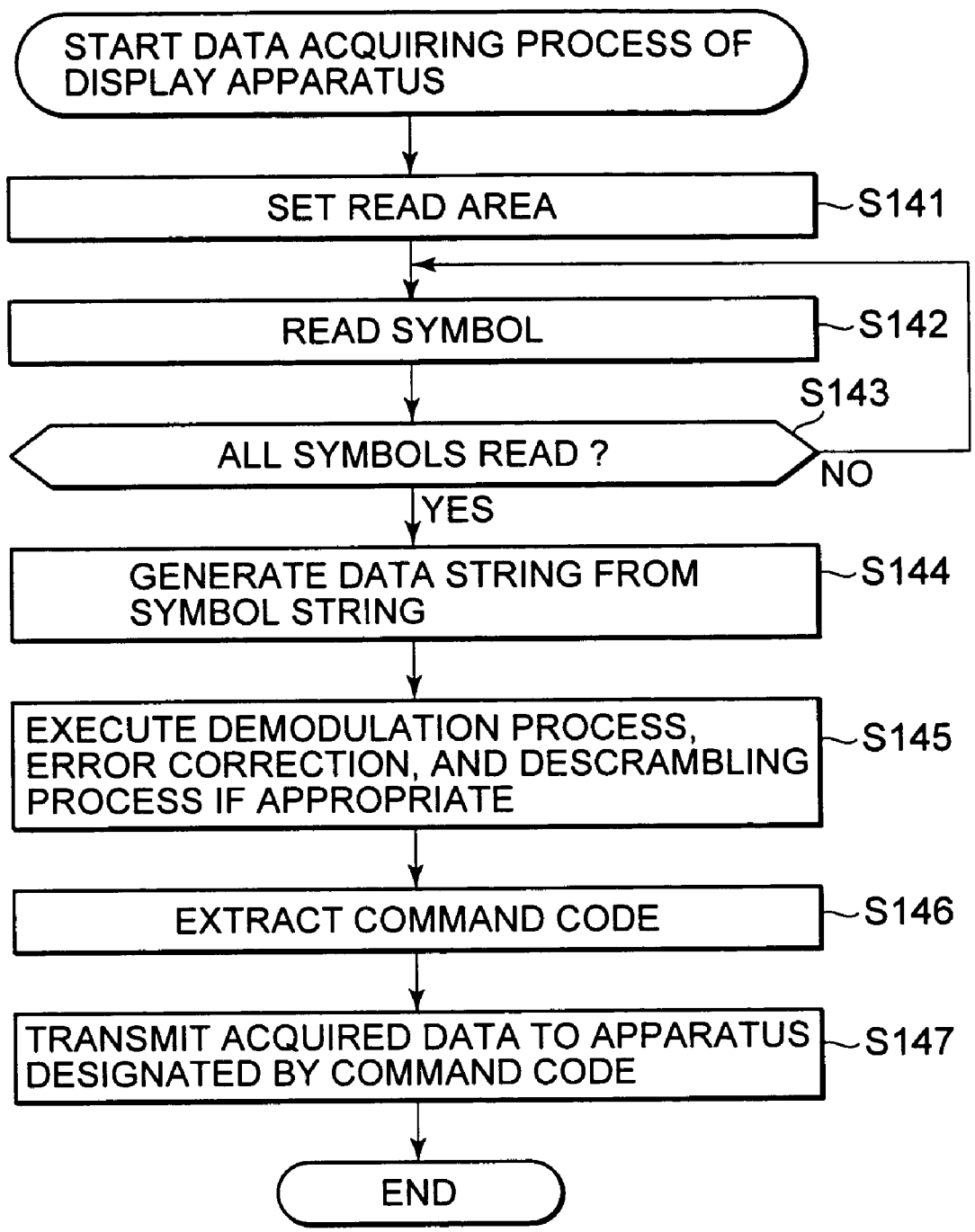
FIG. 21 is a flowchart for explaining still another data acquisition processing of the display apparatus executed in correspondence with the processing of FIG. 17.

Next, with reference to a flowchart shown in FIG. 21, description will be made on still another data acquiring process to be executed by the display apparatus 1 in correspondence with the processes shown in FIG. 17.

In this example, a code instructing to transmit data to a designated apparatus is transferred as the command code from the information processing terminal 21 to the display apparatus 1. For example, an address as the information for designating an apparatus is contained in the command code. This command code is transferred together with the data to be transmitted to the apparatus designated by the address.

The processes at Steps S141 to S146 are similar to those at Steps S101 to S106 shown in FIG. 18, and so the description thereof is omitted.

When source data is acquired from the symbol string read from the read area and the command code is extracted (Steps S141 to S146), at Step S147 the control unit 45 of the display apparatus 1 transfers the acquired data to the apparatus designated by the command code.

For example, in a case where the command code contains an address input at the information processing terminal 21 and designating an apparatus to be connected via a network, the control unit 45 controls the communication unit 43 and transmits the data transferred from the information processing terminal 21 to the apparatus designated by the address.

Therefore, even in a case where the information processing terminal 21 is not provided with the communication unit 115, a user can transmit data to another apparatus via the display apparatus 1 only by designating a transmission destination apparatus at the information processing terminal 21 and abutting the reader/writer 24 on the display unit 11.

In the above description, although the command code contains information for controlling an image display, information for instructing to set a key to the transmitted data, and information for designating a transmission destination of data, various other information may be contained in the command code.

For example, information representative of a data attribute may be transferred together with data, and an apparatus acquired the command code may perform processes corresponding to the command code. In a case where the information representative of the data attribute contains a priority order of data, the display order or the display size of data is controlled in accordance with the priority order. In a case where the information representative of the data attribute contains user preference information (viewing history information), the display order, position and the like are controlled in accordance with the user preference information.

In the above description, although the read area is fixedly formed at the predetermined position of the display unit 11 or periodically formed at the position where the symbol is displayed, it may be moved following the scanning of the display unit 11.

Figure 22:
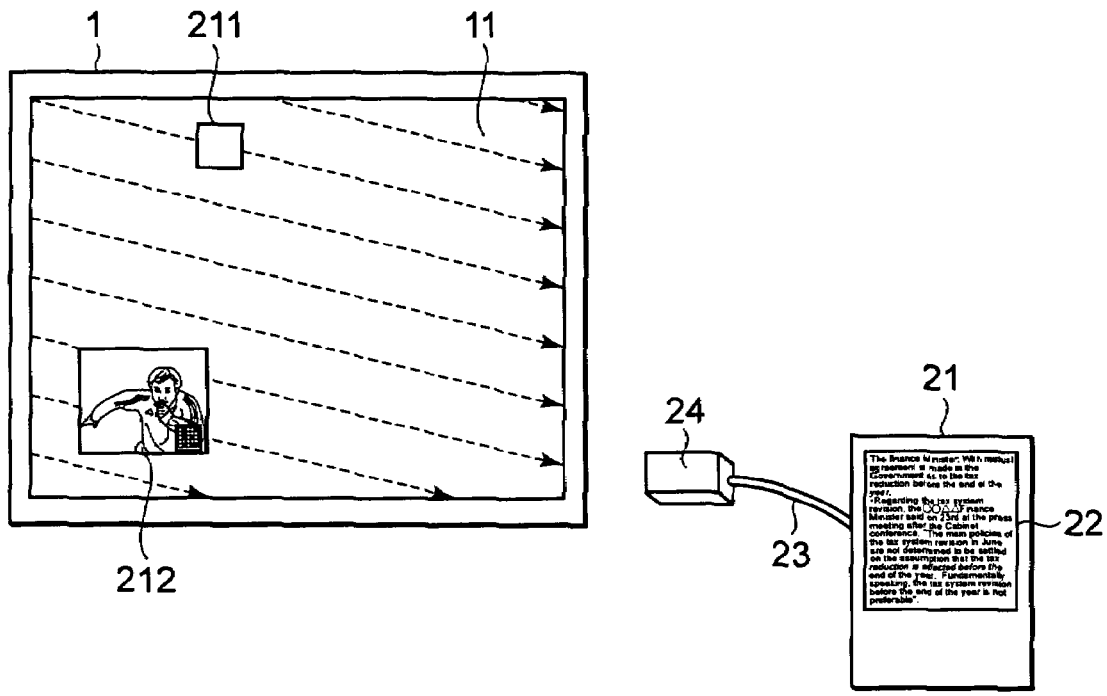
FIG. 22 is a view of an example in which a read area is moved.

For example, as indicated by dotted lines in FIG. 22, if the screen scanning of the display unit 11 is performed at a period of ⅟₆₀ sec from the upper left of the screen, a read area 211 moves by changing the pixels to which a voltage, for example, near 0 V is applied, synchronously with the scanning. In this case, scanning at the period of ⅟₆₀ sec is performed to judge whether the reader/writer 24 is abutted on the display unit 11.

In a case where a window 212 is already displayed in the display unit 11, since one pixel (pixel in the window 212) cannot function as both the image display and the read area at the same time, scanning of the read area 211 is performed in an area other than the area where the window 212 is displayed.

Figure 23:
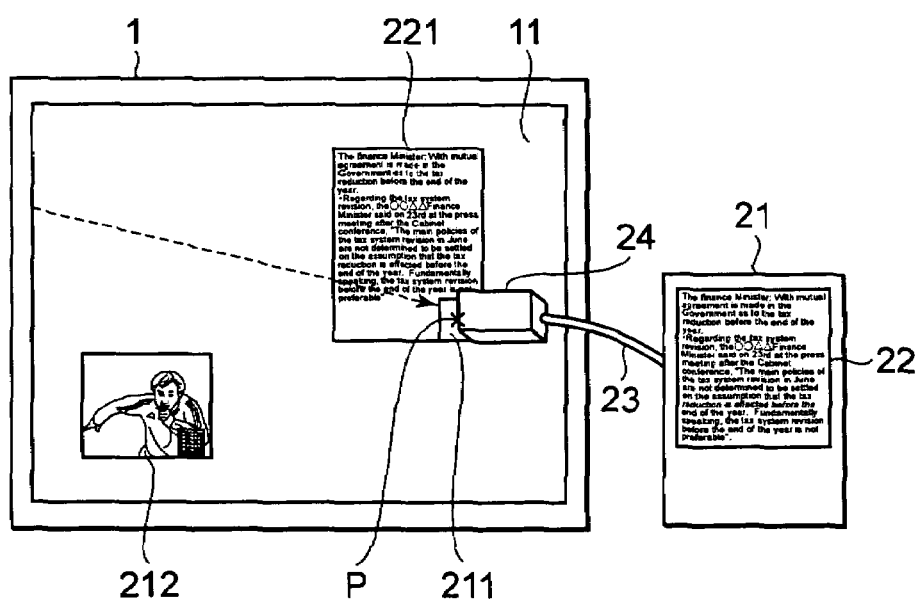
FIG. 23 is a view of a display example in which data transfer is carried out in the read area of FIG. 22.

For example, in FIG. 23, in a case where the reader area 211 scans a position P while a user abuts the reader/writer 24 on the position P in the display unit 11, the symbol output from the reader/writer 24 is read by the read area 211, and data selected by the information processing terminal 21 is transferred to the display apparatus 1.

When the data is transferred to the display apparatus 1, a window 221 is displayed in such a manner that the read area 211 is positioned, for example, at the right corner, and an image corresponding to the fetched data is displayed in the window 221.

An event that the reader/writer 24 is abutted on the surface of the display unit 11 (whether data transfer is performed) is periodically scanned in this manner, and the window is displayed at the position using the abutted position as a reference position. Therefore, a user can transfer data to the display apparatus 1 by abutting the reader/writer 24 on the display unit in an area where an image is not displayed, e.g., at a position to which the reader/writer 24 can be moved easily or at a position where a window is to be displayed, in other words, at a desired position.

Next, with reference to a flowchart shown in FIG. 24, description will be made on the processes to be executed by the display apparatus 1 in which a presence/absence of an input from the reader/writer 24 is scanned by the read area as shown in FIGS. 22 and 23 and when the reader/writer 24 is abutted on the display unit, data is acquired from the information processing terminal 21.

At Step S161, the control unit 45 of the display apparatus 1 sets a read area by applying a bias voltage, for example, near 0 V to predetermined pixels to thereafter advance to Step S162 whereat an area where an image is not displayed is scanned by the set read area.

At Step S163, the control unit 45 judges whether the reader/writer 24 is abutted on the surface of the display unit 11 and a symbol input is detected by the read area. In a case where it is judged that the symbol input is not detected, the flow returns to Step S162 to repeat scanning.

On the other hand, in a case where it is judged that generation of a leak current is detected and a symbol input is detected, the control unit 45 stops the motion of the read area, to thereafter advance to Step S164 whereat the symbol is read.

Namely, at Steps S164 to S167, a symbol reading process similar to that described earlier is executed to acquire source data.

After the source data is acquired, at Step S168 the control unit 45 displays a window by using the abutted position of the reader/writer 24 as a reference position, and an image corresponding to the transferred data is displayed in the window.

With the above processes, a user can transfer data to the display apparatus 1 at the desired position of the display unit easily, without abutting the reader/writer 24 in the read area fixedly set at a predetermined position.

In the example shown in FIGS. 22 and 23, for the convenience of description, the read area is formed having a relatively broad area and moved. Instead, a read area constituted of one pixel may be scanned sequentially.

In this case, when a symbol input is detected by one scanning pixel, the read area is enlarged to a predetermined area around the detected position (by changing the polarity of pixels around the detected position), and this newly set read area reads a symbol emitted from the reader/writer 24.

Since only one pixel is used at most which is sufficient for detecting a presence/absence of an input from a user, an image can be displayed on all other pixels. Even in a case that an input from a user is sequentially scanned, a broader area can be used as a display area.

Figure 25:
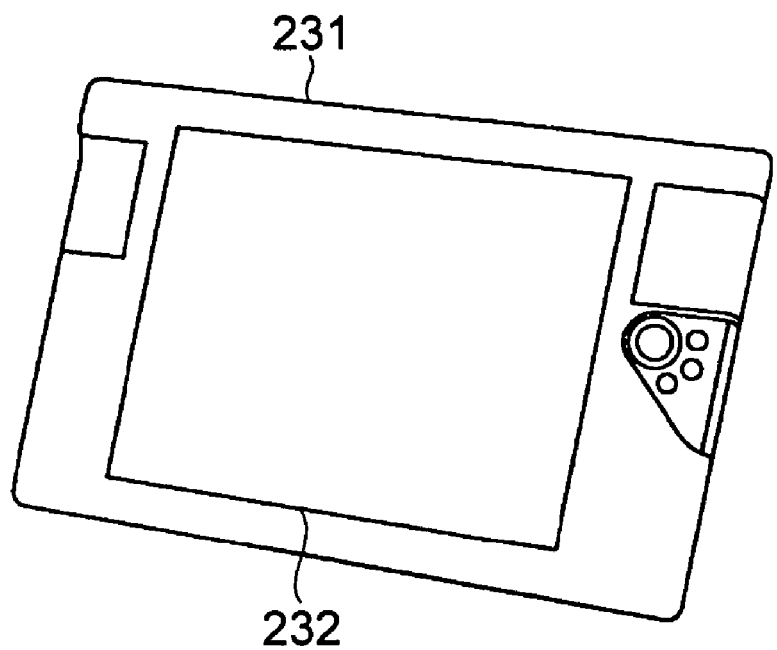
FIG. 25 is a view showing an example of external structure of the information processing terminal.

In the above description, although the reader/writer 24 for reading/writing a symbol is connected to the information processing terminal 21 via the cable 23, it is not necessary that the information processing terminal 21 should have the reader/writer 24, if the display unit 22 is made of a display device having TFT disposed in each pixel like the display unit 11 of the display apparatus 1, and not only can display an image by controlling the polarity but also can drive as a sensor FIG. 25 shows an outer appearance of an information processing terminal 231 with a display device having TFT disposed in each pixel like the display unit 11 of the display apparatus 1.

Even in such a case where a reader/writer is not provided, data transmission/reception can be performed between the display apparatus 1 and the information processing terminal 231 in the manner described earlier by abutting a display unit 232 of the information processing terminal 231 on the display unit 11 of the display apparatus 1 or moving close to the display unit 11.

Namely, a user can transfer data from the information processing terminal 231 to the display apparatus 1 by making the read area formed in the display unit 11 of the display apparatus 1 read the symbol displayed on the display unit 232 of the information processing terminal 231.

In a manner opposite to the previous description, a user can transfer data from the display apparatus 1 to the information processing terminal 231 by reading a symbol displayed in the display unit 11 of the display apparatus by the read area of the display unit 232 which is applied with, for example, a bias voltage near 0 V and operates as a sensor for detecting external light.

The information processing terminal 231 has a structure a user can change the position and direction easily.

Figure 26:
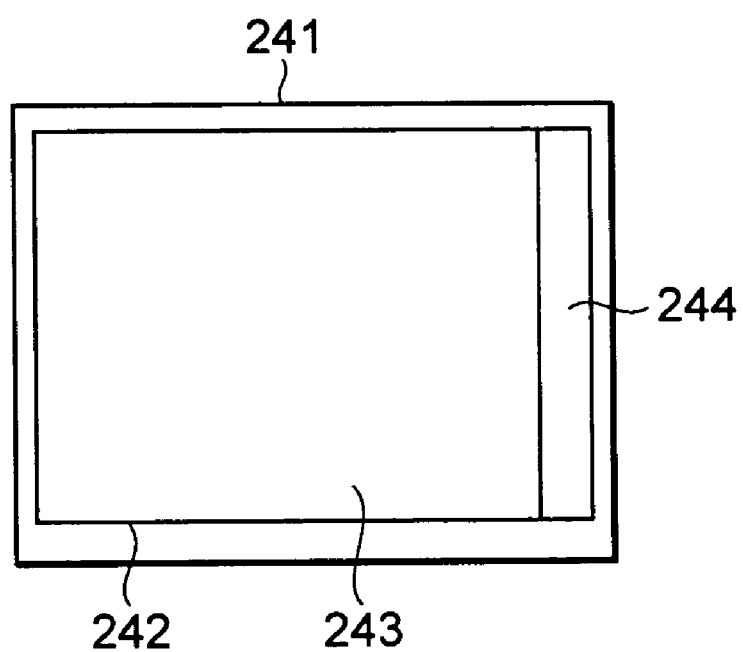
FIG. 26 is a view showing an example of external structure of the display apparatus.

In the above description, the display unit 11 of the display apparatus 1 is an EL display or an LCD having TFT disposed in each pixel. Instead, as shown in FIG. 26, an area 243 in a display unit 242 may be made of a plasma display panel (PDP) and an area 244 may be a hybrid type LCD display having TFT disposed in each pixel.

In this case, in a case where an image only is to be displayed on the display apparatus 241 (a case where an externally input symbol is not detected), the image is displayed in the whole area of the display unit 242 including the PDP area 243 and the LCD area 244. If a read area for detecting an externally input symbol is necessary, a bias voltage, for example, near 0 V, is applied to pixels in a predetermined area of the area 244 to form the read area.

In this manner, the display apparatus can have a larger screen capable of transmitting and receiving various data more easily in the manner described earlier, as compared to a case that the whole display unit 242 is made of an EL display or an LCD with TFT disposed in each pixel.

An image may be displayed only in the PDP area 243, and photosensors for detecting a presence/absence of external light may be disposed in an array in the whole area 244. In this case, an image is not displayed in the area 244.

Photosensors may be disposed at the border of the display apparatus (in an area where a display unit is not formed) or on the side wall of the display apparatus, to detect a symbol. A compact TFT display (an EL display or an LCD having TFT disposed in each pixel) may be used for reading/writing a symbol.

Figure 27:
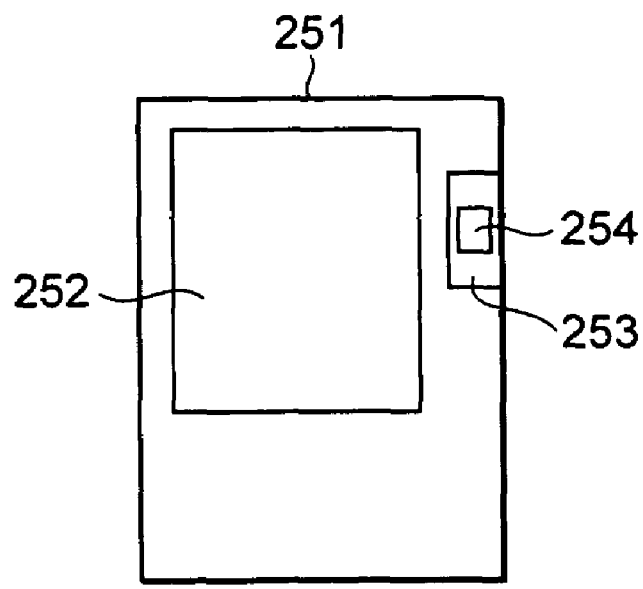
FIG. 27 is another view showing an example of external structure of the information processing terminal.

In a case where a compact TFT display for reading/writing a symbol is mounted on an information processing terminal, an outer appearance thereof has the structure such as shown in FIG. 27.

An information processing terminal 251 shown in FIG. 27 has a display unit 252 mounted on a front housing and a reader/writer unit 253 which is mounted near the right of the display unit 252 and can freely rotate about an axis of a vertical direction in FIG. 27. A TFT display 254 is mounted in the reader/writer unit 253.

For example, in a case of transferring data to an external apparatus by using symbols, the symbols are sequentially displayed on the TFT display 254 and light corresponding to the symbols are irradiated toward outside. In a case of detecting a symbol displayed on the external apparatus, each pixel of the TFT display 254 is applied with a bias voltage, for example, near 0 V to operate the TFT display 254 as photosensors.

As the reader/writer unit 253 is mounted rotatably on the housing of the information processing terminal 251, the front surfaces of the display unit 252 and the TFT display 254 can be directed toward different directions. While confirming an image on the display unit 252, a user can select data to be transferred and can transfer data from the TFT display 254 directed toward the direction opposite to that of the display unit 252.

Figure 24:
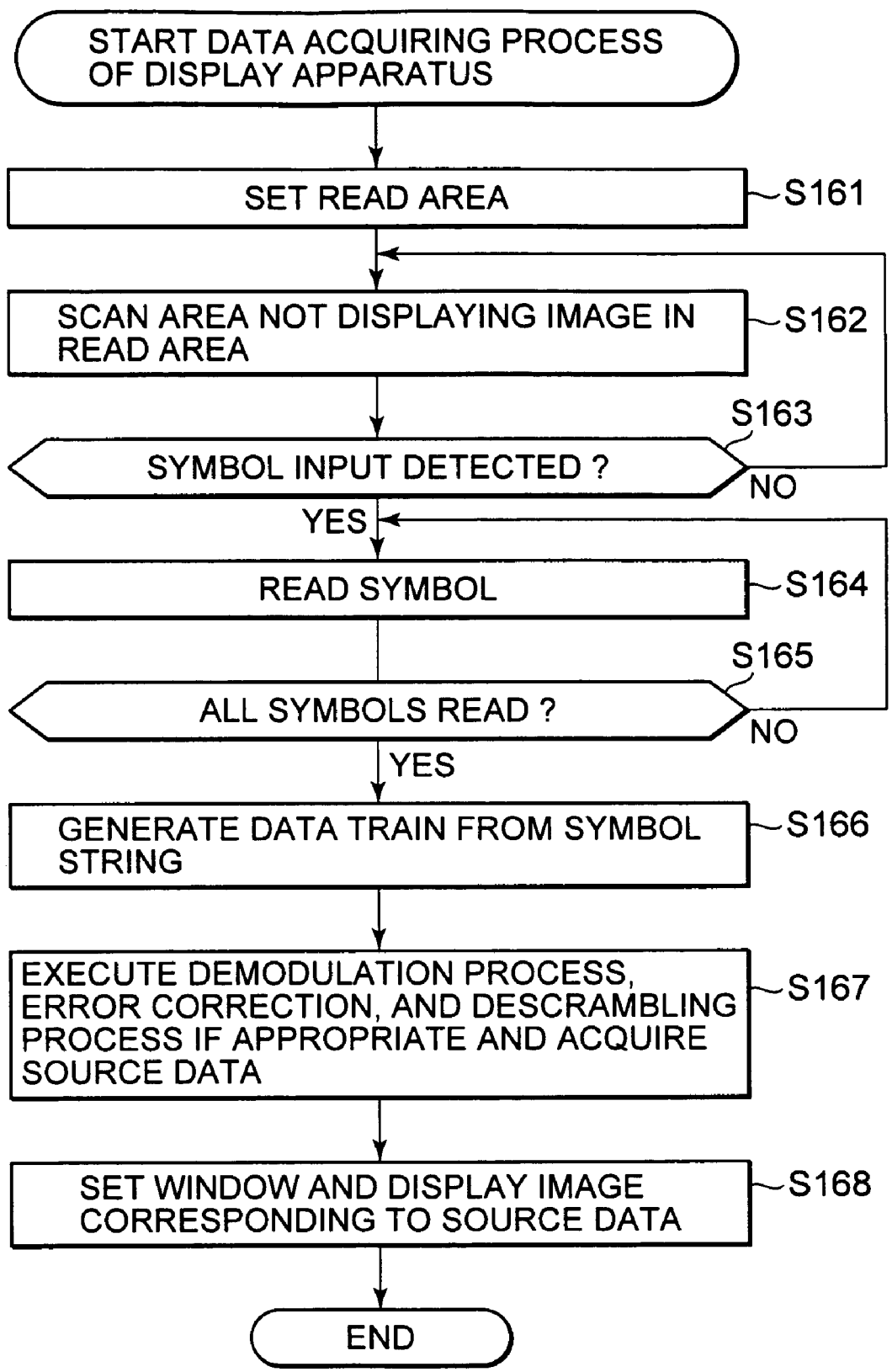
FIG. 24 is a flowchart for explaining a data acquisition processing of the display apparatus of FIG. 22.
Figure 28:
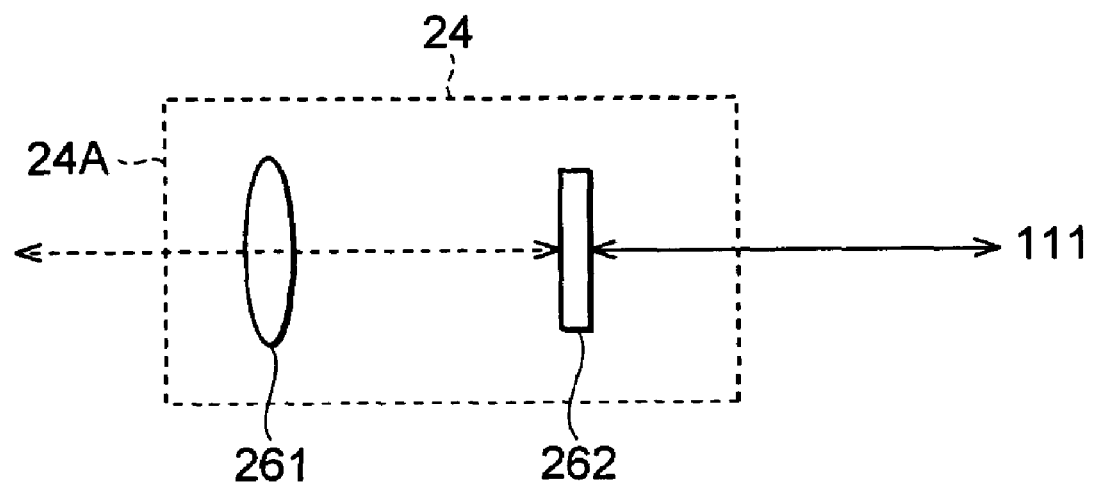
FIG. 28 is a view showing another structural example of the reader/writer of FIG. 1.

As shown in FIG. 28, a compact TFT display 262 may be disposed in the reader/writer 24 shown in FIG. 24 to display and detect a symbol.

In the above description, even LCD having TFT disposed in each pixel can be operated as a sensor for detecting external light by applying a bias voltage, for example, near 0 V. If, however, there is a fear that an erroneous detection of external light is made by light from a back light or an externally irradiated symbol cannot be detected, an output of the back light may be turned off only during the period while external light is detected.

In this manner, even LCD having TFT disposed in each pixel can operate as a sensor for detecting external light without adversely affected by the back light, and various data can be transmitted/received by using symbols.

Data transmission/reception to be performed in the manner described earlier can be executed by various information processing terminals having the display unit, such as a personal computer, a portable phone, a PDA, a television receiver, a music player, a digital camera and a video camera.

A switching operation between image display and external input detection will be described more specifically.

Figure 29:
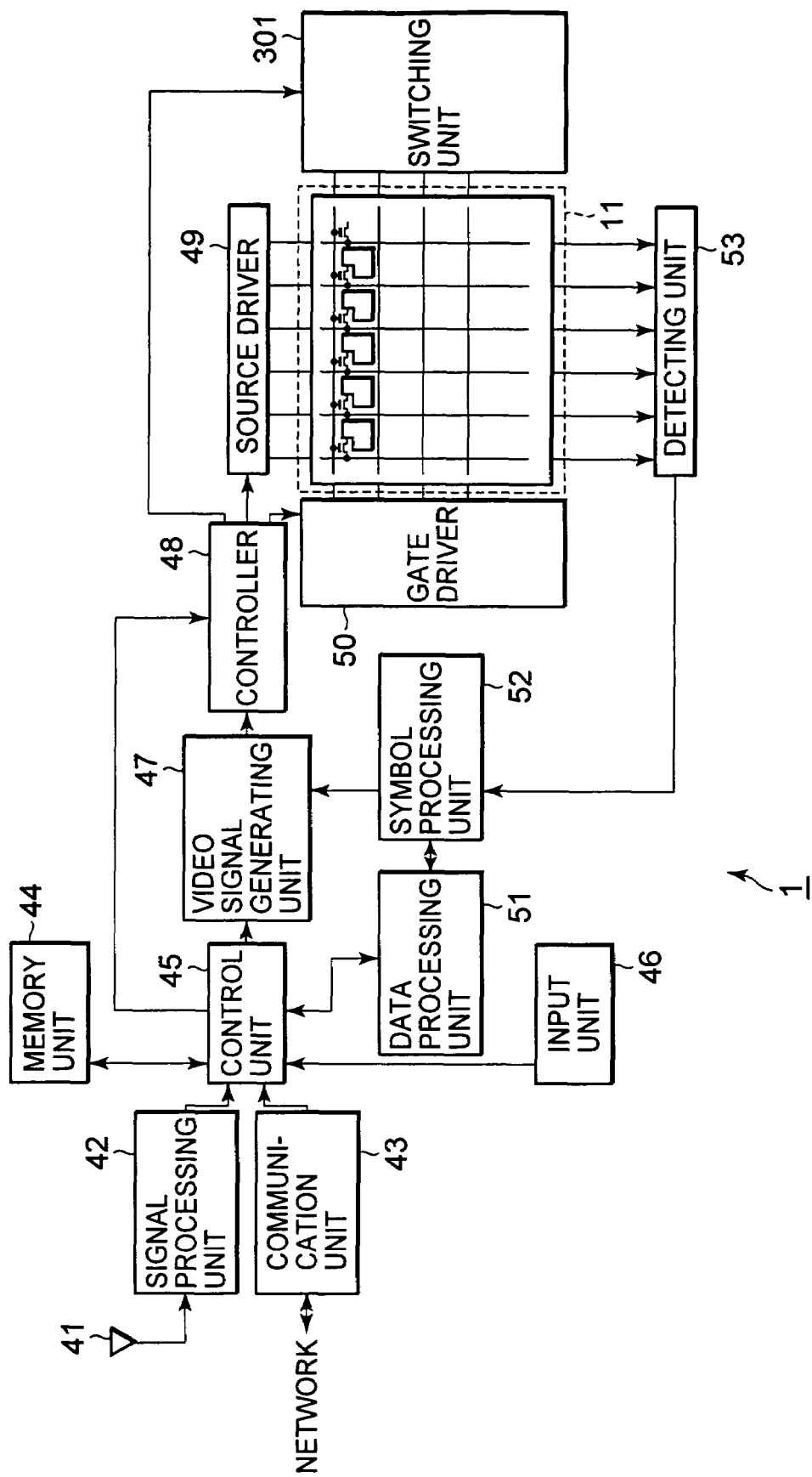
FIG. 29 is a block diagram showing another structural example of the display apparatus.

FIG. 29 is a diagram showing another example of the structure of the display apparatus 1. Like elements to those shown in FIG. 3 are represented by identical reference numerals and the description thereof is omitted where appropriate.

A switching unit 301 turns on and off of a switch (TFT) disposed in each pixel, under the control of a controller 48, to drive each pixel as a pixel for displaying an image or a pixel for detecting an external input.

In the structure described earlier, switching a pixel between a pixel for displaying an image and a pixel for detecting an external input is performed by controlling the polarity of voltage applied to the gate electrode of TFT. In this example, switching is performed using switches of the switching unit 301. In response to on/off of a switch of the switching unit 301, the polarity of voltage applied to the EL element disposed in each pixel is controlled.

In the following, a set of pixels RGB is called a "pixel" and each pixel constituting RGB is called a "sub-pixel".

Figure 30:
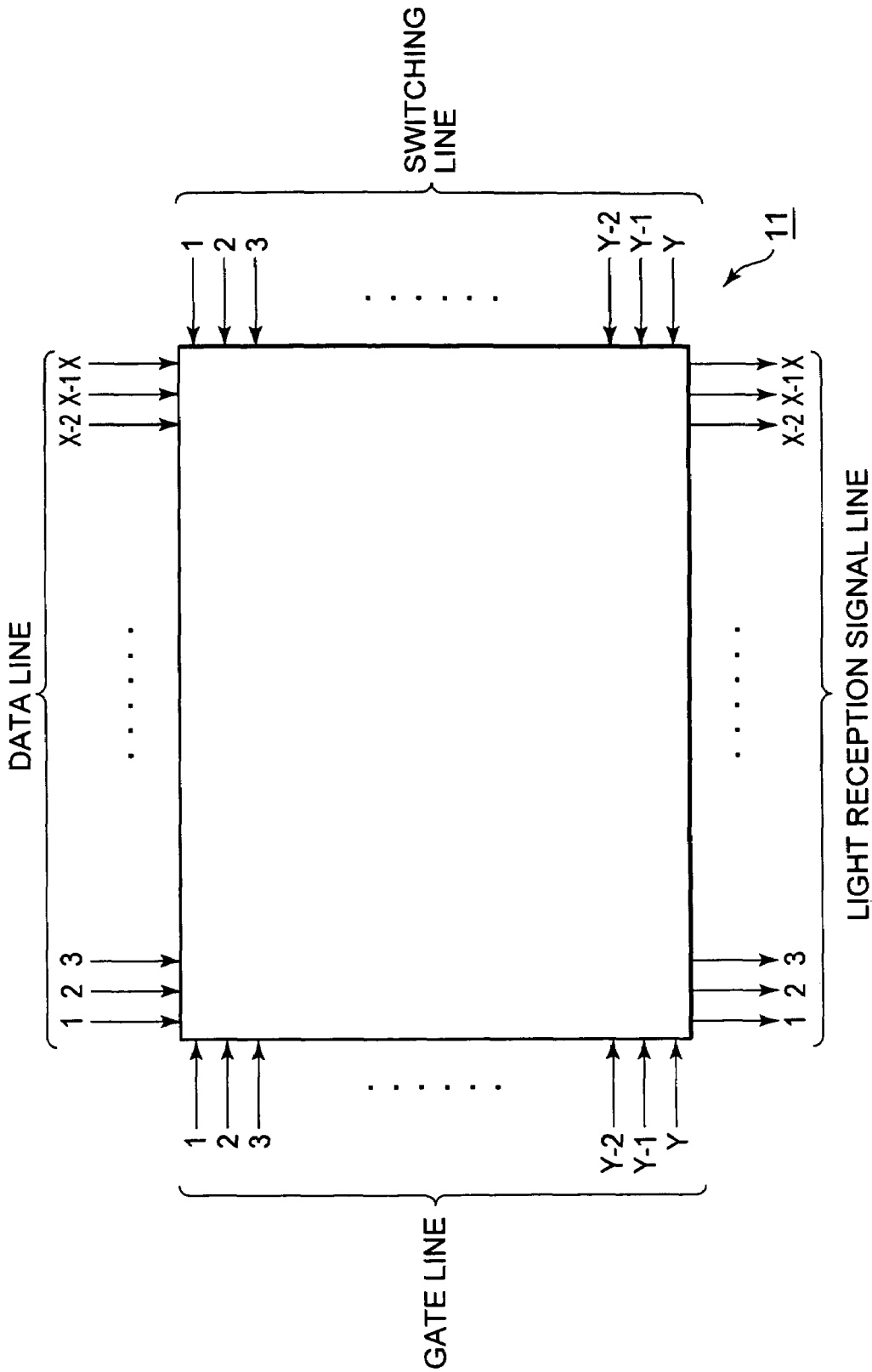
FIG. 30 is a diagram showing an example of signal lines connected to a display unit of FIG. 29.

FIG. 30 is a diagram showing an example of signal lines connected to the display unit 11 shown in FIG. 29.

In the example shown in FIG. 30, X data lines and X received light signal lines 1 to X from the left are disposed, and Y gate lines and Y switching lines 1 to Y from the upper are disposed. For example, in a case where the display unit 11 is a display of an eXtended Graphics Array (XGA) size, the value X is 1024×3 (RGB) and the value Y is 768.

The source driver 49 shown in FIG. 29 supplies a signal corresponding to a display image to each sub-pixel via the data line (source line), and the gate driver 50 controls on/off of TFT's of pixels in each row via the gate line.

The detecting unit 53 detects via the received light signal line a received light signal representative of leak current generated in a sub-pixel for detecting an external input. The switching unit 301 drives via a switching line each sub-pixel as a sub-pixel for displaying an image or as a sub-pixel for detecting an external input.

In a case where all of three sub-pixels constituting one pixel do not detect an external input but only one sub-pixel, e.g. red (R) sub-pixel among three sub-pixels constituting one pixel, the number of received light signal lines is X, one line for each pixel.

As will be later described, since the light reception characteristics are different for each of RGB, only the sub-pixel of the EL element having the good light reception sensitivity may be used not only for displaying an image but also for detecting an external input.

Figure 31:
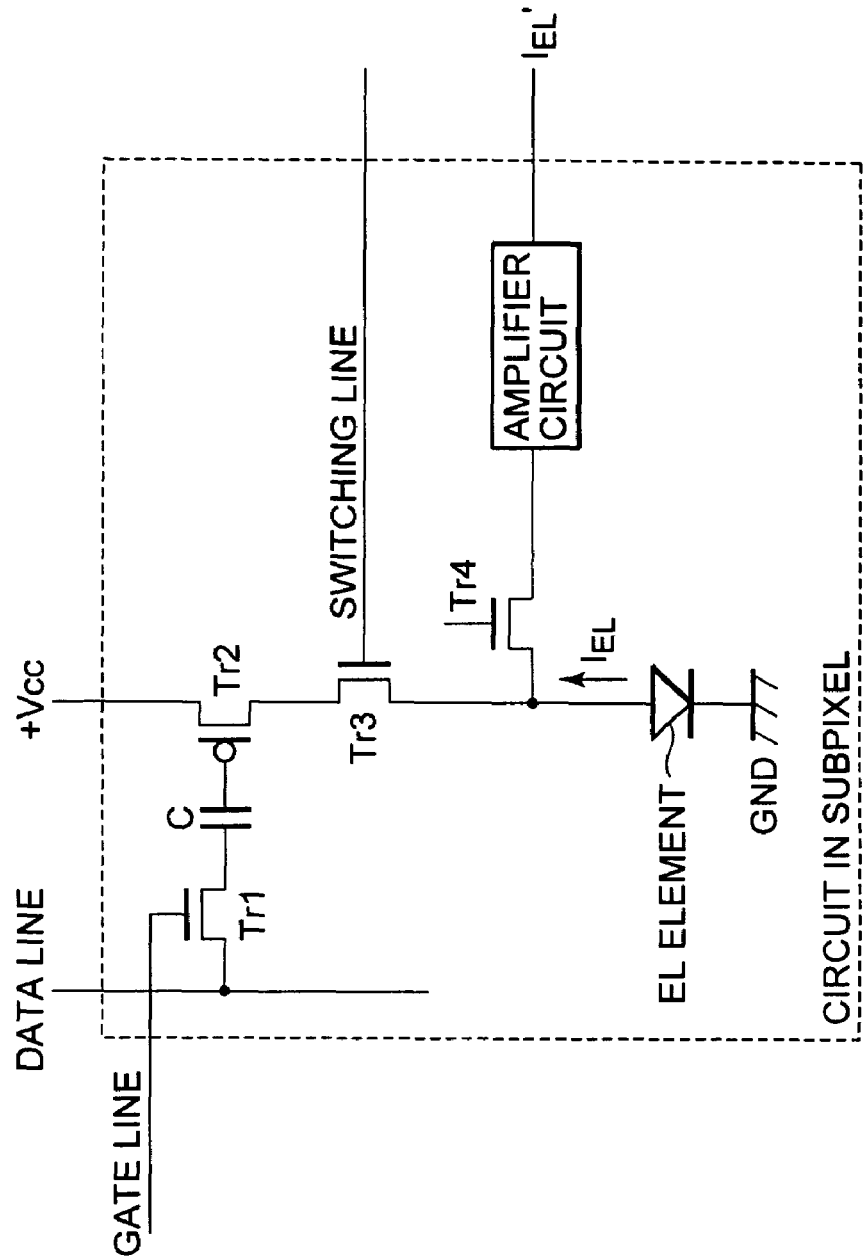
FIG. 31 is a diagram showing an example of a circuit disposed in a sub-pixel constituting the display unit of FIG. 29.

FIG. 31 is a diagram showing an example of a circuit (a circuit within in a dotted line frame) of a sub-pixel used not only for displaying an image but also for detecting an external input.

In the following, driving a pixel as the sub-pixel for displaying an image is called photo emission driving or display driving, and driving a pixel as the sub-pixel for detecting an external input is called photo detection driving where appropriate.

In a case where the sub-pixel shown in FIG. 31 is subjected to photo emission driving, the switching unit 301 turns on (makes conductive) a transistor Tr3 via the switching line so as to supply the EL element with current corresponding to the signal from the data line.

In response to the operation of the transistor Tr3, a transistor Tr4 is turned off (made non-conductive). A switching line (not shown) is connected to the transistor Tr4 to make the switching unit 301 control on/off of the transistor Tr4.

In the state that the transistor Tr3 turns on, in a case where the gate line becomes active (a case where voltage is applied to the gate terminal), a transistor Tr1 is turned on so that electric charges supplied via the data line are charged in a capacitor C.

In accordance with a potential difference generated when the capacitor C is charged with the electric charges, a transistor Tr2 is turned on and current (current from+Vcc) flows through the transistor Tr2. At this time, the transistor Tr3 is turned on and the current flowing through the transistor Tr2 is supplied to the anode of the EL element because the cathode thereof is connected to GND, so that light is emitted from the EL element.

If the sub-pixel shown in FIG. 31 is subjected to light reception driving, the switching unit 301 turns off the transistor Tr3 via the switching line and the transistor Tr4 is turned on.

In a case where light is incident into the EL element in the state that the transistor Tr3 is turned off, the leak current $I_{EL}$ corresponding to the incident light amount is generated and supplied to an amplifier circuit via the transistor Tr4.

The leak current $I_{EL}$ is amplified by the amplifier circuit and supplied as leak current $I_{EL}'$ to the detecting unit 53.

In this manner, the light emission circuit (a circuit constituted of the transistors Tr1 and Tr2 and capacitor C) and the light reception circuit (the transistor Tr4 and amplifier circuit) are selectively switched by the switching lines to switch between the light emission driving and light reception driving of a sub-pixel.

The sub-pixel having the circuit shown in FIG. 31 is provided at least one per one pixel constituting the display unit 11, and each pixel performs the image display and the external input detection.

With reference to a flowchart shown in FIG. 32, description will be made on the processes to be executed by the display apparatus 1 which displays an image in the display unit 11, and forms a read area capable of detecting an external input in an area different from the image display area to perform the image display and the external input detection.

At Step S201, the control unit 45 sets the range, position and the like of the read area in accordance with, for example, an instruction from a user and an application under execution.

In this process, various settings regarding the read area are made, such as using only a predetermined range of the display unit 11 as the read area, the position of the read area only in the predetermined range and the moving read area described with reference to FIG. 22. Information of the range in which the read area is formed, the position of the read area and the like are output to the controller 48.

In accordance with the range in which the read area is formed, the position of the read area and the like set by the control unit 45 and a video signal, for example, of a television program supplied from the video signal generating unit 47, the controller 48 selects a predetermined number of light emission driving rows and light reception driving rows from all rows of the display unit 11.

In an EL display, a predetermined number of rows is collectively made to emit light and this collection range is repetitively and sequentially moved from the up to down in accordance with the display frequency, e.g., 1/60 sec, to thereby display an image. In this process, therefore, the predetermined number of rows is selected as the light emission driving rows.

At Step S203, the controller 48 judges whether the row to be processed is the light emission driving row. If the row is the light emission driving row, the flow advances to Step S204. If the row is the light reception driving row, the controller 48 skips to Step S206.

At Step S204, the controller 48 controls the switching unit 301 to turn on the transistor Tr3 (FIG. 31) of the sub-pixel in the light emission driving row and at the same time turns off the transistor Tr4. In this manner, the EL element is disconnected from the light reception driving circuit (a circuit constituted of the transistor Tr4 and amplifier circuit).

At Step S205, the controller 48 controls the gate driver 50 to activate the gate line, and controls the source driver 49 to supply a signal corresponding to an image to be displayed to the light emission driving sub-pixel via the gate line.

In the light emission driving sub-pixel, the transistor Tr1 is turned on so that electric charges supplied via the data line are charged in the capacitor C. In accordance with a potential difference generated when the electric charges are charged in the capacitor C, the transistor Tr2 is turned on so that current generated by the transistor Tr2 makes the EL element emit light.

This process is performed for all sub-pixels in the selected light emission driving row to display an image in the display area to be formed.

On the other hand, at Step S206, the controller 48 controls the switching unit 301 to turn off the transistor Tr3 of the sub-pixel forming the read area in the light reception driving row and turn on the transistor Tr4.

When external light becomes incident upon the EL element in this state, at Step S207, the detecting unit 53 detects as the received light signal the leak current $I_{EL}'$ obtained by amplifying the leak current $I_{EL}$ generated in correspondence with the incident light amount. The detected received light signal is output to the symbol processing unit 52 whereat an external input is detected, for example, by using the symbols described earlier or other methods.

After the light emission driving at Step S205 and the light reception driving at Step S207, the flow advances to Step S208 whereat the processes at Step S202 and subsequent steps are repeated until it is judged as a display termination. If it is judged as the display termination, the process is terminated.

The operation of the circuit shown in FIG. 31 is controlled in the manner described above to perform the image display and the external input detection.

Figure 33A:
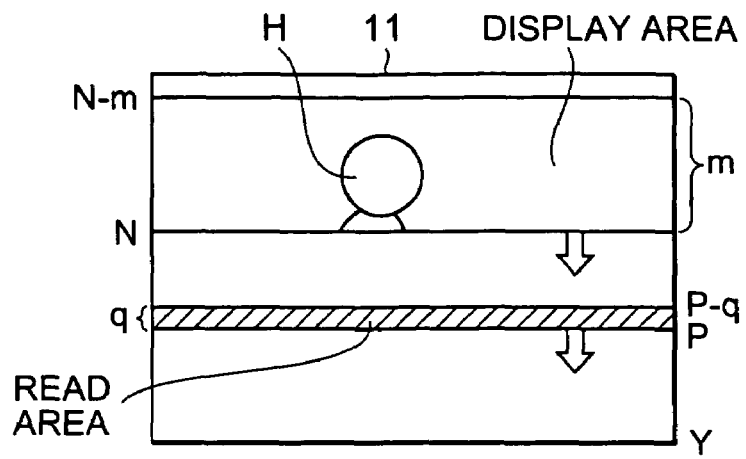
FIG. 33A to FIG. 33C are views showing an example of an area formed by the processing of FIG. 32.
Figure 33B:
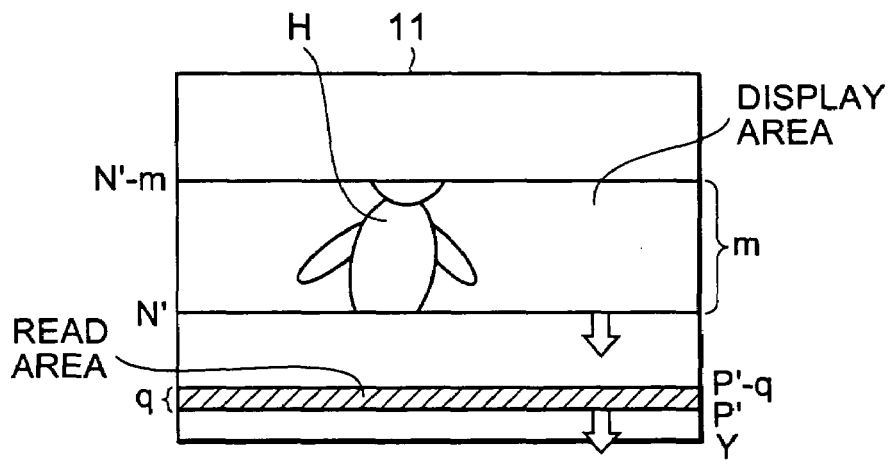
Figure 33C:
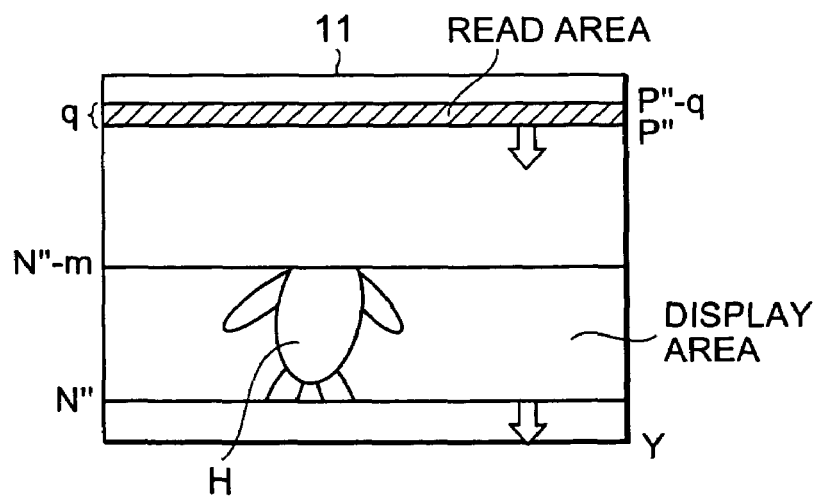

FIGS. 33A to 33C are diagrams showing examples of a display area (an area constituted of light emission driving pixels (sub-pixels)) formed in the display unit 11 and the read area (an area constituted of light reception driving pixels (sub-pixels)), respectively formed by the above-described processes.

The examples shown in FIGS. 33A to 33C all indicate the display area and read area during the period of 1/60 sec corresponding to the display frequency of the display unit 11. This is also the same for examples shown in FIGS. 35A to 35C, FIGS. 37A to 37C and 39A to 39C to be described later.

In the examples shown in FIGS. 33A to 33C, the display area and read area move from the up to down as indicated by a solid white arrow, with the same distance between the head (N-th row) of the display area and the head (P-th row) of the read area being maintained. When the area comes to the lowest Y-th row, the area again moves downward from the first row. This operation is repeated to form the display area and read area.

In FIG. 33A, the read area has a vertical length from the head P-th row (head of the area in the motion direction) to the (P−q)-th row and the horizontal length same as the whole lateral length of the display unit 11. For the convenience of description, although oblique lines are drawn in the read area, no image including oblique lines is displayed in this area because this area is constituted of the sub-pixels not performing light The display area has a vertical length from the head N-th row to the (N−m)-th row and the horizontal length same as the whole lateral length of the display unit 11.

As described above, in an EL display, a predetermined number of rows is collectively made to emit light and this collective range is repetitively and sequentially moved from the up to down as indicated by the solid white hollow arrow in accordance with the display frequency, to thereby display an image. In this example, the number of light emission driving rows at the timing of 1/60 sec is m. This display area is sequentially moved in accordance with the display frequency to display an image of one frame.

In this manner, the display area under light emission driving displays, for example, part (a portion around a face) of a person H such as shown in FIG. 33A at the timing of 1/60 sec. An area other than the display area not under light emission driving is an area displaying black instantaneously.

FIG. 33B shows the example of the display area and read area at the timing of 1/60 sec after the operation shown in FIG. 33A.

In FIG. 33B, the read area has a vertical length from the head P'-th row under the P-th row (FIG. 33A) to the (P'−q)-th row and the horizontal length same as the whole lateral length of the display unit 11.

The display area has a vertical length from the head N'-th row under the N-th row to the (N'−m)-th row and the horizontal length same as the whole lateral length of the display unit 11. The display range of the person H displayed in the display area of FIG. 33B is moved downward relative to the display range displayed in the display area of FIG. 33A.

FIG. 33C shows the example of the display area and read area at the timing of 1/60 sec after the operation shown in FIG. 33B.

In FIG. 33C, the read area has a vertical length from the head P''-th row to the (P''−q)-th row and the horizontal length same as the whole lateral length of the display unit 11.

The display area has a vertical length from the head N''-th row to the (N''−m)-th row and the horizontal length same as the whole lateral length of the display unit 11. The display range of the person H displayed in the display area of FIG. 33C is moved downward relative to the display range displayed in the display area of FIG. 33B.

In this manner, by setting the horizontal length of the read area same as the whole lateral length of the display unit 11 and sequentially switching (sequentially moving) the read area in accordance with the display frequency, the whole display unit 11 is scanned by the read area.

Figure 34:
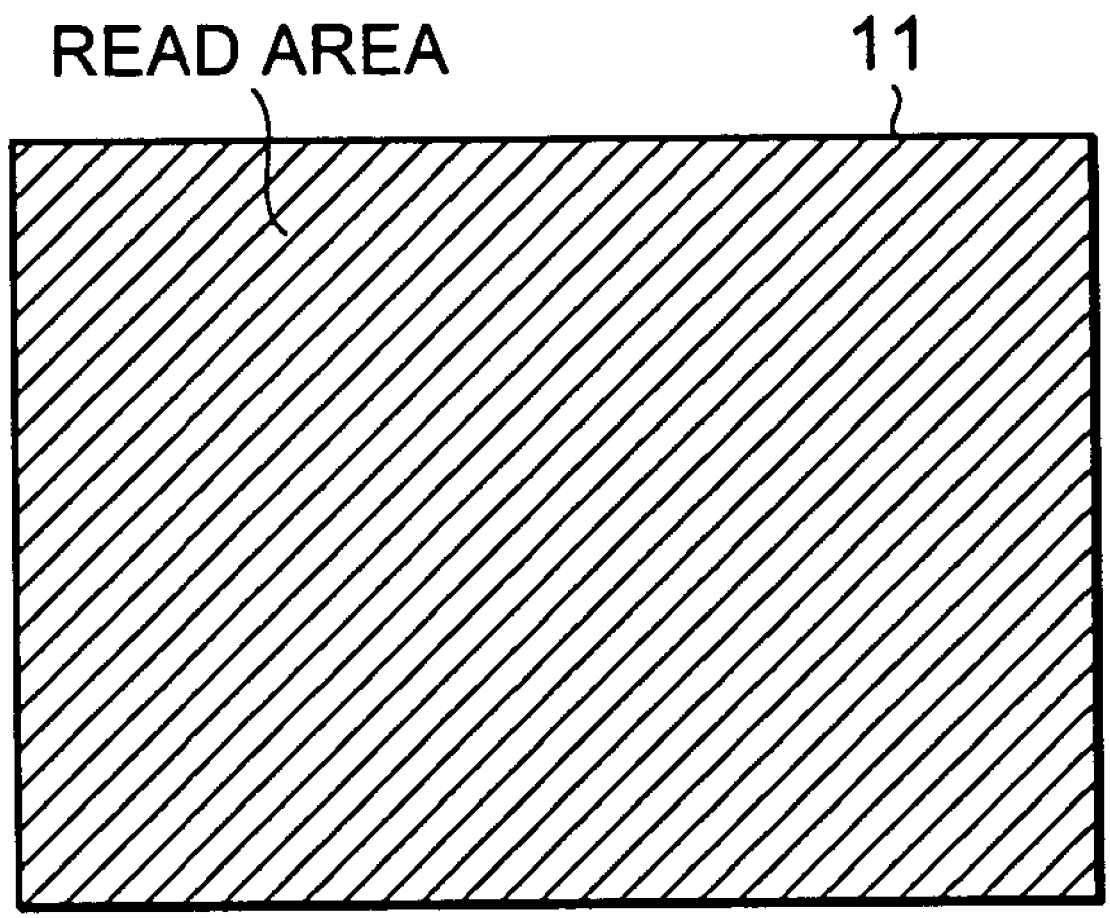
FIG. 34 is a view showing a range of a read area of FIG. 33.

In this case, therefore, a user can input predetermined information to the display apparatus 1 by externally irradiating light to any area of the display unit 11. Namely, as shown in FIG. 34, the read area is formed in the whole display unit 11 as viewed during a predetermined period and not during a period of 1/60 sec.

Also in this case, a user can view the whole image including the person H because the display area is displayed at the position different from that of the read position during the period of 1/60 sec.

Figure 32:
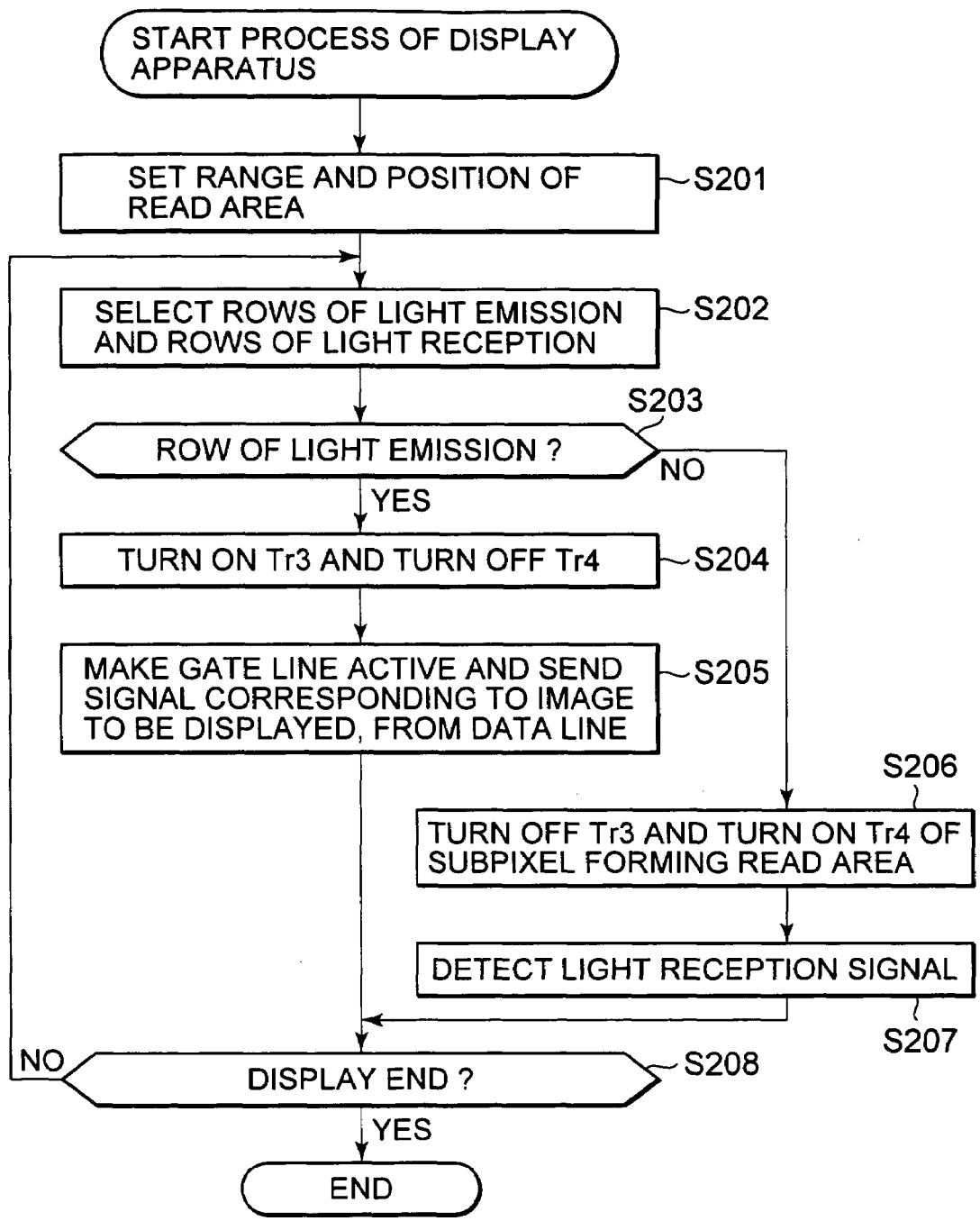
FIG. 32 is a flowchart for explaining a processing of the display apparatus.
Figure 35A:
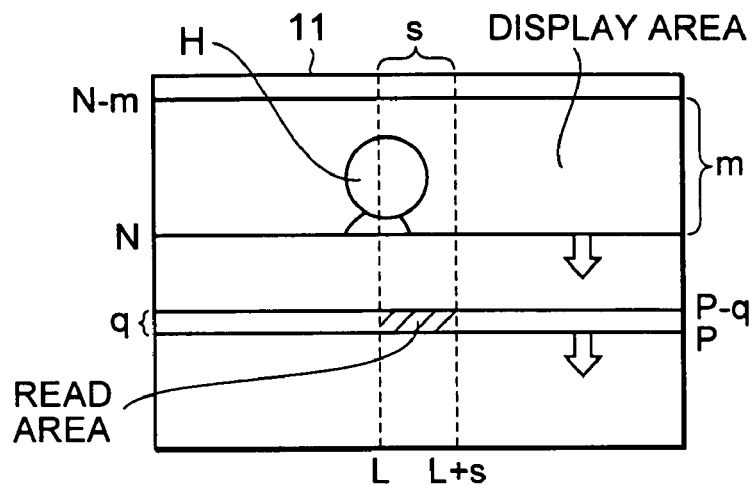
FIG. 35A to FIG. 35C are other views showing an example of an area formed by the processing of FIG. 32.
Figure 35B:
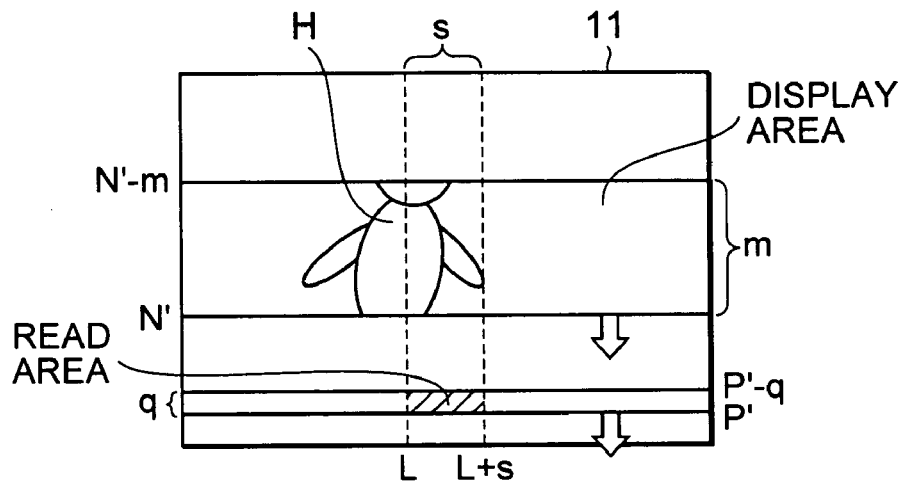
Figure 35C:
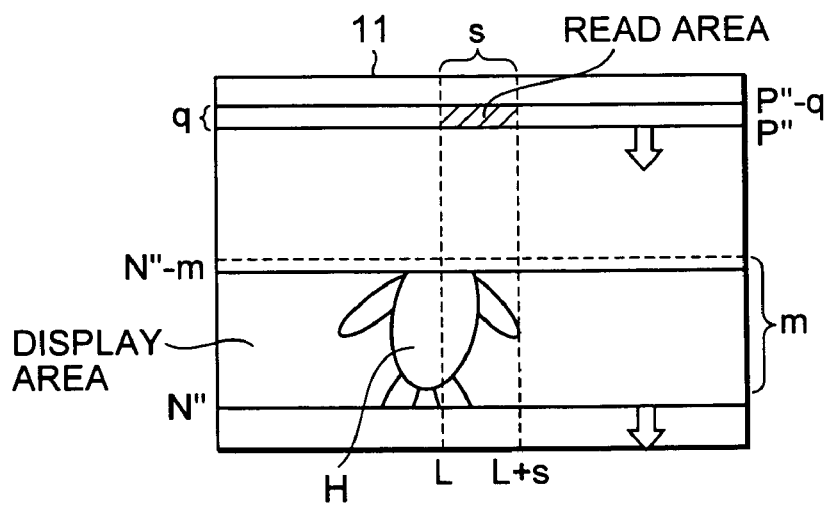

FIGS. 35A to 35C are diagrams showing other examples of the display and read area formed by the processes shown in FIG. 32.

In the examples shown in FIGS. 35A to 35C, similar to the examples shown in FIGS. 33A to 33C excepting that the lateral range of the read area is limited, the display area and read area move from the up to down as indicated by a solid white arrow, with the same distance between the head (N-th row) of the display area and the head (P-th row) of the read area being maintained. When the area comes to the lowest Y-th row, the area again moves downward from the first row. This operation is repeated to form the display area and read area.

In the examples shown in FIGS. 35A to 35C, the read area constituted of the light reception driving sub-pixels has a limited lateral range from the L-th column to (L+s)-th column of the display unit 11. The lateral range of the read area can be limited in this way because each sub-pixel can be driven via the switching line.

Since the position of the read area with the limited lateral range is sequentially moved, the read area can scan repetitively in the range from the L-th column to (L+s)-th column of the display unit 11.

Figure 36:
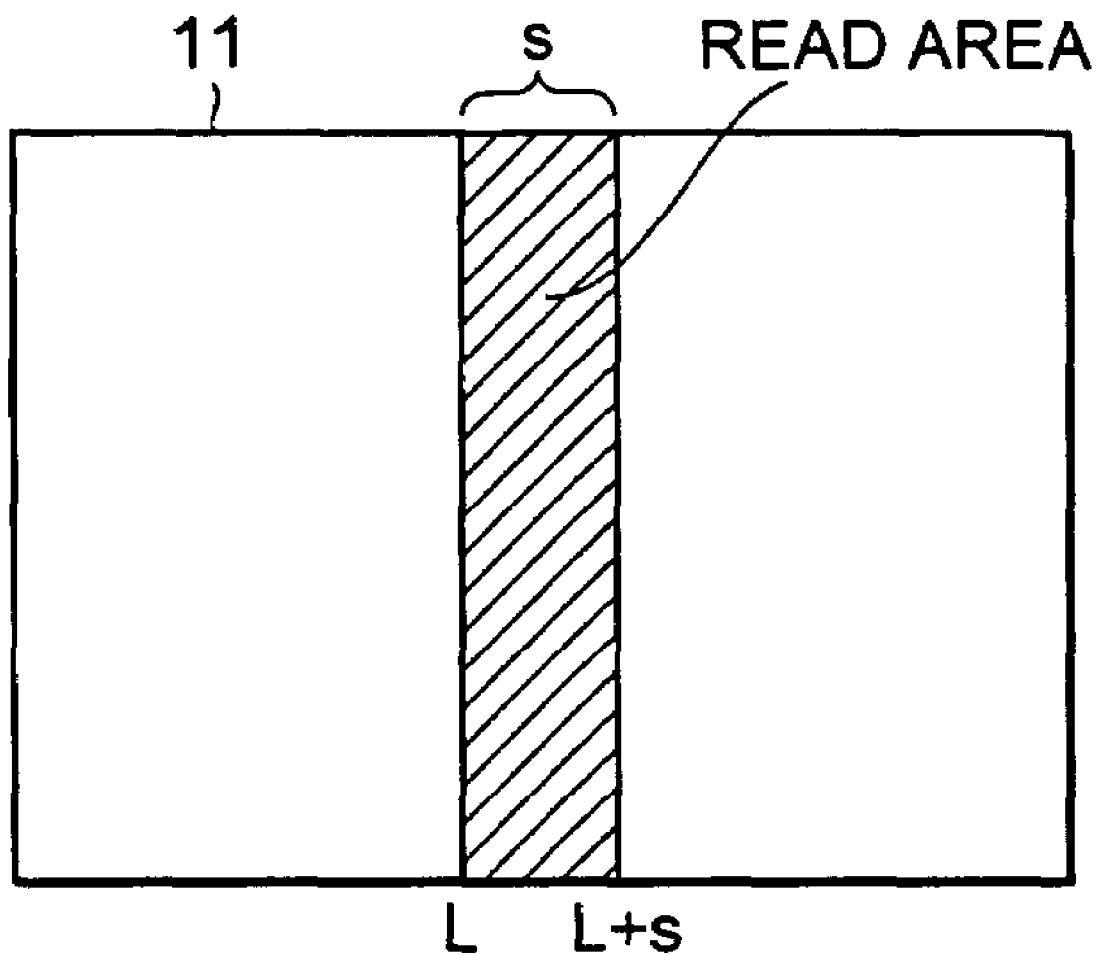
FIG. 36 is a view showing a range of a read area of FIG. 35.

In this case, therefore, a user can input predetermined information to the display apparatus 1 by irradiating external light. Namely, as shown in FIG. 36, the read area is formed in the range from the L-th column to (L+s)-th column of the display unit 11 as viewed not during a period of 1/60 sec but during a predetermined period.

Figure 37A:
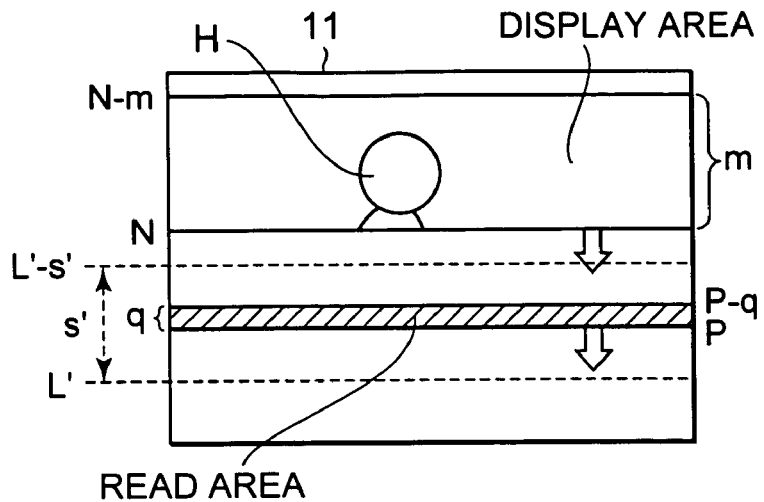
FIG. 37A to FIG. 37C are other views showing an example of an area formed by the processing of FIG. 32.
Figure 37B:
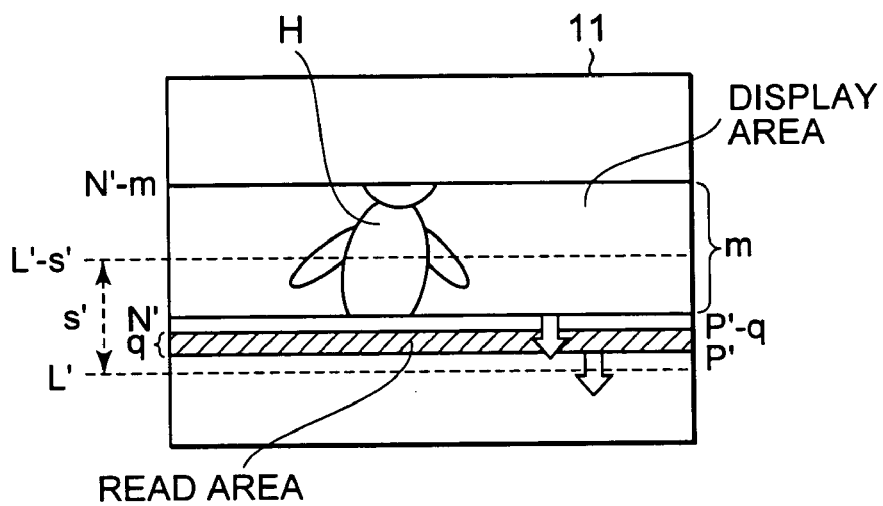
Figure 37C:
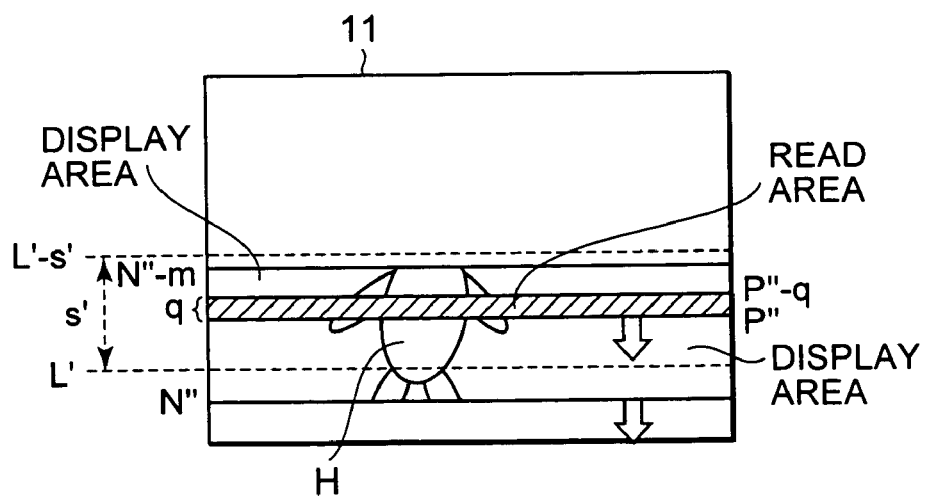

FIGS. 37A to 37C are diagrams showing still other examples of the display and read area formed by the processes shown in FIG. 32.

The examples shown in FIGS. 37A to 37C are similar to the examples shown in FIGS. 33A to 33C excepting that the vertical motion of the read area is limited in the range from the L'-th row to (L'−s')-th row. Namely, in the example shown in FIGS. 37A to 37C, immediately after the head row of the read area reaches the L'-th row, the read area is formed starting from the (L'−s')-th row.

Since the vertical motion range of the read area is limited to the range from the L'-th row to (L'−s')-th row, the read area repetitively scans the range from the L'-th row to (L'−s')-th row of the display unit.

Figure 38:
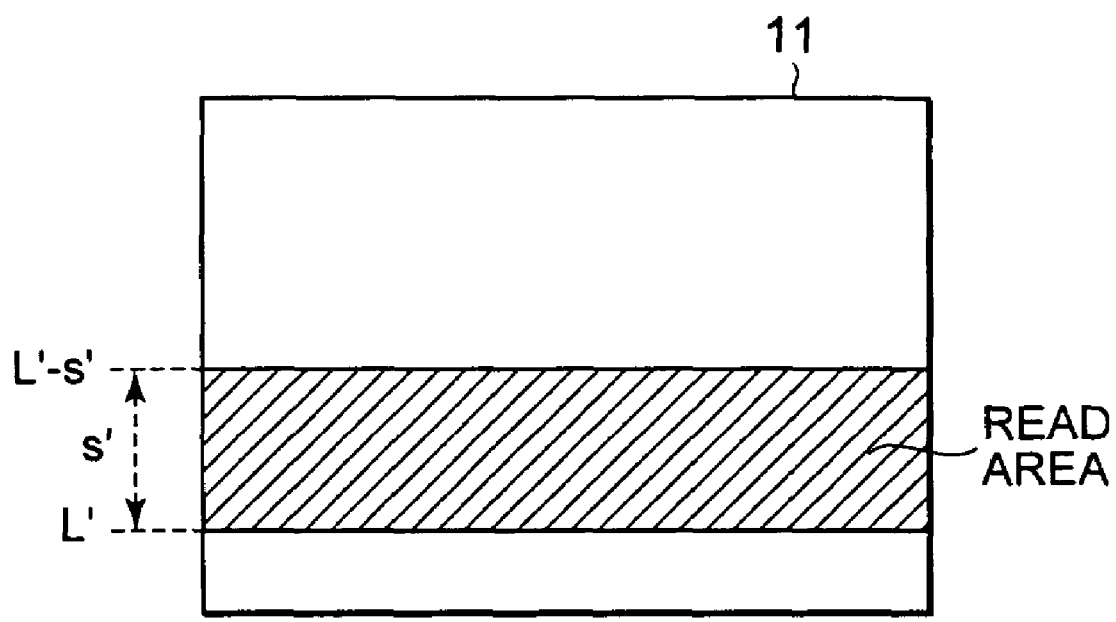
FIG. 38 is a view showing a range of a read area of FIG. 37.

In this case, therefore, a user can input predetermined information to the display apparatus 1 by irradiating external light to the range from the L'-th row to (L'−s')-th row. Namely, as shown in FIG. 38, the read area is formed in the vertical range from the L'-th row to (L'−s')-th row of the display unit with the lateral range being same as the whole lateral length of the display unit 11, as viewed during a predetermined period and not during a period of 1/60 sec.

Figure 39A:
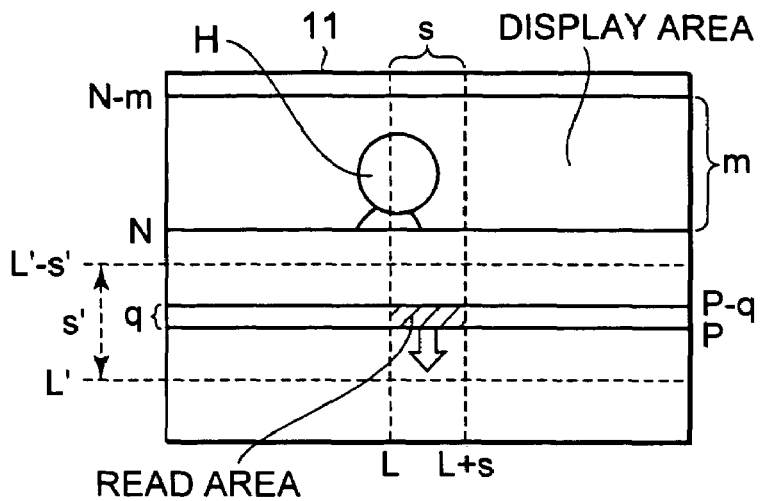
FIG. 39A to FIG. 39C are views showing an example of an area formed by the processing of FIG. 32.
Figure 39B:
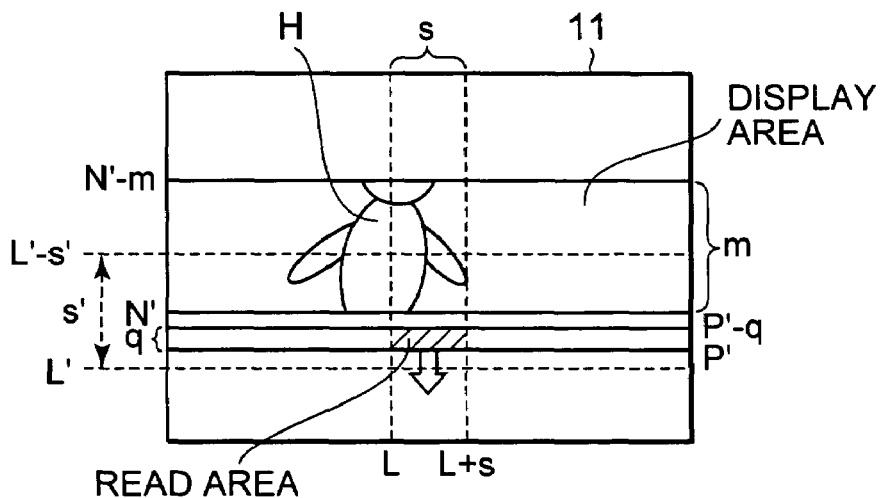
Figure 39C:
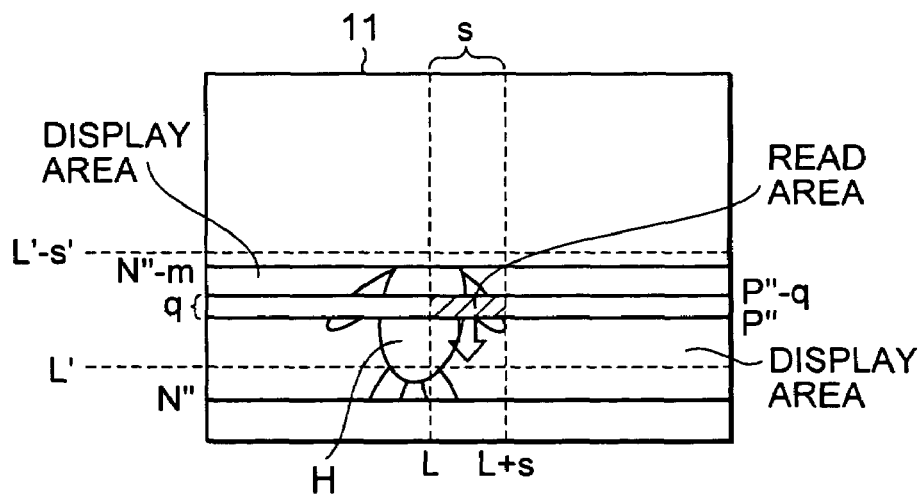

In the examples shown in FIGS. 39A to 39C, the read area is formed by a combination of the operation of forming the read area by limiting its lateral range as shown in FIGS. 35A to 35C and the operation of forming the read area by limiting its vertical range as shown in FIGS. 37A to 37C.

Namely, in the examples shown in FIGS. 39A to 39C, the read area is limited in the horizontal direction to the range from the L-th column to (L+s)-th column of the display part as shown in FIGS. 35A to 35C and in the vertical motion direction to the range from the L'-th row to (L'−s')-th row. Excepting this point, the display area and the read area shown in FIGS. 39A to 39C are similar to those shown in FIGS. 33A to 33C.

Since the vertical motion range and lateral range of the read area are limited, the read area repetitively scans the range from the L-th column to (L+s)-th column and from the L'-th row to (L'−s')-th row of the display unit 11.

In this case, therefore, a user can input predetermined information to the display apparatus 1 by irradiating light to the range from the L-th column to (L+s)-th column and from the L'-th row to (L'−s')-th row. Namely, as shown in FIG. 40, the read area is formed in the vertical range from the L'-th row to (L'−s')-th row and from the L-th column to (L+s)-th column in the lateral direction, as viewed during a predetermined period and not during a period of 1/60 sec.

Figure 40:
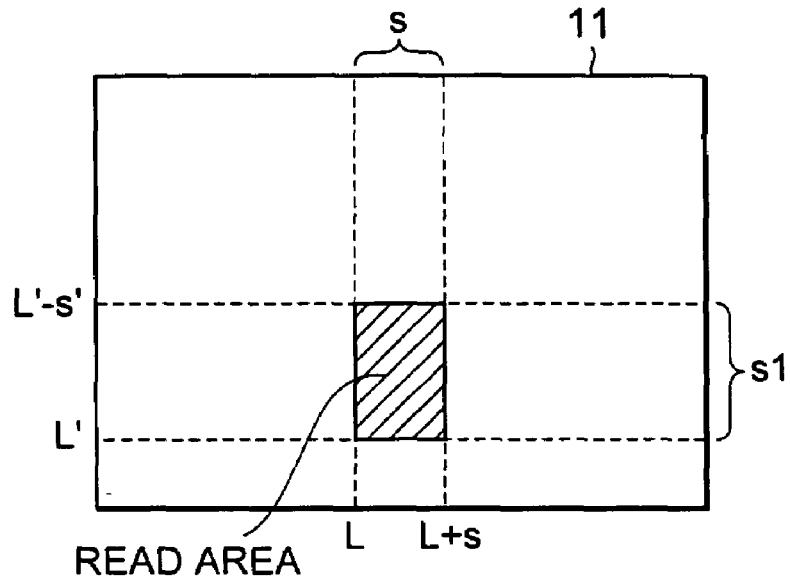
FIG. 40 is a view showing a range of a read area of FIG. 39.

The read area (read area moving on the whole screen) shown in FIG. 22 is realized by sequentially switching the range of the square read area shown in FIG. 40 by operating corresponding sub-pixels.

As described above, since each sub-pixel can undergo light emission driving or light reception driving, the read area can be formed by setting the position, range (size), motion or halt and the like in accordance with the use purpose. Further, in accordance with the object of an application or the like, optional settings may be performed if necessary, such as forming a plurality of square read areas shown in FIG. 40.

In the above description, an input of predetermined information is detected by receiving external light. The light reception characteristics change with materials of an EL element.

Description will be made on the material and characteristics of an EL element (organic EL element).

Figure 41:
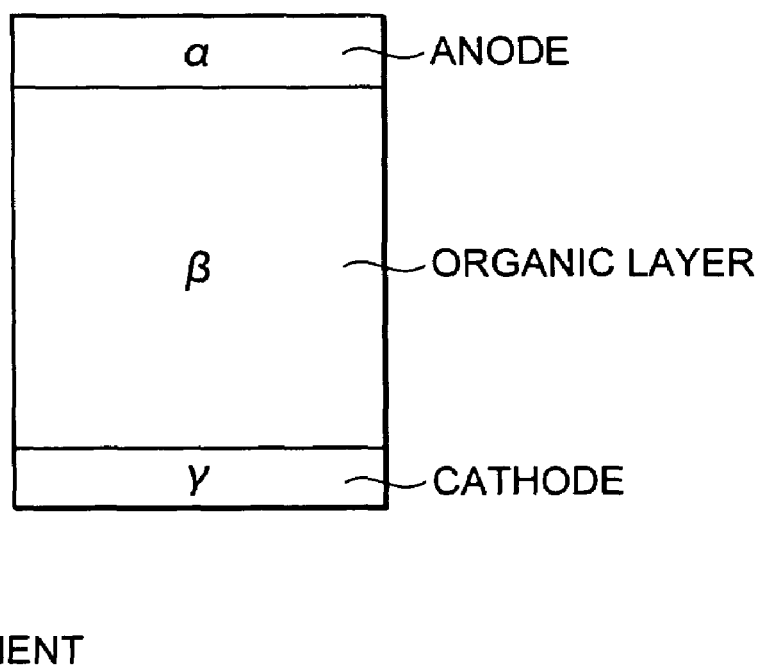
FIG. 41 is a view showing a cross section of an EL element.
Figure 42:
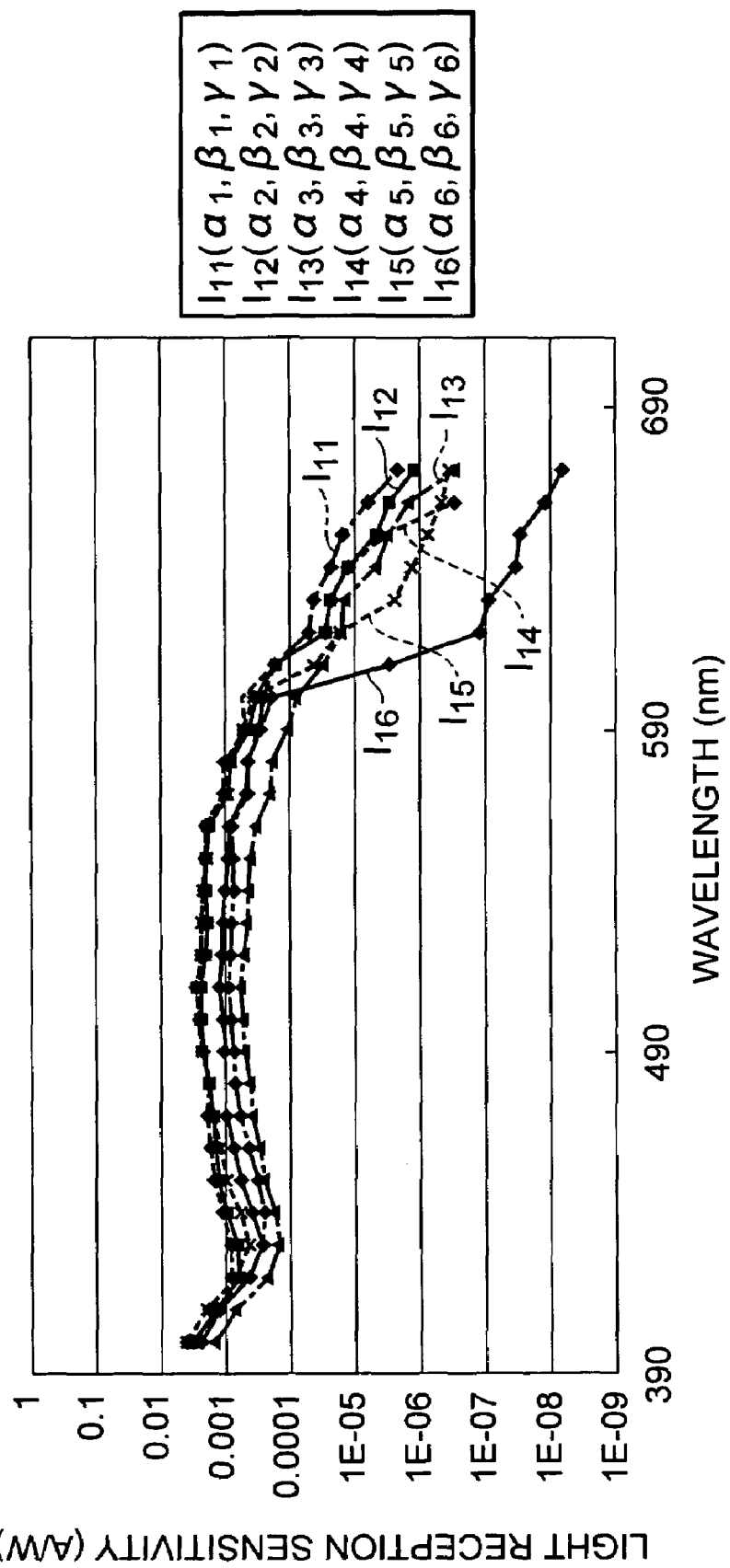
FIG. 42 is a graph showing a photo sensitivity of the EL element.

As shown in FIG. 41, a light reception sensitivity of an EL element becomes different as shown in FIG. 42, depending upon a combination of the materials constituting the EL element, where $\alpha$ is the material of an anode, $\beta$ is the material of an organic layer including a light emission layer, a hole transport layer and an electron transport layer, and $\gamma$ is the material of a cathode. FIG. 42 shows the characteristics of EL elements emitting red (R) light. The abscissa of FIG. 42 represents a wavelength nm and the ordinate represents a light reception sensitivity A/W (photocurrent (A)/incident light amount (W)).

In FIG. 42, a characteristic curve $1_{11}$ shows the characteristics of an EL element made of anode material $\alpha_1$, organic layer material $\beta_1$ and cathode material $\gamma_1$. Similarly, a characteristic curve $1_{12}$ shows the characteristics of an EL element made of anode material $\alpha_2$, organic layer material $\beta_2$ and cathode material $\gamma_2$, and a characteristic curve $1_{13}$ shows the characteristics of an EL element made of anode material $\alpha_3$, organic layer material $\beta_3$ and cathode material $\gamma_3$.

A characteristic curve $1_{14}$ shows the characteristics of an EL element made of anode material $\alpha_4$, organic layer material $\beta_4$ and cathode material $\gamma_4$, a characteristic curve $1_{15}$ shows the characteristics of an EL element made of anode material $\alpha_5$, organic layer material $\beta_5$ and cathode material $\gamma_5$, and a characteristic curve $1_{16}$ shows the characteristics of an EL element made of anode material $\alpha_6$, organic layer material $\beta_6$ and cathode material $\gamma_6$.

As seen from this graph, the light reception sensitivity of an EL element changes in accordance with a combination of materials. It can be seen from the graph of FIG. 42 that the EL element emitting red light has a high light reception sensitivity particularly to ultraviolet light having a wavelength near 390 nm and green light having a wavelength near 500 nm.

It is therefore preferable to use ultraviolet rays as radiation light when predetermined information is externally input. For example, in a case where information is input to the display apparatus 1 by using the reader/writer 24 of the information processing terminal 21, the information can be more reliably input to the EL element emitting red light under light emission driving (EL element having the light reception sensitivity shown in FIG. 42), by using a light source emitting a ultraviolet ray for displaying a symbol (two-dimensional code) in the reader/writer 24.

Figure 43:
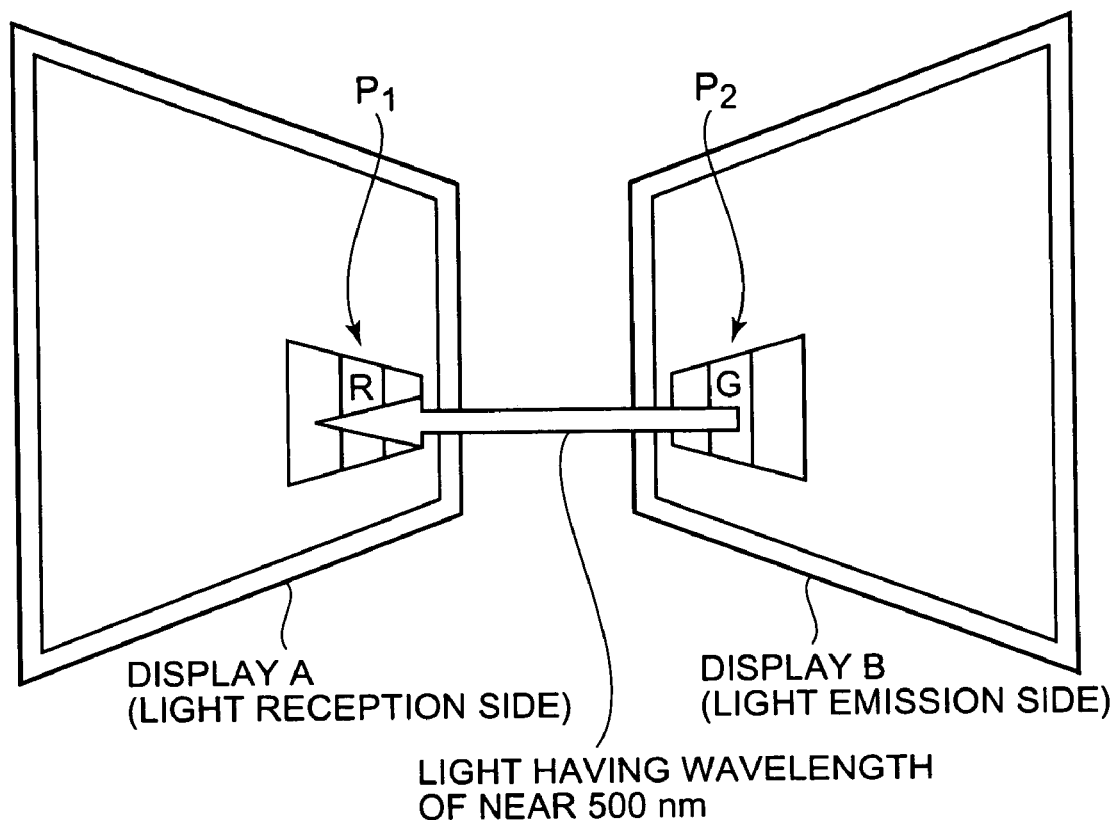
FIG. 43 is a view showing a display apparatus for inputting data and a display apparatus for detecting data.

As shown in FIG. 43, in a case where predetermined information is to be input by disposing a light reception side display A and a light emission side (display side) display B facing each other, external light can be detected, i.e., information can be input from the display B to the display A, more reliably, by subjecting an R sub-pixel of a pixel P1 to light reception driving and subjecting a G sub-pixel of a pixel P2 at a corresponding position to light emission driving. This driving can be realized by changing driving the circuit via the switching lines as described above.

Figure 44:
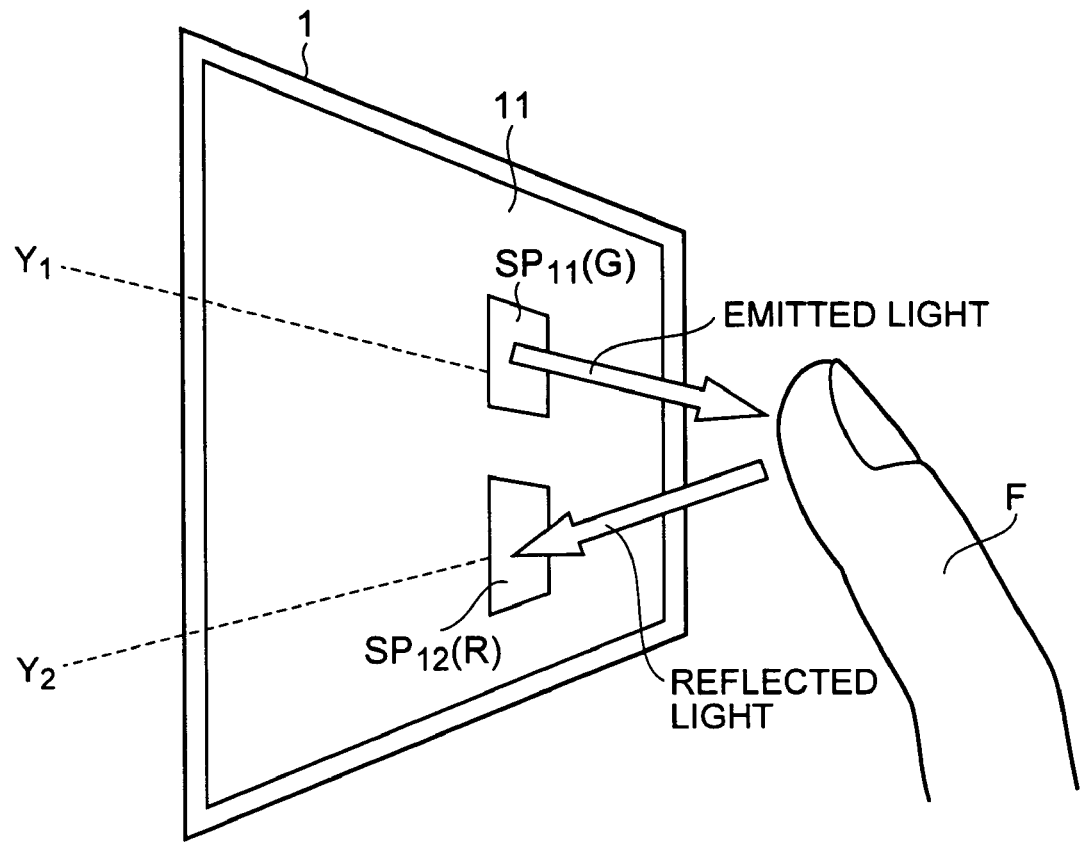
FIG. 44 is a view showing an example of input detection.

As shown in FIG. 44, consider now that the display apparatus 1 executes a predetermined process in response to a detection of reflected light of light emitted from the display apparatus 1, for example, in response to a direction of a user finger coming near to the surface of the display unit 11. In this case, it is preferable to use a sub-pixel $SP_{11}$ for emitting a green (G) ray as a sub-pixel for irradiating light to a user finger F, and use a red (R) sub-pixel $SP_{12}$ (sub-pixel emitting a red ray under light emission driving) as a sub-pixel for receiving reflected light (from the finger F) (of light emitted from the sub-pixel $SP_{11}$).

Since a proximity of the finger F can be detected more reliably the shorter the distance between the sub-pixels $SP_{11}$ and $SP_{12}$, the distance between a $Y_1$-th row at the sub-pixel $SP_{11}$ and a $Y_2$-th row at the sub-pixel $SP_{12}$ is set to, for example, several rows.

Figure 45:
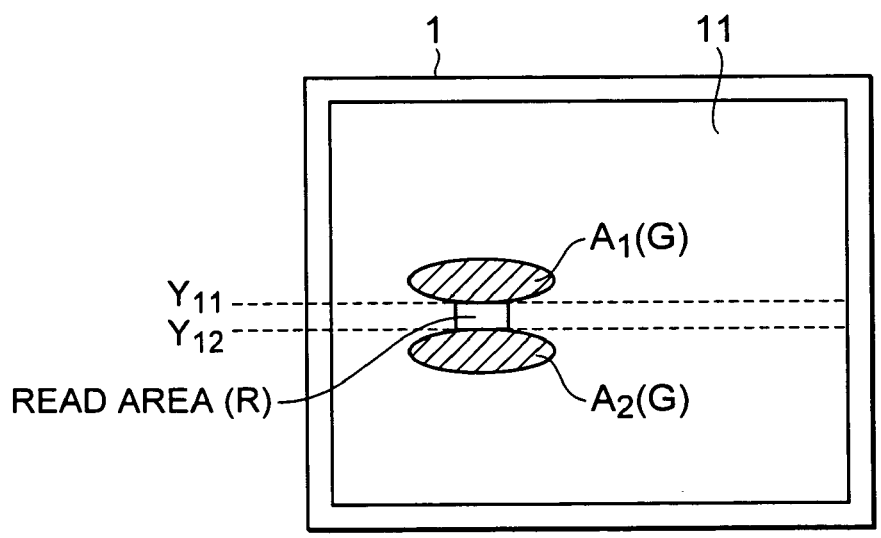
FIG. 45 is a view showing a range of a preferable light emission area in the detection of FIG. 44.

As shown in FIG. 45, in the state that a square read area for detecting the user finger F is formed in a range between an upper $Y_{11}$-th row and a lower $Y_{12}$-th row of the display unit 11, a user input (a proximate of the user finger F) can be detected more reliably, for example, by operating the pixels in a range of an upper $A_1$ and a lower $A_2$ near the read area indicated by oblique lines so as to emit green light.

Figure 46:
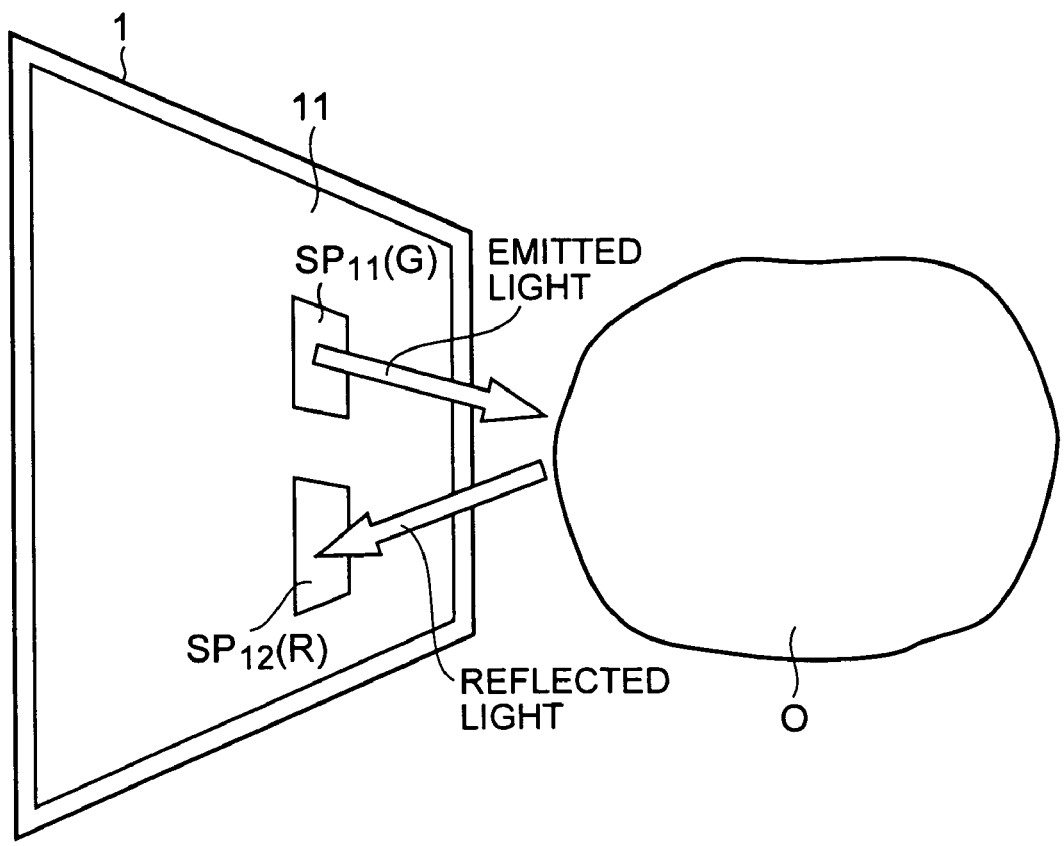
FIG. 46 is a view showing another example of input detection.

Instead of the finger F, as shown in FIG. 46 a user can input information to the display apparatus by moving an object O having a predetermined reflectivity near to the surface of the display unit 11 (it is possible to detect that the object O is in proximity of the display unit 11). In this case, information input can be made by an intuitive operation, for example, by moving an object same as that shown in the display unit 11 near to the display unit 11.

Detecting a proximate object can be realized by changing driving the circuits via the switching lines to subject sub-pixels in a row to the light reception driving and neighboring sub-pixels to the light emission driving.

Similarly, a user can input not only point information such as a proximate finger but also a predetermined area information such as the fingerprint of a finger abutted on the surface of the display part 11, by making the display apparatus detect reflected light of emitted light.

Figure 47:
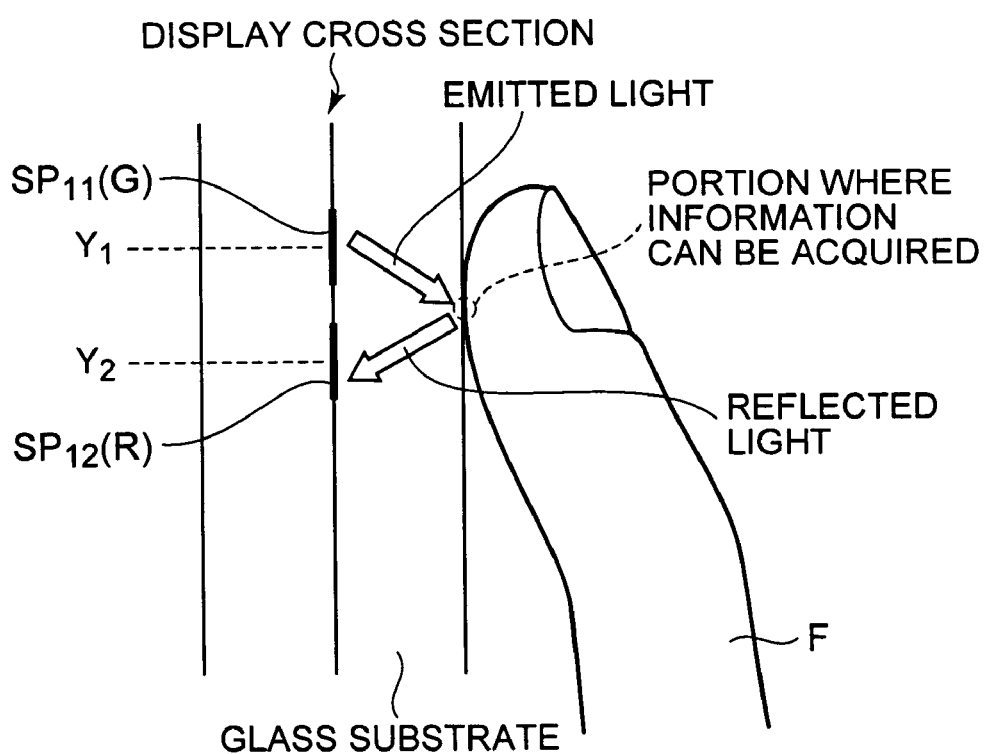
FIG. 47 is a view explaining detection of plane information.
Figure 48:
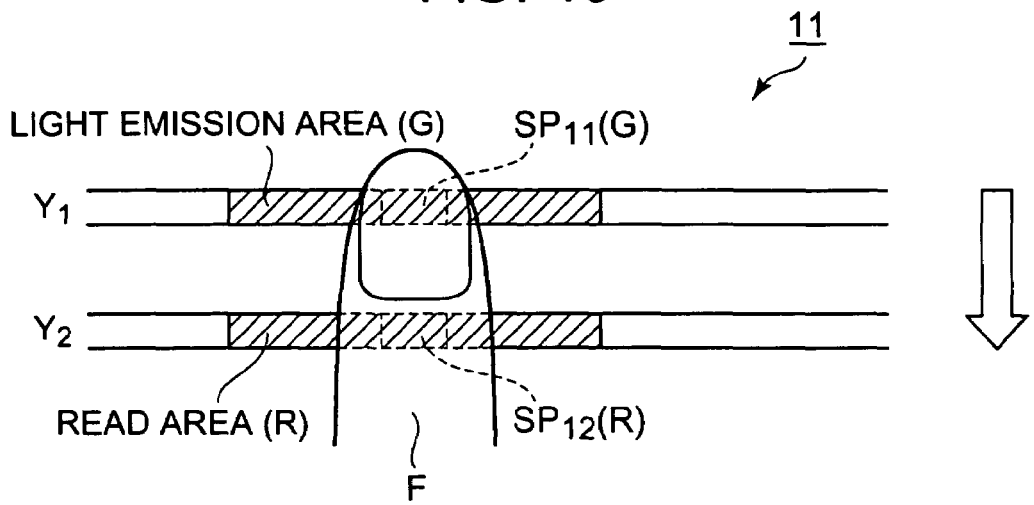
FIG. 48 is a view showing an external appearance of FIG. 47.

FIG. 47 is a diagram showing a cross section of the display unit 11 (display) and a user finger F in contact with the surface of the display unit 11 at some timing. FIG. 48 is a plan view of FIG. 47.

Reflected light of light emitted from a light emission area constituted of sub-pixels (G) under light emission driving in the $Y_1$-th row including the sub-pixel $SP_{11}$, is received in the read area constituted of sub-pixels (R) under light reception driving in the $Y_2$-th row including the sub-pixel $SP_{12}$. In this manner, the display apparatus 1 can acquire lateral information of the finger F irradiated by the light emission area (a presence/absence of convex/concave portions along a drawing sheet direction surrounded by a broken line in FIG. 47).

As shown in FIG. 48, the display apparatus 1 can acquire information of the whole fingerprint of the finger F abutted by the user on the display unit 11, by moving the light emission area and read area downward as indicated by a solid white arrow, with the position relation being maintained between the row of sub-pixels under light emission driving and the row of sub-pixels under light reception driving, and by synthesizing lateral information acquired respective timings (information time divisionally acquired).

Figure 49A:
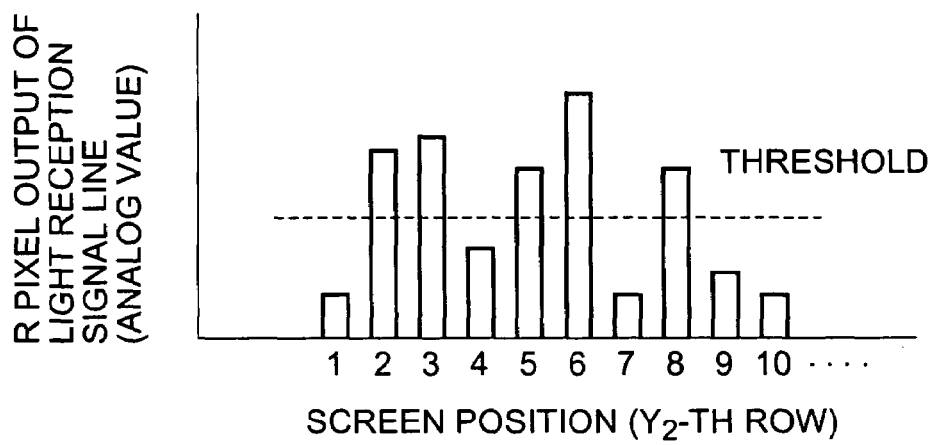
FIG. 49A and FIG. 49B are graphs each showing analog output and digital output in the detection of FIG. 47 and FIG. 48.

FIG. 49A is a diagram showing outputs (analog values) of light reception signals from sub-pixels, while the G sub-pixels in the $Y_1$-th row emit light and the G sub-pixels in the $Y_2$-th row receive reflected light, as shown in FIGS. 47 and 48. In FIG. 49A, the abscissa corresponds to the lateral position in FIG. 48 and represents a position of each sub-pixel in the $Y_2$-th row. The ordinate represents an output on the light reception signal line of each sub-pixel in the $Y_2$-th row.

Figure 49B:

FIG. 49B shows digital values of the output of the sub-pixels shown in FIG. 49A, by setting "1" for an output equal to or higher than the threshold value indicated by a dotted line in FIG. 49A, and "0" for an output lower than the threshold value.

As indicated by the solid white arrow of FIG. 48, both the light emission area and read area are moved downward so that the outputs shown in FIGS. 49A and 49B are obtained at respective positions where the light emission area irradiates light. Therefore, by synthesizing the outputs obtained at the respective positions, the display apparatus 1 can acquire the information of convex/concave portions of the whole surface of the finger F and detect the fingerprint.

Figure 50A:
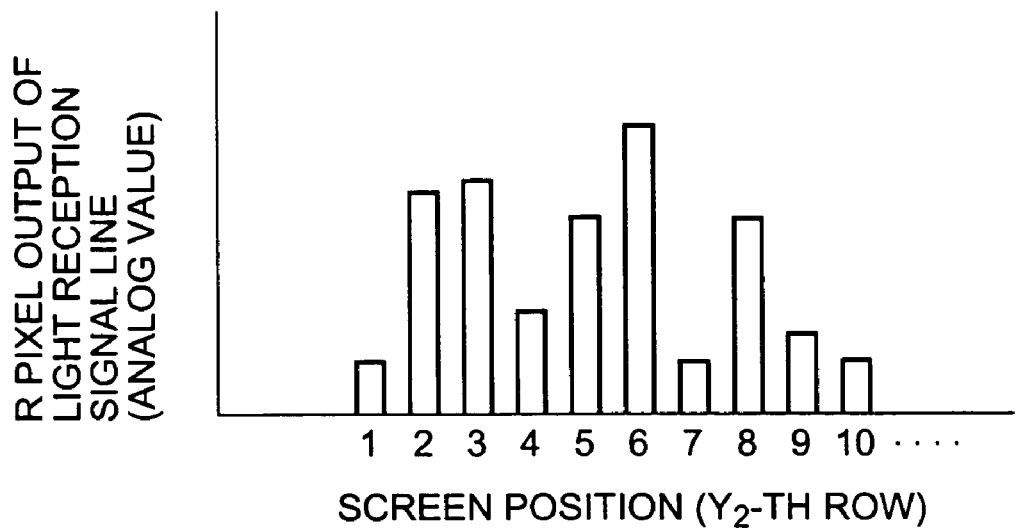
FIG. 50A and FIG. 50B are graphs each showing digital output and digital output in the detection of FIG. 47 and FIG. 48.
Figure 50B:
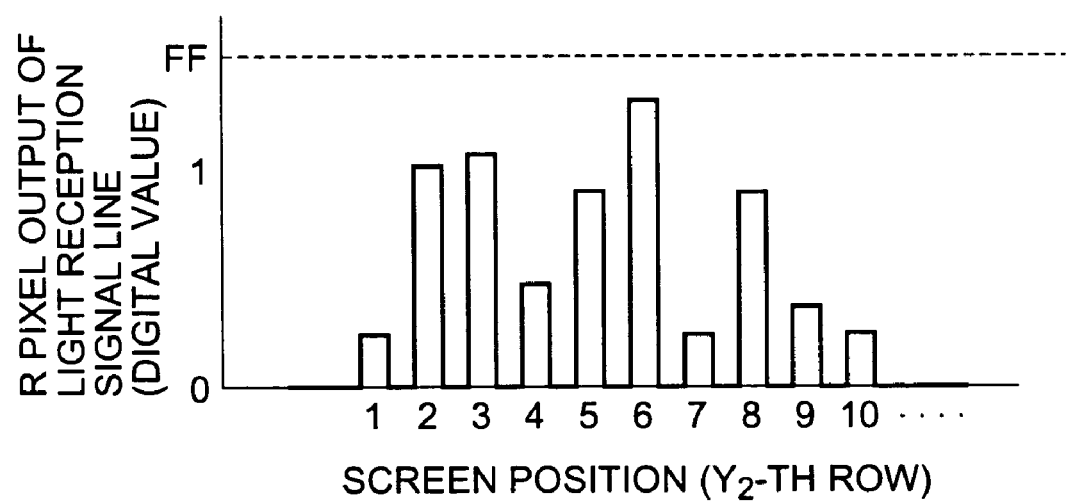

Instead of binarizing the fingerprint information by "1" and "0" shown in FIG. 49B, the outputs shown in FIG. 50A same as those shown in FIG. 49A may be changed to outputs shown in FIG. 50B having a gradation, by assigning a predetermined number of bits to the output from each sub-pixel.

Figure 51:
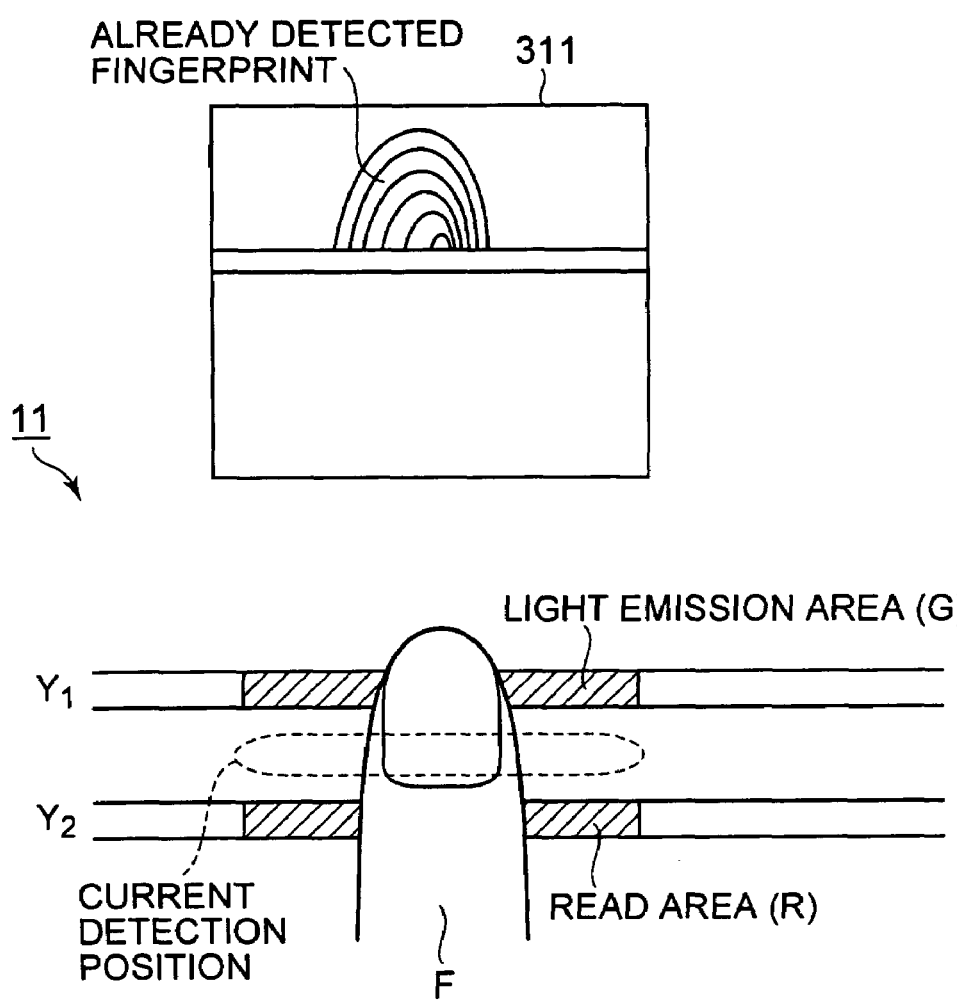
FIG. 51 is a view showing a display example of data after detection.

Since the display unit 11 can change the operation of each sub-pixel, for example, as shown in FIG. 51 a fingerprint display area 311 may be formed near at a position where the fingerprint is detected, to sequentially display the fingerprint in the fingerprint display area 311 in the order from an image portion in an already detected row. A user can therefore confirm intuitively the fact that the fingerprint is being detected.

Obviously, instead of displaying the image of an already detected fingerprint in the fingerprint display area 311, the image of an already detected fingerprint may be sequentially displayed at the position on which the user abuts the finger F. This display of the detection result at the detection position can be realized by displaying the image of the fingerprint by sequentially changing the light reception driving of the sub-pixel in the row completed the fingerprint detection to the light emission driving.

Similar to acquiring information of a proximate object or a contacting object in the manner described above, the image of an object in front of the display apparatus 1 can be acquired by subjecting a predetermined number of sub-pixels to light reception driving.

Figure 52:
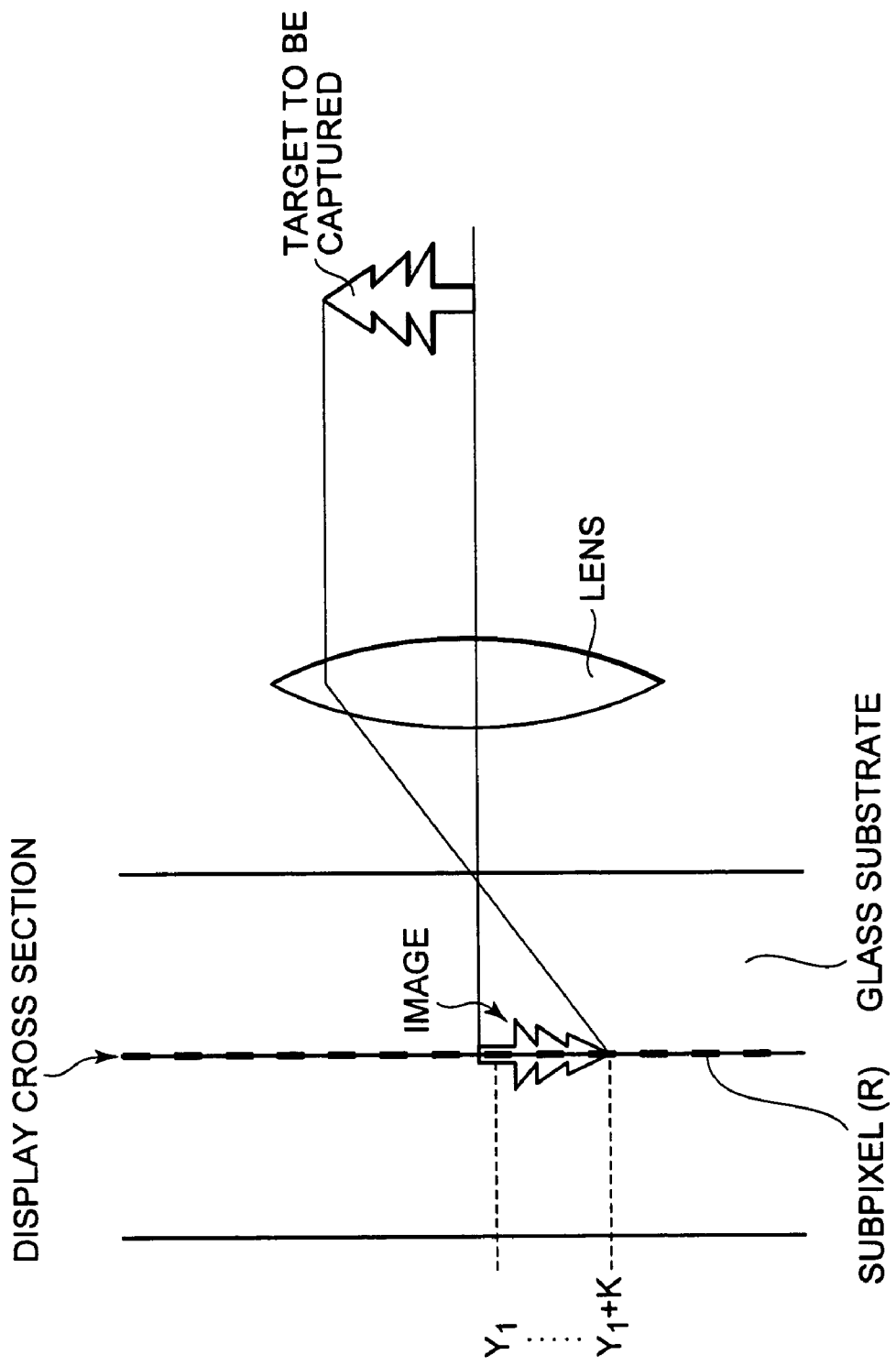
FIG. 52 is a view for explaining image capturing using the display apparatus.

FIG. 52 is a conceptual diagram illustrating an image pickup by sub-pixels under light reception driving.

For example, R sub-pixels in the $Y_1$-th row to $(Y_1+K)$-th row are subjected to light reception driving via the switching lines and a lens for focusing a target to be captured on the sub-pixels is mounted on the surface of the display unit 11 (display) or the like, so that the image of the target can be obtained from light reception signals of the sub-pixels under the light reception driving.

Figure 53A:
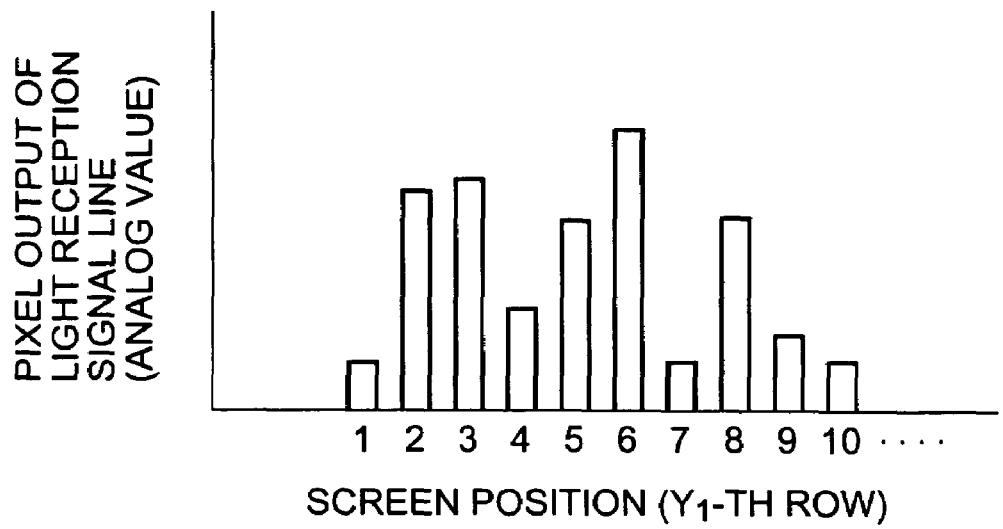
FIG. 53A and FIG. 53B are graphs each showing analog output in the image capturing in FIG. 52.
Figure 53B:
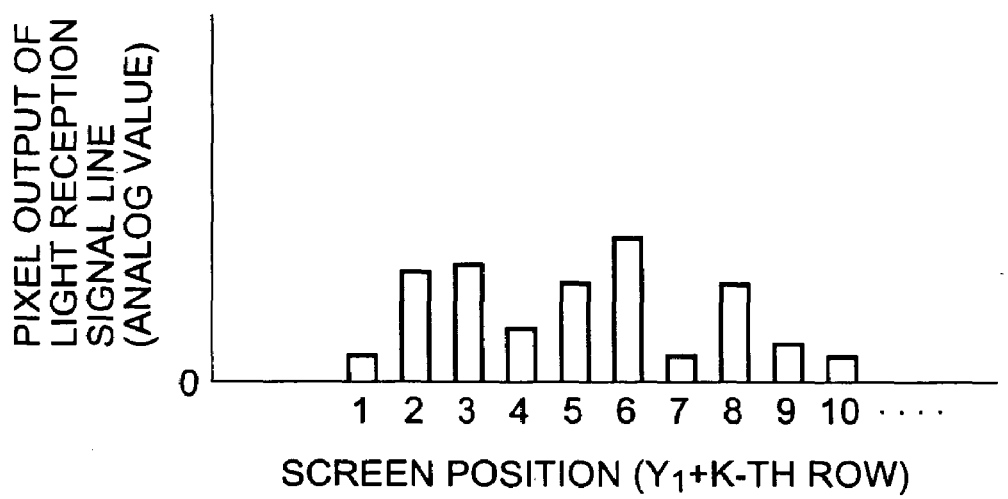

FIG. 53A shows analog value outputs of light reception signals detected by the sub-pixels in the $Y_1$-th row shown in FIG. 52, and FIG. 53B shows analog value outputs of light reception signals detected by the sub-pixels in the $(Y_1+K)$-th row.

Figure 54A:
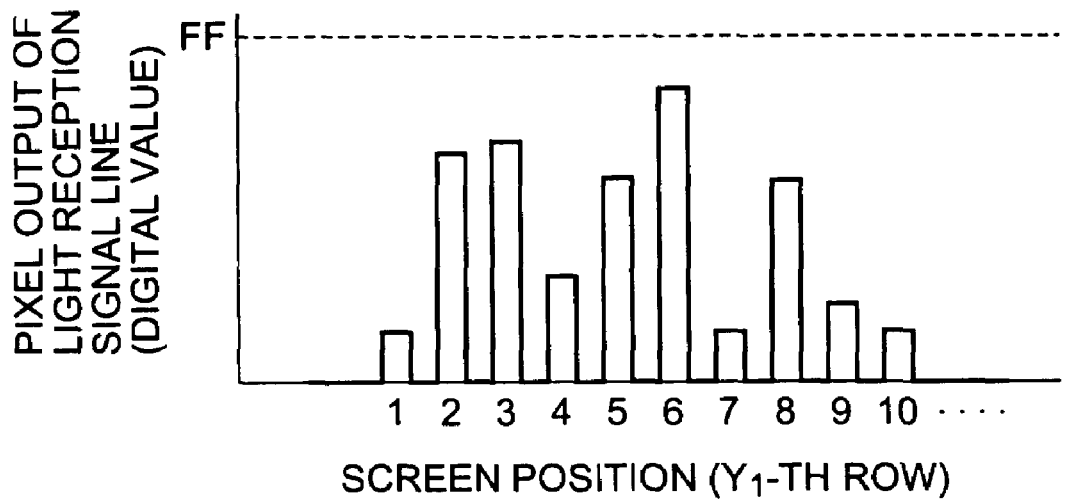
FIG. 54A and FIG. 54B are graphs each showing digital output in the image capturing in FIG. 52.
Figure 54B:
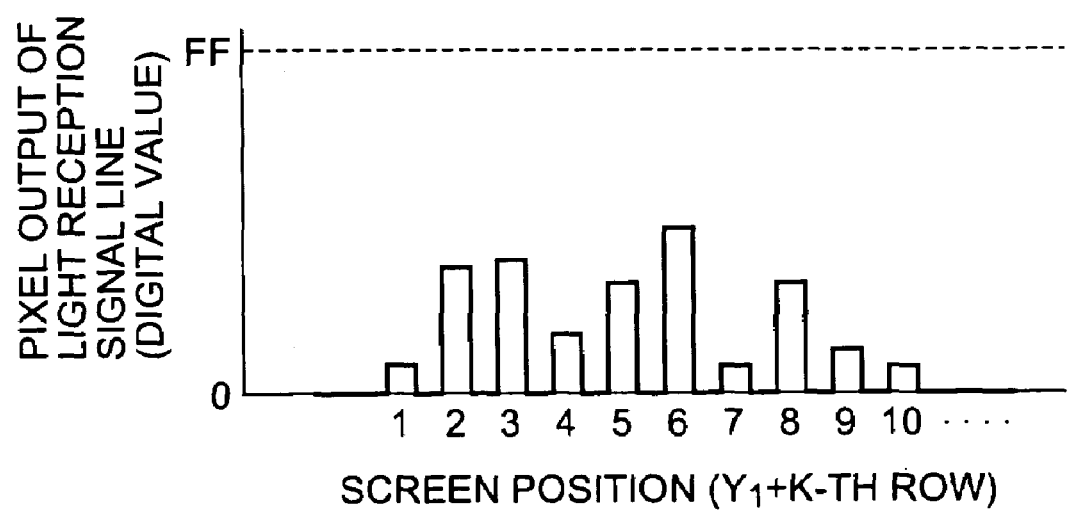

FIG. 54A shows digital values converted from the outputs shown in FIG. 53A, and FIG. 54B is digital values converted from the outputs shown in FIG. 53B. By detecting these values in the $Y_1$-th row to $(Y_1+K)$-th row and synthesizing them, the image of a target in front of the display apparatus 1 can be acquired.

A user can quickly and easily confirm the captured result by displaying it in the display unit 11 immediately after image capturing.

As described above, a sub-pixel under light reception driving can detect visible light. Therefore, for example, as shown in FIG. 55 information can be input to the display apparatus 1 by using a laser pointer 321 (a laser pointer prevailing commonly) capable of emitting visible light such as red light.

Figure 55:
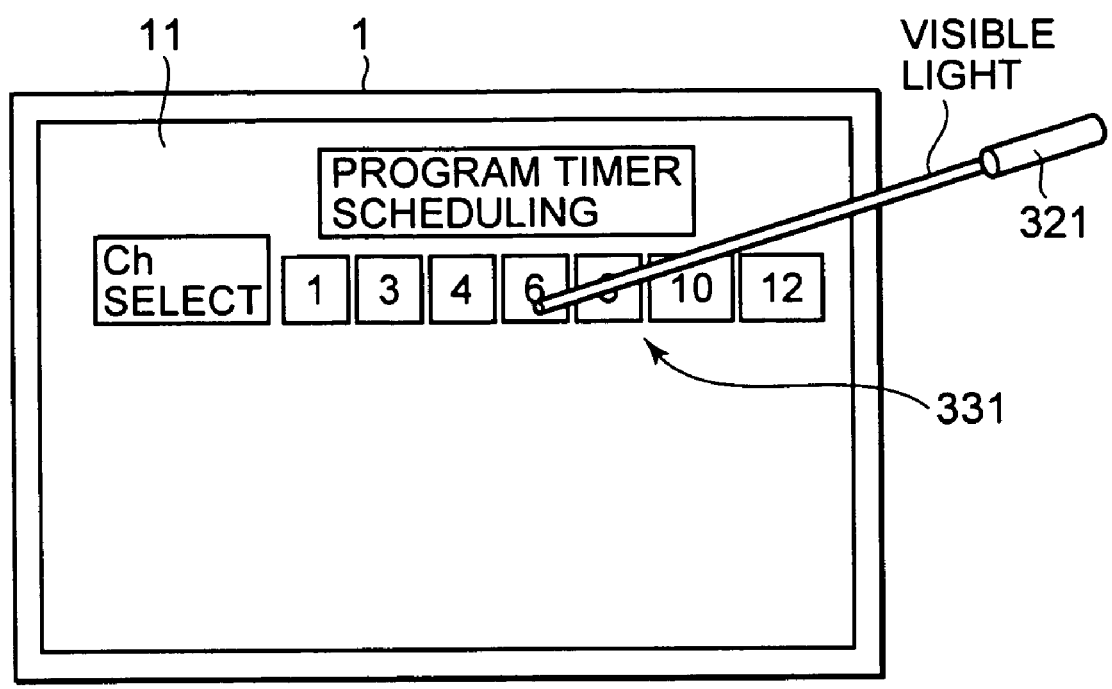
FIG. 55 is a view showing an example of input detection.

A time scheduling screen of a television program is displayed in the display unit 11 shown in FIG. 55, and channel selection buttons 331 are displayed on the time scheduling screen.

Channel selection buttons 331 (buttons for channels 1, 3, 4, 6, 8, 10 and 12, in this case) are alternately subjected to light emission driving and light reception driving in accordance with the display frequency of the display unit 11. When light is irradiated from the laser pointer 321 at an instant during the light reception driving, the display apparatus 1 can detect an input from the laser pointer 321.

Figure 56:
FIG. 56 is a view showing output of a laser pointer of FIG. 55.

In the example shown in FIG. 55, a selection of the "channel-6" is detected. In this case, the laser pointer 321 outputs an ON-signal in a case where a button mounted on the surface of the laser pointer 321 is depressed, and turns off the output during the other period. A laser pointer can output a signal such as shown in FIG. 56.

Figure 57:
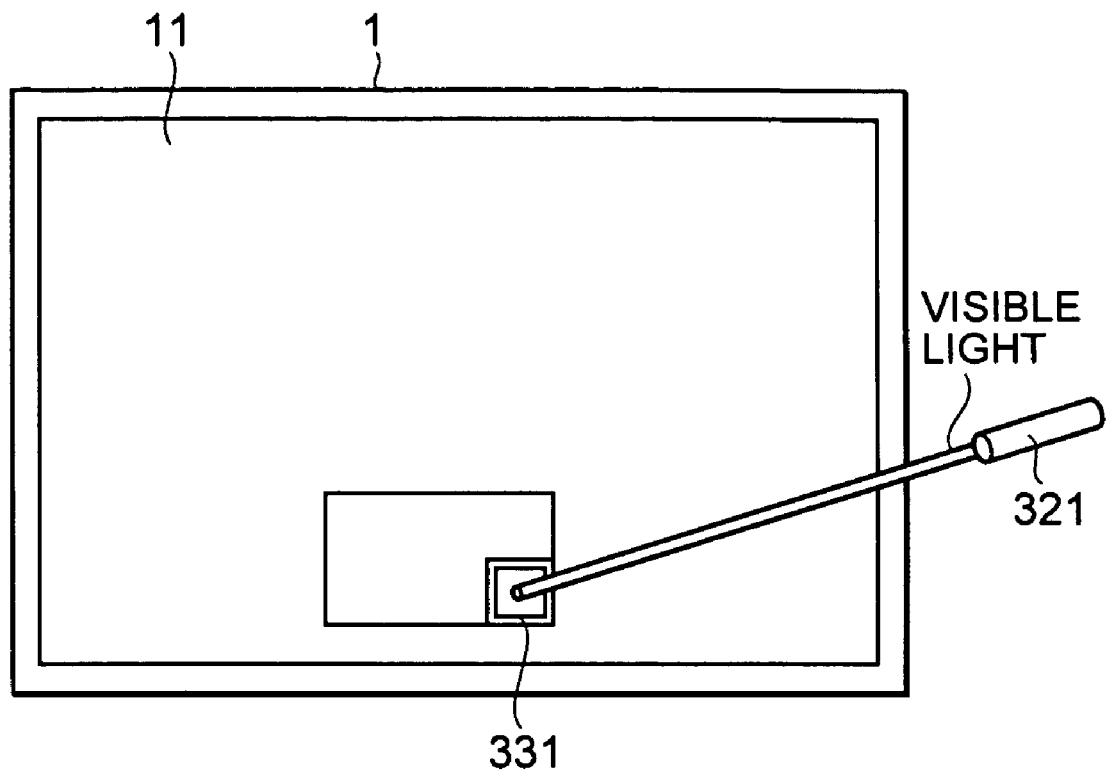
FIG. 57 is a view showing another example of input detection.
Figure 58:
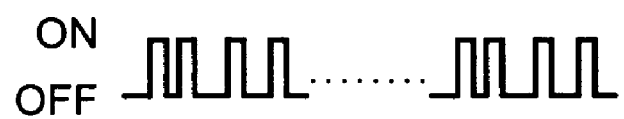
FIG. 58 is a view showing output of a laser pointer of FIG. 57.

In a case where the laser pointer 321 shown in FIG. 57 can emit visible light representative of predetermined data such as shown in FIG. 58 (one capable of modulating data and outputting corresponding light (on/off) at a predetermined frequency), data can be input to a data input window 331 formed in the display unit 11 by using the laser pointer 321. The data input window 331 (read area) is constituted of sub-pixels under light reception driving.

The above description is mainly directed to the case where G sub-pixels are subjected to light emission driving and neighboring R sub-pixels are subjected to light reception driving to detect a presence/absence of a proximate object to the surface of the display unit 11. A combination of sub-pixels under light emission driving and sub-pixels under light reception driving is not limited to the combination of G and R.

Namely, as described earlier, since the light reception sensitivity characteristics of sub-pixels under light reception driving become different depending upon the materials of electrodes and organic layers of an EL element, any combination of sub-pixels under the light reception driving and light emission driving may be used if the combination has sub-pixels under the light emission driving and sub-pixels having a high light reception sensitivity relative to emitted light from the first-mentioned sub-pixels.

Although an above-described series of processes may be realized by hardware, they may be realized by software.

In a case where a series of processes are to be realized by software, the program constituting the software is installed from a network or a recording medium in a computer assembled in dedicated hardware or an apparatus such as a general personal computer capable of executing various functions by installing various programs.

The recording medium is constituted of not only package media including the magnetic disk 131 (including a flexible disk), optical disk 132 (including a compact disk—read only memory (CD-ROM) and a digital versatile disk (DVD)), magnetic optical disk 133 (including a minidisk (MD) (registered trademark) and semiconductor memory 134, as shown in FIG. 10, which are distributed to users to supply programs separately from the apparatus main body, but also a ROM, a hard disk in the memory unit 118 and the like storing programs, which are provided to users by preassembling them in the apparatus main body.

In this specification, steps contain not only a process to be executed time sequentially in the order of written statements but also a process to be executed parallel or independently without being processed time sequentially.

In this specification, a system is the whole apparatus constituted of a plurality of apparatuses.

What is claimed is:

1. An information processing apparatus for controlling driving display means having pixels, each pixel having a transistor disposed therein for switching between conduction and non-conduction in response to an applied voltage and outputting a signal in response to a light reception, comprising:
    a controller configured to control an operation state of each pixel by a single voltage applied to said transistor to switch between display driving and photo detection driving; and
    a detector configured to detect an external input in accordance with a signal output upon reception of light by an electroluminescence element disposed in each pixel performing light reception driving under control of said controller.

2. The information processing apparatus as claimed in claim 1, wherein:
    said controller applies a positive voltage to said transistor disposed in respective pixels when performing display driving and a voltage near 0 V to said transistor disposed in respective pixels when performing photo detection driving.

3. The information processing apparatus as claimed in claim 1, wherein:
    in a case when the electroluminescent element of a pixel is emitting light and the controller causes the transistor to be conductive, said detector is configured to detect the external input in accordance with a signal output upon reception of light by said electroluminescent element when not emitting light.

4. The information processing apparatus as claimed in claim 1, wherein:
    said controller displays a detection area constituted of a plurality of pixels performing light reception driving on said display means, by controlling a voltage applied to respective transistors in the plurality of pixels performing light reception driving.

5. The information processing apparatus as claimed in claim 4, wherein:
    said detector detects, as the external input, a figure image representative of predetermined data displayed on another information processing apparatus, in accordance with a signal output from said transistor disposed in a pixel in said detection area.

6. The information processing apparatus as claimed in claim 5, wherein:
    said figure image is a two-dimensional code representative of data having a predetermined data amount.

7. The information processing apparatus as claimed in claim 4, wherein:
    said controller forms on said display a display area constituted of a plurality of pixels performing display driving in an area different from said detection area.

8. The information processing apparatus as claimed in claim 7, wherein:
    in a case when the electroluminescent element of a pixel is emitting light and the controller causes the transistor to be conductive, said controller controls the voltage applied to one of the respective transistors in such a manner that said detection area includes a pixel in which said electroluminescent element having a high light reception sensitivity relative to light having a predetermined wavelength emitted from electroluminescent elements disposed in pixels in said display area.

9. The information processing apparatus as claimed in claim 7, further comprising:
    generating means for generating a figure image representative of predetermined data to be output to another information processing apparatus; and
    display control means for making one or more pixels in said display area display said figure image generated by said generating means.

10. An information processing method of an information processing apparatus for controlling driving display means having pixels, each pixel having a transistor disposed therein for switching between conduction and non-conduction in response to an applied voltage and outputting a signal in response to a light reception, said method comprising:
    a control step of controlling a single voltage applied to said transistor to switch between display driving and photo detection driving of each pixel; and
    a detecting step of detecting an external input in accordance with a signal output upon reception of light by an electroluminescence element disposed in each pixel performing light reception driving under control by a process of said control step.

11. A recording medium having recorded therein a program instructions that when executed by a processor cause the processor to execute a process of driving display means, having a transistor disposed therein for switching between conduction and non-conduction in response to an applied voltage and outputting a signal in response to a light reception, said process having steps comprising:
    a control step of controlling a single voltage applied to the transistor to switch between display driving and photo detection driving of each pixel; and
    a detecting control step of detecting an external input in accordance with a signal output upon reception of light by an electroluminescence element disposed in each pixel performing light reception driving under control by a process of the control step.

* * * * *